United States Patent
Kim et al.

(10) Patent No.: US 10,708,106 B2
(45) Date of Patent: Jul. 7, 2020

(54) BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

(71) Applicant: LG Electronics Inc., Seoul (KR)

(72) Inventors: Jaewan Kim, Seoul (KR); Youngjin Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/493,352

(22) PCT Filed: Mar. 14, 2017

(86) PCT No.: PCT/KR2017/002750
§ 371 (c)(1),
(2) Date: Sep. 12, 2019

(87) PCT Pub. No.: WO2018/169100
PCT Pub. Date: Sep. 20, 2018

(65) Prior Publication Data
US 2020/0136877 A1 Apr. 30, 2020

(51) Int. Cl.
*H04L 27/26* (2006.01)

(52) U.S. Cl.
CPC ........ *H04L 27/2649* (2013.01); *H04L 27/266* (2013.01); *H04L 27/2659* (2013.01); *H04L 27/2675* (2013.01)

(58) Field of Classification Search
CPC .. H04L 65/4076; H04H 2201/16; H04W 4/06
See application file for complete search history.

(56) References Cited

U.S. PATENT DOCUMENTS

| | | | |
|---|---|---|---|
| 2013/0034032 A1* | 2/2013 | Vare | H04L 69/22 370/310 |
| 2015/0071153 A1* | 3/2015 | Hong | H04L 5/0023 370/311 |

(Continued)

FOREIGN PATENT DOCUMENTS

WO 2015199420 A1 12/2015
WO 2016195420 A1 12/2016

*Primary Examiner* — Kevin Kim
(74) *Attorney, Agent, or Firm* — Dentons US LLP

(57) ABSTRACT

The present disclosure comprises: a demodulation unit for receiving a broadcast signal including a signal frame divided into a bootstrap area, a preamble area, and a data area, and demodulating the received broadcast signal according to an OFDM scheme; a frame parsing unit for parsing the signal frame from the demodulated broadcast signal; an L1 signaling processing unit for processing preamble data received in the preamble area of the parsed signal frame, and extracting L1 signaling data including time information; a physical layer pipe (PLP) data processing unit for processing PLP data of at least one PLP received in the data area of the parsed signal frame, and extracting at least one data packet; and a container encapsulation unit for generating a first container including the extracted time information, and generating a second container including the at least one extracted data packet, wherein each of the first container and the second container includes a first header, a second header, and a payload, the first header includes start position information indicating a start position of a corresponding container, start position information of the first container and start position information of the second container have the same value, and the second header includes container identification information for distinguishing the first container and the second container.

17 Claims, 22 Drawing Sheets

(56) References Cited

U.S. PATENT DOCUMENTS

2015/0372845 A1 12/2015 Yoshimochi et al.
2017/0006355 A1 1/2017 Kim et al.
2017/0013026 A1 1/2017 Kwak et al.

* cited by examiner

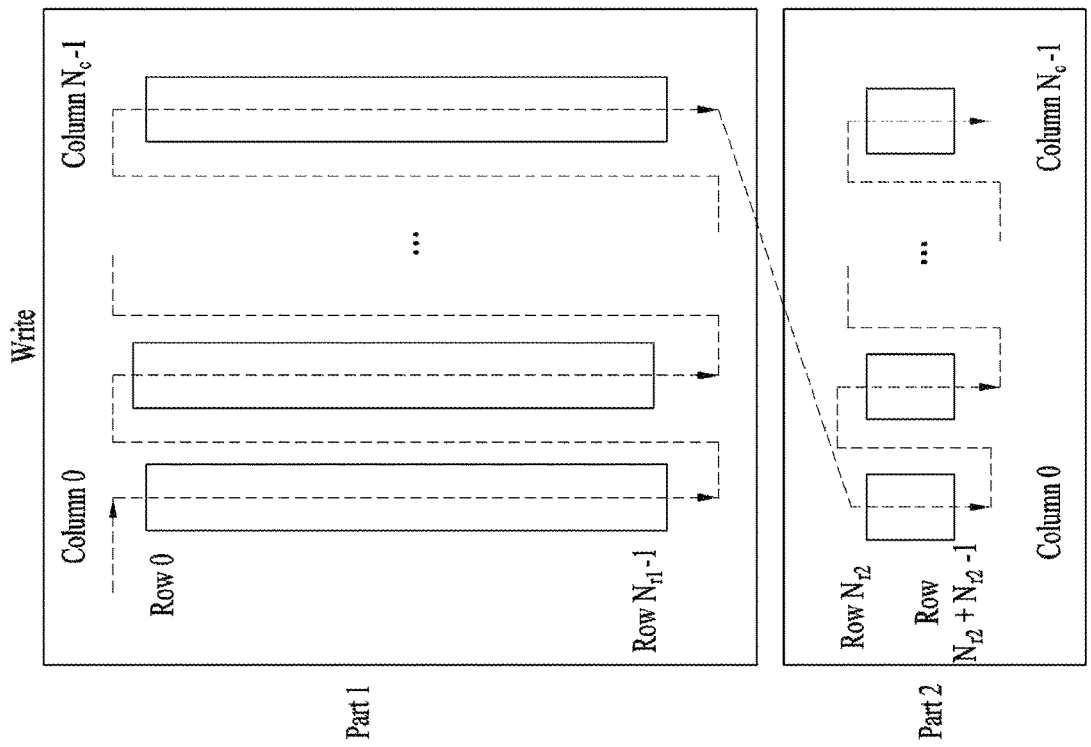
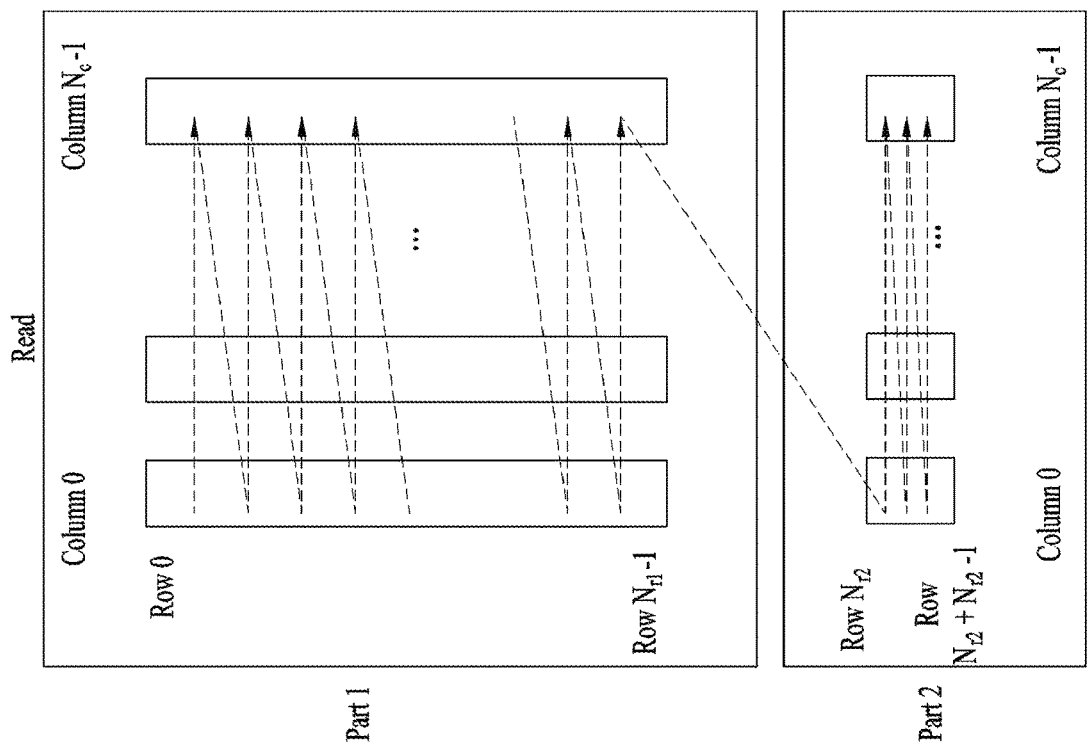

FIG. 9

| Syntax | # of bits | Format |
|---|---|---|
| L1_Basic_signaling() { | | |
|     L1B_version | 3 | uimsbf |
|     L1B_mimo_scattered_pilot_encoding | 1 | uimsbf |
|     L1B_lls_flag | 1 | uimsbf |
|     L1B_time_info_flag | 2 | uimsbf |
|     L1B_return_channel_flag | 1 | uimsbf |
|     L1B_papr | 2 | uimsbf |
|     L1B_frame_length_mode | 1 | uimsbf |
|     if( L1B_frame_length_mode=0 ) { | | |
|         L1B_frame_length | 10 | uimsbf |
|         L1B_excess_samples_per_symbol | 13 | uimsbf |
|     } else { | | |
|         L1B_time_offset | 16 | uimsbf |
|         L1B_additional_samples | 7 | uimsbf |
|     } | | |
|     L1B_num_subframes | 8 | uimsbf |
|     L1B_preamble_num_symbols | 3 | uimsbf |
|     L1B_preamble_reduced_carriers | 3 | uimsbf |
|     L1B_L1_Detail_content_tag | 2 | uimsbf |
|     L1B_L1_Detail_size_bytes | 13 | uimsbf |
|     L1B_L1_Detail_fec_type | 3 | uimsbf |
|     L1B_L1_Detail_additional_parity_mode | 2 | uimsbf |
|     L1B_L1_Detail_total_cells | 19 | uimsbf |
|     L1B_first_sub_mimo | 1 | uimsbf |
|     L1B_first_sub_miso | 2 | uimsbf |
|     L1B_first_sub_fft_size | 2 | uimsbf |
|     L1B_first_sub_reduced_carriers | 3 | uimsbf |
|     L1B_first_sub_guard_interval | 4 | uimsbf |
|     L1B_first_sub_num_ofdm_symbols | 11 | uimsbf |
|     L1B_first_sub_scattered_pilot_pattern | 5 | uimsbf |
|     L1B_first_sub_scattered_pilot_boost | 3 | uimsbf |
|     L1B_first_sub_sbs_first | 1 | uimsbf |
|     L1B_first_sub_sbs_last | 1 | uimsbf |
|     L1B_reserved | 48 | uimsbf |
|     L1B_crc | 32 | uimsbf |
| } | | |

FIG. 10

| Syntax | # of bits | Format |
|---|---|---|
| L1_Detail_signaling( ) { | | |
|    L1D_version | 4 | uimsbf |
|    L1D_num_rf | 3 | uimsbf |
|    for (L1D_rf_id=1 .. L1D_num_rf) { | | |
|      L1D_rf_frequency | 19 | uimsbf |
|    } | | |
|    if (L1B_time_info_flag != 00) { | | |
|      L1D_time_sec | 32 | uimsbf |
|      L1D_time_msec | 10 | uimsbf |
|      if (L1B_time_info_flag != 01) { | | |
|        L1D_time_usec | 10 | uimsbf |
|        if (L1B_time_info_flag != 10) { | | |
|          L1D_time_nsec | 10 | uimsbf |
|        } | | |
|      } | | |
|    } | | |
| | | |
|    for (i=0 .. L1B_num_subframes) { | | |
|      if (i > 0) { | | |
|        L1D_mimo | 1 | uimsbf |
|        L1D_miso | 2 | uimsbf |
|        L1D_fft_size | 2 | uimsbf |
|        L1D_reduced_carriers | 3 | uimsbf |
|        L1D_guard_interval | 4 | uimsbf |
|        L1D_num_ofdm_symbols | 11 | uimsbf |
|        L1D_scattered_pilot_pattern | 5 | uimsbf |
|        L1D_scattered_pilot_boost | 3 | uimsbf |
|        L1D_sbs_first | 1 | uimsbf |
|        L1D_sbs_last | 1 | uimsbf |
|      } | | |
|      if (L1B_num_subframes>0) { | | |
|        L1D_subframe_multiplex | 1 | uimsbf |
|      } | | |

FIG. 11

| Syntax | # of bits | Format |
|---|---|---|
| L1D_frequency_interleaver | 1 | uimsbf |
| if (((i=0)&&(L1B_first_sub_sbs_first \|\| L1B_first_sub_sbs_last)) \|\| | | |
| ((i>0)&&(L1D_sbs_first \| L1D_sbs_last))) { | | |
|     L1D_sbs_null_cells | 13 | uimsbf |
| } | | |
| L1D_num_plp | 6 | uimsbf |
| | | |
| for (j=0 .. L1D_num_plp) { | | |
|     L1D_plp_id | 6 | uimsbf |
|     L1D_plp_lls_flag | 1 | uimsbf |
|     L1D_plp_layer | 2 | uimsbf |
|     L1D_plp_start | 24 | uimsbf |
|     L1D_plp_size | 24 | uimsbf |
|     L1D_plp_scrambler_type | 2 | uimsbf |
|     L1D_plp_fec_type | 4 | uimsbf |
|     if (L1D_plp_fec_type ∈ {0,1,2,3,4,5}) { | | |
|         L1D_plp_mod | 4 | uimsbf |
|         L1D_plp_cod | 4 | uimsbf |
|     } | | |
|     L1D_plp_TI_mode | 2 | uimsbf |
|     if (L1D_plp_TI_mode=00) { | | |
|         L1D_plp_fecframe_start | 15 | uimsbf |
|     } else if (L1D_plp_TI_mode=01) { | | |
|         L1D_plp_CTI_fecframe_start | 22 | uimsbf |
|     } | | |
|     if (L1D_num_rf>0) { | | |
|         L1D_plp_num_channel_bonded | 3 | uimsbf |
|         if (L1D_plp_num_channel_bonded>0) { | | |
|             L1D_plp_channel_bonding_format | 2 | uimsbf |
|             for (k=0..L1D_plp_num_channel_bonded){ | | |
|                 L1D_plp_bonded_rf_id | 3 | uimsbf |
|             } | | |
|         } | | |
|     } | | |

FIG. 12

| Syntax | # of bits | Format |
|---|---|---|
| if (i=0 && L1B_first_sub_mimo=1) \|\| (i >1 && L1D_mimo=1) { | | |
|     L1D_plp_mimo_stream_combining | 1 | uimsbf |
|     L1D_plp_mimo_IQ_interleaving | 1 | uimsbf |
|     L1D_plp_mimo_PH | 1 | uimsbf |
| } | | |
| if (L1D_plp_layer=0) { | | |
|     L1D_plp_type | 1 | uimsbf |
|     if (L1D_plp_type=1) { | | |
|         L1D_plp_num_subslices | 14 | uimsbf |
|         L1D_plp_subslice_interval | 24 | uimsbf |
|     } | | |
|     if (((L1D_plp_TI_mode=01) \|\| | | |
|     (L1D_plp_TI_mode=10))&&(L1D_plp_mod=0000)) { | | |
|         L1D_plp_TI_extended_interleaving | 1 | uimsbf |
|     } | | |
|     if (L1D_plp_TI_mode=01) { | | |
|         L1D_plp_CTI_depth | 3 | uimsbf |
|         L1D_plp_CTI_start_row | 11 | uimsbf |
|     } else if (L1D_plp_TI_mode=10) { | | |
|         L1D_plp_HTI_inter_subframe | 1 | uimsbf |
|         L1D_plp_HTI_num_ti_blocks | 4 | uimsbf |
|         L1D_plp_HTI_num_fec_blocks_max | 12 | uimsbf |
|         if (L1D_plp_HTI_inter_subframe=0) { | | |
|             L1D_plp_HTI_num_fec_blocks | 12 | uimsbf |
|         } else { | | |
|             for (k=0..L1D_plp_HTI_num_ti_blocks) { | | |
|                 L1D_plp_HTI_num_fec_blocks | 12 | uimsbf |
|             } | | |
|         } | | |
|         L1D_plp_HTI_cell_interleaver | 1 | uimsbf |
|     } | | |
| } else { | | |
|     L1D_plp_ldm_injection_level | 5 | uimsbf |
| } | | |
| } | | |
| } | | |
| L1D_reserved | as needed | uimsbf |
| L1D_crc | 32 | uimsbf |
| } | | |

BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

This application is a National Stage Entry of International Application No. PCT/KR2017/002750 filed Mar. 14, 2017, which is hereby incorporated by reference in their entirety for all purposes as if fully set forth herein.

TECHNICAL FIELD

The present disclosure relates to a broadcast signal transmission device, a broadcast signal reception device, a broadcast signal transmission method, and a broadcast signal reception method.

BACKGROUND ART

As analog broadcast signal transmission is terminated, various technologies for transmitting and receiving a digital broadcast signal have been developed. A digital broadcast signal is capable of containing a larger amount of video/audio data than an analog broadcast signal and further containing various types of additional data as well as the video/audio data.

DISCLOSURE

Technical Problem

That is, a digital broadcast system may provide a high definition (HD) image, multi channel audio, and various additional services. However, for digital broadcast, network flexibility obtained by considering data transmission efficiency for a large amount of data transmission, robustness of a transceiving network, and a mobile receiving device needs to be enhanced.

An object of the present disclosure is to provide a broadcast signal transmission device, a broadcast signal transmission method, a broadcast signal reception device, and a broadcast signal reception method, which are intended to enhance network flexibility in consideration of data transmission efficiency for a large amount of data transmission, robustness of a transceiving network, and a mobile receiving device.

Another object of the present disclosure is to provide a broadcast signal reception device and a broadcast signal reception method, which are intended to efficiently deliver time information provided from a transmission system to a higher layer.

Other object of the present disclosure is to provide a broadcast signal reception device and a broadcast signal reception method, which are intended to encapsulate time information provided from a transmission system from a physical layer to a container format and deliver the encapsulated time information to a higher layer.

Technical Solution

To achieve the aforementioned objects and other advantages, a broadcast signal reception method according to one embodiment of the present disclosure comprises receiving a broadcast signal including a signal frame divided into a bootstrap area, a preamble area, and a data area, demodulating the received broadcast signal in accordance with an Orthogonal Frequency Division Multiplexing (OFDM) scheme, parsing the signal frame from the demodulated broadcast signal, extracting L1 signaling data including time information by processing preamble data received in the preamble area of the parsed signal frame, extracting at least one data packet by processing Physical Layer Pipe (PLP) data of at least one PLP received in the data area of the parsed signal frame, and generating a first container including the extracted time information, and generating a second container including the at least one extracted data packet, wherein each of the first container and the second container includes a first header, a second header, and a payload, the first header includes starting position information indicating a starting position of a corresponding container, starting position information of the first container and starting position information of the second container have the same value, and the second header includes container identification information for identifying the first container from the second container.

In one embodiment, the second header of the first container includes a time mode field including the container identification information, and a time information field including the time information, and the second header of the second container includes a time mode field including the container identification information but does not include the time information field.

In one embodiment, the time mode field included in the second header of the first container includes a time flag field indicating that the first container is a time information container and a time type field indicating precision of the time information included in the time information field, and the time information field included in the second header of the first container includes time information of precision indicated by the time type field.

In one embodiment, the time mode field included in the second header of the second container includes a time flag field indicating that the second container is a data container and a time type field including dummy data.

In one embodiment, each of the first header of the first container and the first header of the second container further includes error indication information, the error indication information included in the first header of the first container indicates whether an error exists in the L1 signaling data, and the error indication information included in the first header of the second container indicates whether an error exists in the at least one data packet.

In one embodiment, the first header of the second container further includes PLP identification information for identifying a PLP to which the at least one data packet belongs, and length identification information for identifying a length of the at least one data packet.

In one embodiment, the payload of the first container includes debugging information for debugging, and the payload of the second container includes the at least one data packet.

In one embodiment, the broadcast signal reception method according to the present disclosure further comprises receiving the first container and the second container; identifying whether the received container is the first container or the second container, based on the container identification information included in the second header of the received container; and extracting the time information from the identified container if the container identified in the identifying step is the first container and extracting the at least one data packet from the identified container if the identified container is the second container.

A broadcast signal reception device according to the present disclosure comprises a demodulator for receiving a broadcast signal including a signal frame divided into a bootstrap area, a preamble area, and a data area, and demodulating the received broadcast signal in accordance with an Orthogonal Frequency Division Multiplexing (OFDM) scheme, a frame parser for parsing the signal frame from the demodulated broadcast signal, an L1 signaling processor for extracting L1 signaling data including time information by processing preamble data received in the preamble area of the parsed signal frame, a Physical Layer Pipe (PLP) data processor for extracting at least one data packet by processing PLP data of at least one PLP received in the data area of the parsed signal frame, and a container encapsulator for generating a first container including the extracted time information, and generating a second container including the at least one extracted data packet, wherein each of the first container and the second container includes a first header, a second header, and a payload, the first header includes starting position information indicating a starting position of a corresponding container, starting position information of the first container and starting position information of the second container have the same value, and the second header includes container identification information for identifying the first container from the second container.

In one embodiment, the second header of the first container includes a time mode field including the container identification information, and a time information field including the time information, and the second header of the second container includes a time mode field including the container identification information but does not include the time information field.

In one embodiment, the time mode field included in the second header of the first container includes a time flag field indicating that the first container is a time information container and a time type field indicating precision of the time information included in the time information field, and the time information field included in the second header of the first container includes time information of precision indicated by the time type field.

In one embodiment, the broadcast signal reception device of claim 10, wherein the time mode field included in the second header of the second container includes a time flag field indicating that the second container is a data container and a time type field including dummy data.

In one embodiment, each of the first header of the first container and the first header of the second container further includes error indication information, the error indication information included in the first header of the first container indicates whether an error exists in the L1 signaling data, and the error indication information included in the first header of the second container indicates whether an error exists in the at least one data packet.

In one embodiment, the payload of the first container includes debugging information for debugging, and the payload of the second container includes the at least one data packet.

In one embodiment, the broadcast signal reception device further comprises a system decoder for receiving the first container and the second container, identifying whether the received container is the first container or the second container, based on the container identification information included in the second header of the received container, and extracting the time information from the identified container if the identified container is the first container and extracting the at least one data packet from the identified container if the identified container is the second container.

Advantageous Effects

The present disclosure may provide various broadcast services by processing data in accordance with service property and controlling Quality of Service (QoS) for each service or service component.

The present disclosure may achieve transmission flexibility by transmitting various broadcast services or products through the same radio frequency (RF) signal bandwidth.

The present disclosure may improve data transmission efficiency and transmission and reception robustness of a broadcast signal by using a Multiple-Input Multiple-Output (MIMO) system.

According to the present disclosure, a digital broadcast signal may be received without any error even though a mobile reception device is used or even in case of an indoor environment.

A reception system of the present disclosure may encapsulate time information provided from a transmission system from a physical layer to a container format and deliver the encapsulated time information to a higher layer that includes a system decoder, whereby the system decoder may efficiently perform a system decoding operation.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 3(a) and 3(b) are views illustrating a block interleaving procedure of a type A according to one embodiment of the present disclosure;

FIG. 9 is a view illustrating a syntax structure of L1-Basic signaling data of L1 signaling data according to one embodiment of the present disclosure;

FIGS. 10 to 12 are views illustrating a syntax structure of L1-Detail signaling data of L1 signaling data according to one embodiment of the present disclosure;

BEST MODE FOR CARRYING OUT THE DISCLOSURE

Figure 1:
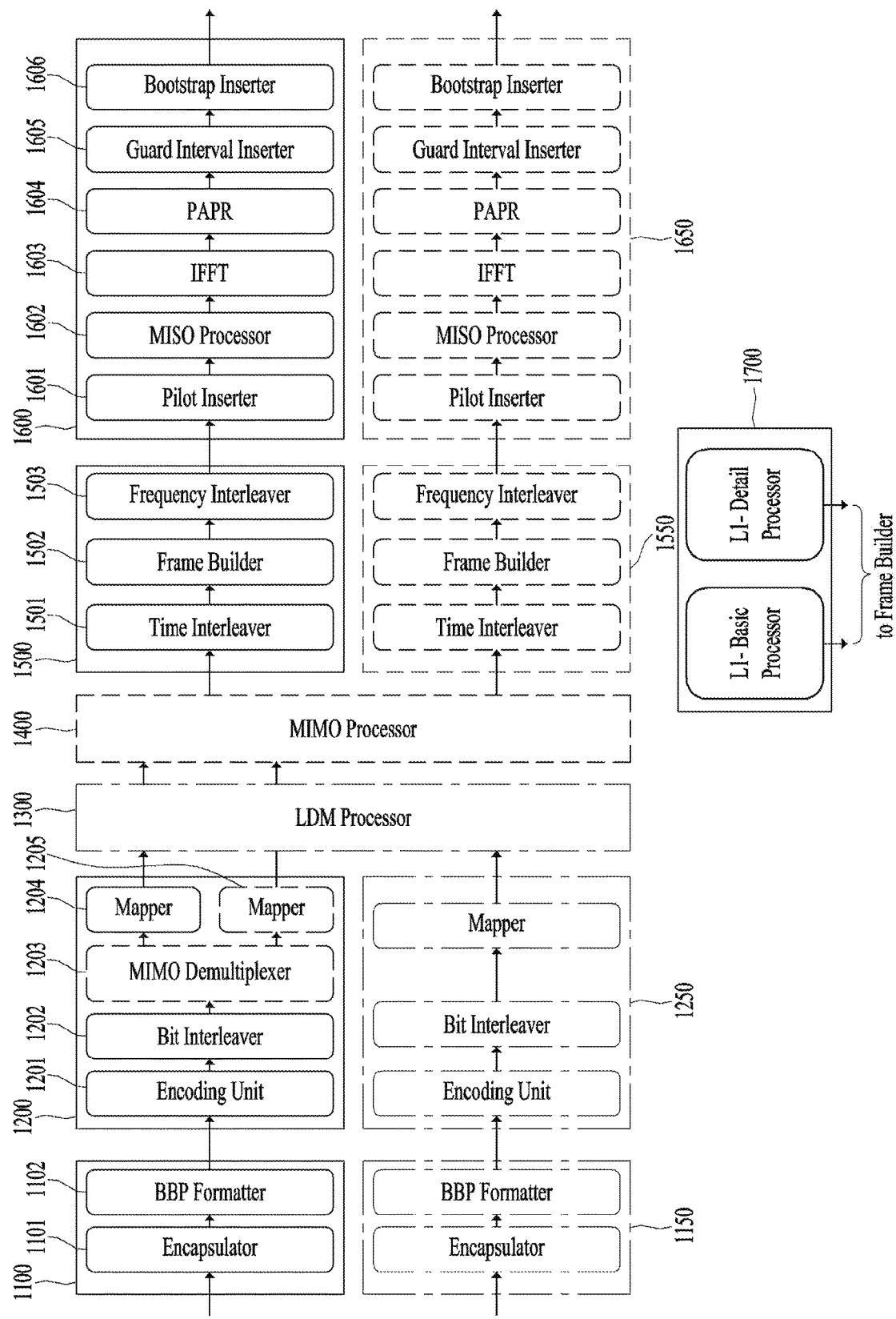
FIG. 1 is a schematic block view illustrating a transmission system according to one embodiment of the present disclosure.

Reference will now be made in detail to the preferred embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood according to the intended meanings of the terms rather than their simple names or meanings.

The present disclosure provides a broadcast signal transmission and reception systems and methods for future broadcast services.

Future broadcast services according to one embodiment of the present disclosure include a terrestrial broadcast service, a mobile broadcast service, a UHDTV service, etc. The present disclosure may process broadcast signals for the future broadcast services through non-Multiple Input Multiple Output (MIMO) or MIMO according to one embodiment. A non-MIMO scheme according to one embodiment of the present disclosure may include a Multiple Input Single Output (MISO) scheme, a Single Input Single Output (SISO) scheme, etc.

Although the MISO or MIMO scheme uses two antennas in the following for convenience of description, the present disclosure is applicable to systems that use two or more antennas.

The present disclosure suggests a physical profile (or system) optimized to minimize receiver complexity while achieving performance required for a specific purpose of use.

The present disclosure may process a broadcast signal for future broadcast services by using at least one of Time Division Multiplexing (TDM), Frequency Division Multiplexing (FDM), and Layered Division Multiplexing (LDM) as a multiplexing scheme.

As one embodiment of the present disclosure, the MIMO scheme and the LDM scheme are not used together when a broadcast signal for future broadcast services is processed. This is only exemplary, and the MIMO scheme and the LDM scheme may be used together.

In the present disclosure, the number of transmission subcarriers (NoC) is the number of all subcarriers capable of being transmitted in accordance with FFT size and mode in OFDM symbols, and the number of useful data subcarriers is the number of subcarriers capable of transmitting data except pilot, null cell and reserved tone in all subcarriers.

As one embodiment of the present disclosure, three types of FFT sizes, that is, 8K, 16K and 32K are applied to the present disclosure.

In the present disclosure, a data pipe DP is a basic unit for robustness control, and one or more services or one or more service components may be delivered to one data pipe. That is, the data pipe is a logical channel in a physical layer for delivering service data or related metadata capable of delivering one or more services or one or more service components. In the present disclosure, a physical layer pipe (PLP) is a physical path used as the same concept as the aforementioned DP, and its title may be changed in accordance with a designer's intention. Also, in the present disclosure, the service is used to refer to a product. The product may have the same meaning as the service, or may have a higher meaning that includes the service. In this case, the plurality of PLPs may transmit different types of data streams, and all the data streams are required to assemble one service or complete delivered product. Also, if the data streams required to assemble multiple delivered products are transmitted with robustness of the same level, the corresponding data streams may share the PLPs. In addition, data streams required to assemble a single delivered product are transmitted through maximum four PLPs as one embodiment. In other words, the maximum number of PLPs in a frame carrying content requiring simultaneous recovery to assemble a single delivered product is four.

Also, in the present disclosure, a signal frame (or frame or A3 frame or physical layer frame) is delimited into three areas, and a first area arranged in the forefront of the signal frame is referred to as a bootstrap (or bootstrap area), a second area arranged next to the first area is referred to as a preamble (or preamble area), and a third area arranged next to the second area is referred to as a data area.

The bootstrap area includes bootstrap data. In one embodiment, an exact time period from the start of one bootstrap to the start of next bootstrap becomes an integer multiple of a sample timing of a baseband sampling rate indicated by the first bootstrap. The preamble area includes layer 1 (L1) signaling data (or L1 control signaling data) applicable to the other of the corresponding frame. The data area is again delimited into one or more subframes. If a plurality of subframes exist in one signal frame, the plurality of subframes are concatenated together in time. One subframe is comprised of a set of time-frequency resources within a signal frame.

The L1 signaling data provide information required to configure physical layer parameters. The L1 signaling data include L1-Basic signaling data and L1-Detail signaling data. In this case, the bootstrap data may be included in the L1 signaling data. Information and/or data included in each area will be described later in detail.

In one embodiment, in the information included in the L1 signaling data, which will be described later, information starting with L1B is information included in the L1-Basic signaling data, and information starting with L1D is information included in the L1-Detail signaling data.

Transmission System

FIG. 1 illustrates a structure of a broadcast signal transmission device (or transmission system) of a physical layer according to one embodiment of the present disclosure.

The broadcast signal transmission device of FIG. 1 comprises a first input formatting block 1100, a first bit interleaved coding & modulation (BICM) block 1200, a first frame building block 1300, a first orthogonal frequency division multiplexing (OFDM) generator 1600, and an L1 signaling processor 1700.

The broadcast signal transmission device of FIG. 1 may further comprise a second input formatting block 1150 and an LDM processor 1300, which are blocks additionally required when the LDM scheme is applied to the present disclosure.

The broadcast signal transmission device of FIG. 1 may further comprise a MIMO processor 1400 and a second OFDM generator 1650, which are blocks additionally required when the MIMO scheme is applied to the present disclosure.

That is, the second input formatting block 1150 and the LDM processor 1300 are used in only the LDM scheme, and a MIMO demultiplexer 1203, a second mapper 1205, the MIMO processor 1400, and the second OFDM generator 1650 are used in only the MIMO scheme. The first input formatting block 1100, the other blocks except the MIMO demultiplexer 1203 and the second mapper 1205 of the first BICM block 1200, the first frame building block 1500, and the first OFDM generator 1600 are commonly used for the LDM scheme and the MIMO scheme. The aforementioned blocks may be omitted or replaced with the other blocks having similar or same functions in accordance with the designer's intention.

In one embodiment, the first input formatting block 1100 includes an encapsulator 1101 and a BBP formatter 1102. Although not shown, the first input formatting block 1100 may further include a scheduler, wherein the scheduler controls the BBP formatter 1102 in one embodiment.

In the present disclosure, data input to the encapsulator 1101 may be IP streams/packets and MPEG2-TS, and the other stream types are handled as generic streams.

The encapsulator 1101 encapsulates all types of input packets including IP packets and MPEG-TS packets into packets of a single format. In the present disclosure, these packets will be referred to as ATSC Link-Layer Protocol (ALP) packets. The ALP packets are only exemplary to assist understanding of the present disclosure, and may be referred to as another title in accordance with designers.

Each ALP packet includes a header and a payload, and input packets are included in a payload of at least one ALP packet. At this time, one input packet may be included in a payload of one ALP packet, one input packet may be divided into a plurality of input packets and then included in payloads of the plurality of ALP packets, or a plurality of input packets may be included in a payload of one ALP packet. The header of the ALP packet always includes a base header, or may further include additional header and optional header. The base header includes has a fixed length (e.g., 2 bytes), and includes information indicating a type or protocol of input packets prior to packetized to the corresponding ALP packet.

At this time, if the input packets are IP packets, a header of the IP packets may be compressed and then encapsulated into at least one ALP packet to reduce overhead of the IP packets. If the input packets are TS packets, synchronization bytes of the respective TS packets may be deleted and then encapsulated into at least one ALP packet to reduce overhead of the TS packets. Also, TS null packets may be identified from streams of TS packets and TS null packets and then deleted to be encapsulated into at least one ALP packet. At this time, in one embodiment, information for identifying the number of the deleted TS null packets is transmitted to a receiver. In one embodiment of the present disclosure, the information for identifying the number of the deleted TS null packets is transmitted by being signaled to a Deleted Null Packets (DNP) field in the header of the corresponding ALP packet.

A length of each APL packet is variable, and length information is signaled to the header of the corresponding ALP packet as one embodiment.

At this time, the encapsulator 1101 may be provided in a higher layer, for example, a link layer. In this case, the encapsulator 1101 is omitted from the physical layer, and the BBP formatter 1102 receives ALP packets provided from the link layer as one embodiment.

The BBP formatter 110 generates a baseband packet by adding a BBP header to a BBP payload that includes at least one ALP packet. In one embodiment of the present disclosure, scrambling is performed for the generated baseband packet. The scrambling is referred to as randomizing.

The baseband packet also includes a header and a payload, wherein the header includes a base field, and may further include an optional field and an extension field.

At this time, the ALP packets are allocated to the payload of the baseband packet in an input order as one embodiment. If the number of the input ALP packets is not enough to fill the corresponding baseband packet, padding may be used to fully fill the corresponding baseband packet. To this end, information for identifying whether padding has been used for the corresponding baseband packet is signaled to the header of the corresponding baseband packet as one embodiment.

Also, since one ALP packet may be split into two or more baseband packets, the start of the payload of the baseband packet does not indicate the start of the ALP packet necessarily. To this end, the base field of the baseband packet signals starting position information of the first ALP packet starting from the corresponding baseband packet by using a pointer field as one embodiment. In one embodiment, a value of the pointer field is offset (byte unit) from the start of the baseband payload to the start of the first ALP packet starting from the corresponding baseband packet.

The base field further includes a mode field, wherein the mode field indicates that a length of the base field is 1 byte or 2 bytes. If the mode field indicates that the length of the base field is 1 byte, the pointer field composed of lower 7 bits is arranged next to the mode field, and if the mode field indicates that the length of the base field is 2 bytes, the pointer field composed of lower 7 bits and higher 6 bits and an optional field indicator (OFI) field of 2 bits are arranged next to the mode field. The OFI field indicates a header extension mode of the corresponding baseband packet, and signals whether the optional field and the extension field are included.

As an example, if the OFI field has a value of 01 (that is, short extension mode) or 10 (that is, long extension mode), a value of EXT_TYPE field of the optional field is set to 111, whereby the extension field may only be used for padding.

In the first input formatting block 1100, encapsulation and BBP formatting operations are performed independently for each PLP as one embodiment.

In the present disclosure, since the configuration of the second input formatting block 1150 is the same as that of the first input formatting block 1100, its detailed description will be omitted.

In the first input formatting block 1100, the baseband packets for which scrambling is performed are input to the first BICM block 1200 and then subjected to Forward Error Correction (FEC) encoding, bit interleaving, and symbol mapping (or constellation mapping) in due order.

To this end, the first BICM block 1200 includes an encoding unit 1201, a bit interleaver 1202, and a first mapper 1204. If the MIMO scheme is applied to the present disclosure, the first BICM block 1200 further include a MIMO demultiplexer 1203 and a second mapper 1205.

At this time, the first BICM block 1200 operates per PLP. That is, FEC encoding, bit interleaving and symbol mapping are independently applied to each PLP.

Figure 2:
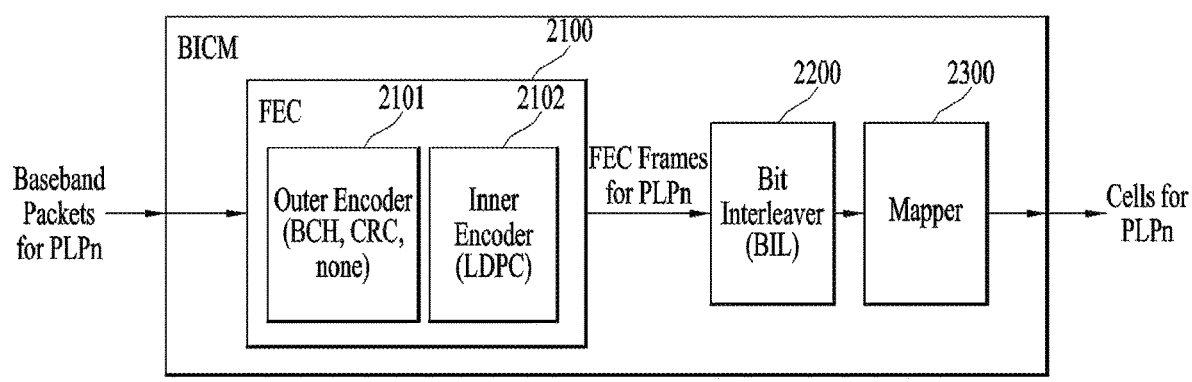
FIG. 2 is a detailed schematic block view illustrating a BICM block for a specific PLP according to one embodiment of the present disclosure.

FIG. 2 is a detailed block view illustrating a BICM block for an nth PLP PLPn.

In FIG. 2, an encoding unit 2100 performs FEC encoding for input baseband packets generated for the nth PLP by the first input formatting block 1100 and then generates FEC frame.

At this time, the encoding unit 2100 includes an outer encoder 2101 and an inner encoder 2102. The outer encoder 2101 has three options. That is, BCH encoding may be performed for data of the input baseband packet, CRC encoding may be performed for the same, or outer encoding may not be performed. In this case, BCH encoding provides both an error correction function and an error detection function, and CRC encoding provides only an error detection function. If BCH encoding is performed, outer code parity of 192 bits (that is, when FEC frame length is 64800 bits) or 168 bits (that is, FEC frame length is 16200 bits) is added to the baseband packet. If CRC encoding is performed, outer code parity of 32 bits is added to the baseband packet.

In one embodiment, the inner encoder 2102 employs cyclic-structured LDPC codes. That is, the inner encoder 2102 performs LDPC encoding for data BCH encoded by the outer encoder 2101, data CRC encoded by the outer encoder 2101, or data bypassing the outer encoder 2101 at a specific code rate and then generates inner code parity. In one embodiment of the present disclosure, a code rate applied for LDPC encoding is one of 2/15, 3/15, 4/15, 5/15, 6/15, 7/15, 8/15, 9/15, 10/15, 11/15, 12/15, and 13/15. Particularly, in one embodiment of the present disclosure, when FEC frame length is 16K, the inner encoder 2102 performs LDPC encoding at any one code rate of 6/15, 7/15, 9/15, 11/15, and 13/15, and when FEC frame length is 64K, the inner encoder 2102 performs LDPC encoding at a code rate of 10/15.

If outer encoding is performed by the outer encoder 2101 and then outer code parity is generated, the inner code parity is added next to the outer code parity, and if outer encoding is not performed, the inner code parity is added next to the baseband packet. That is, the output of the inner encoder 2102 may be FEC frame. In this case, the FEC frame may include one baseband packet, outer code parity, and inner code parity, or may include one baseband packet and inner code parity.

In one embodiment, one FEC frame includes one baseband packet, and has a length of 64800 bits or 16200 bits. This means that a size of the FEC frame is determined by only a code length (that is, 16200 bits or 64800 bits). One baseband packet has a fixed length of Kpayload size, wherein the length is determined by an inner code rate, a code length, and an outer code type (that is, BCH encoding, CRC encoding, None), which are selected for a corresponding PLP, as one embodiment.

The inner encoder 2102 uses two types of coding structures, that is, type A and type B, wherein the type A has better performance at a low code rate, whereas the type B has better performance at a high code rate. For example, if the FEC frame length is 64800 bits, the type A may be applied to the code rates of 2/15, 3/15, 4/15, 5/15, and 7/15, and the type B may be applied to the code rates of 6/15, 8/15, 9/15, 10/15, 11/15, 12/15, and 13/15. For another example, if the FEC frame length is 16200 bits, the type A may be applied to the code rates of 2/15, 3/15, 4/15, and 5/15, and the type B may be applied to the code rates of 6/15, 7/15, 8/15, 9/15, 10/15, 11/15, 12/15, and 13/15.

The data of the FEC frame generated by the inner encoder 2102 are output to the bit interleaver 2200.

The bit interleaver 2200 includes a parity interleaver, a group-wise interleaver, and a block interleaver.

In one embodiment, the parity interleaver performs interleaving for only parity bits of the input FEC frame without performing interleaving for information bits. Also, the parity interleaver is used for only LDPC codes of the type B without being used for LDPC codes of the type A. This is only exemplary, and the parity interleaver may be used for only the LDPC codes of the type A without being used for the LDPC codes of the type B, or may be used for the LDCP codes of the type A and the type B. The parity interleaver performs interleaving to convert a parity part of a staircase structure of an LDPC parity-check matrix to a quasi-cyclic structure similar to an information part of the above matrix.

The bits of the parity interleaved FEC frame are split into a plurality of groups and then interleaved in a group basis based on a permutation order for group-wise interleaving in the group-wise interleaver. At this time, each group includes 360 bits as one embodiment.

The group interleaved data (that is, LDPC codewords) in the group-wise interleaver are output to the block interleaver and then block interleaved.

At this time, the block interleaving is performed as one of a type A block interleaver and a type B block interleaver is selected. Selection of the type A block interleaver and the type B block interleaver is determined by LDPC type and constellation combinations.

FIGS. 3(a) and 3(b) are views illustrating one embodiment of a block interleaving procedure of the type A, wherein FIG. 3(a) illustrates that LDPC codewords are written in a memory, and FIG. 3(b) illustrates that the LDPC codewords written in the memory are read.

In the type A block interleaver, the memory includes a part 1 and a part 2. At this time, the part 1 and the part 2 are calculated using information of a row size and bit group size (e.g., 360) of the block interleaver. In the part 1, bits constituting a bit group are written in the same row as shown in FIG. 3(a), and if writing is completed in the part 1, the bits constituting the bit group are written over at least two rows in the part 2. Meanwhile, when the bits are read from the memory after writing is completed in the memory, the bits are read in a column direction as shown in FIG. 3(b). As a result, the bits read in the same column direction are mapped into one modulation cell.

Figure 4A:
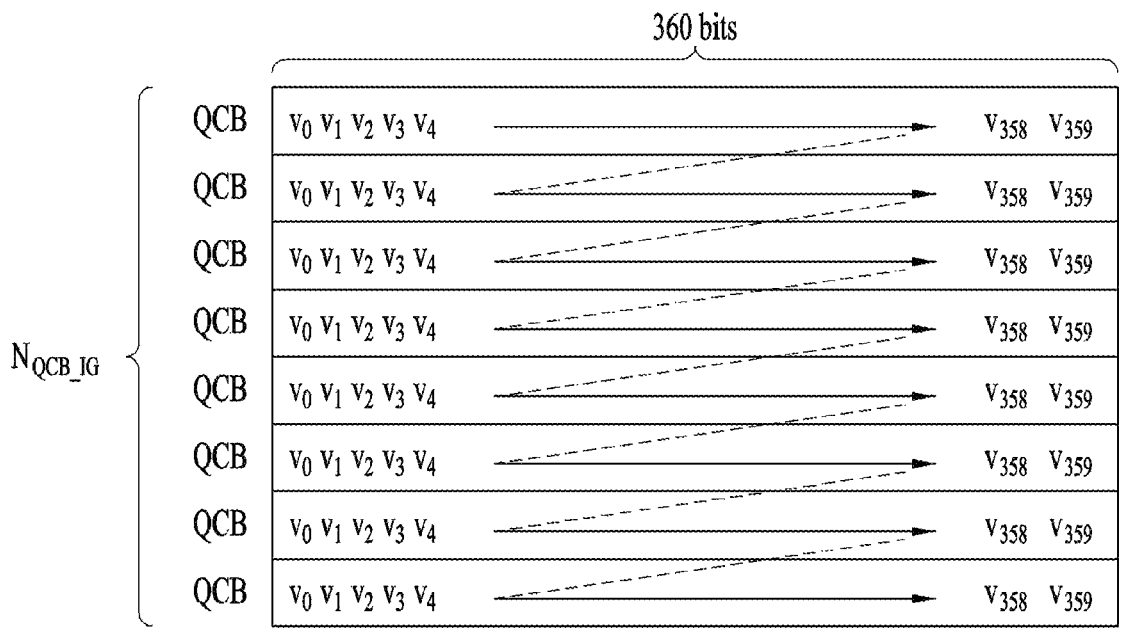
FIGS. 4(a) and 4(b) are views illustrating a block interleaving procedure of a type B according to one embodiment of the present disclosure.
Figure 4B:
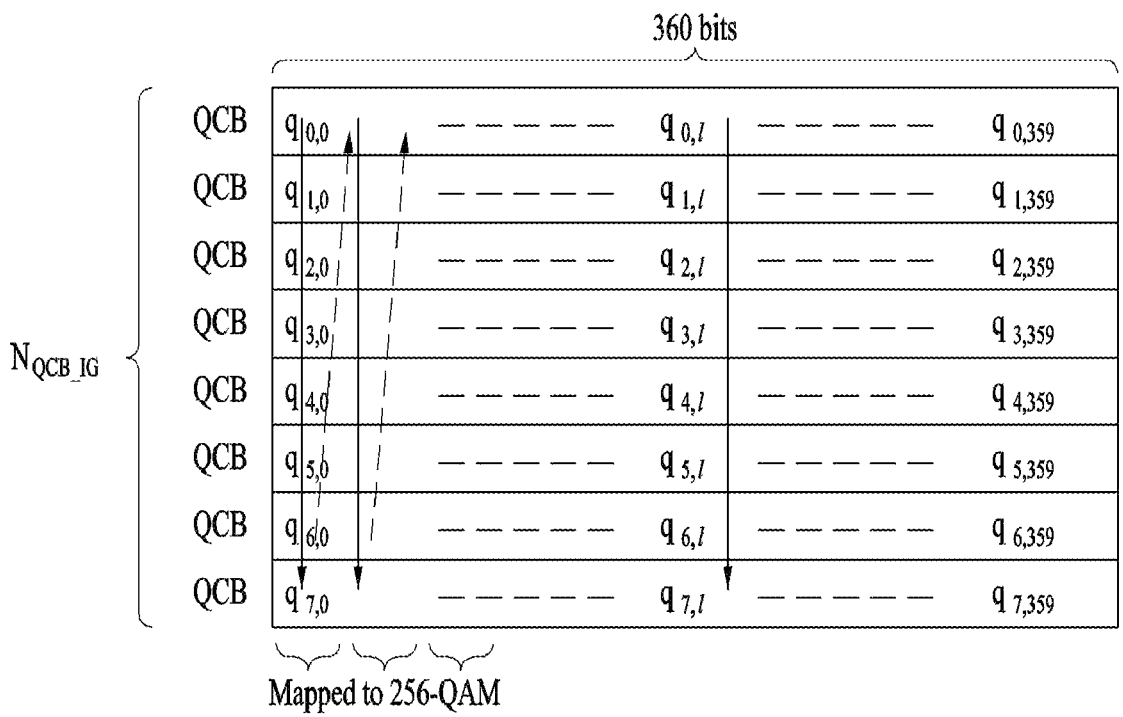

FIG. 4(a) and FIG. 4(b) are views illustrating a block interleaving procedure of the type B, particularly illustrating a block interleaving procedure of the type B when a modulation order is 256QAM. In this case, FIG. 4(a) illustrates that LDPC codewords are written in a memory, and FIG. 4(b) illustrates that the LDPC codewords written in the memory are read.

Even in the type B block interleaver, the memory includes a part 1 and a part 2 similarly to the type A block interleaver. However, the part 1 and the part 2 of the type B are operated differently from the part 1 and the part 2 of the type A block interleaver. A parameter $N_{QCB\_IG}$ for determining a column size of the memory in the type B block interleaver is determined in accordance with a modulation order. For example, the parameter $N_{QCB\_IG}$ is defined as 2 in QPSK, as 4 in 16QAM, as 6 in 64QAM, as 8 in 256QAM, as 9 in 1024QAM, and as 12 in 4096QAM.

The part 1 is operated for $N_{QCB\_IG}$ bit groups on a basis of output bits of the group-wise interleaver.

In case of the type B block interleaving considering 256QAM, the memory of the type B block interleaver has $N_{QCB\_IG}$ columns and 360 rows in the part 1. At this time, the bits output from the group-wise interleaver are written in a column direction as shown in FIG. 4(a), and if writing is completed, the bits are read in a row direction as shown in FIG. 4(b). At this time, bits of each row are mapped into one modulation cell. In the part 2, the other bits excluded from the repeated operation of the part 1 are continuously mapped into a modulation cell without block interleaving as one embodiment.

The bits bit interleaved by the bit interleaver 2200 are mapped into QAM constellation points having complex values on an IQ plane in the mapper 2300. At this time, streams of the bit interleaved FEC frames are input to the mapper 2300, and cells are output from the mapper 2300, and these may be grouped into one FEC block if necessary.

The mapper 2300 includes a demultiplexer for demultiplexing bits constituting FEC frame input to generate data cells into parallel sub streams, and a bit-IQ mapping block for mapping the data cells output from the demultiplexer into constellation values. At this time, the number of sub streams is determined by a modulation order. For example, if the modulation order is 16QAM, the number of sub streams is 4, and if the modulation order is 64QAM, the number of sub streams is 6.

In the present disclosure, the modulation order is defined by uniform QPSK modulation and 5 non-uniform constellation (NUC) sizes, for example, 16QAM, 64QAM, 256QAM, 1024QAM, and 4096QAM. At this time, although different constellations may exist in accordance with combination of each NUC modulation order and code rate, constellation is not changed in accordance with code lengths (e.g., 64800 bits or 16200 bits) as one embodiment. This means that the same constellation is used for the respective code lengths if the code rate and the modulation order are uniformly maintained.

The bit-IQ mapping block may provide a constellation point, of which power is normalized, by modulating data cells output from the bit interleaver or the demultiplexer using uniform QPSK modulation and non-uniform constellation (16QAM, 64QAM, 256QAM, 1024QAM, and 4096QAM).

At this time, QPSK constellation is one-dimensional QAM type, and the same constellation is used for all code rates as one embodiment.

Non-uniform constellations such as 16QAM, 64QAM and 256QAM are two-dimensional quadrant-symmetric QAM constellations, and are constructed using symmetry from a single quadrant. Meanwhile, to reduce complexity when the receiver performs QAM demapping, non-uniform constellation such as 1024QAM and 4096QAM is derived from one-dimensional non-uniform pulse amplitude modulation (PAM) constellation for both of I component and Q component as one embodiment.

If the LDM scheme is applied to the present disclosure, the data output from the mapper 2300 are input to the LDM processor 1300. The LDM is constellation superposition technology for combining a plurality of PLPs at different power levels prior to transmission to one RF channel. At this time, each data stream may have different modulation and channel coding schemes. In the present disclosure, LDM of two layers will be described as one embodiment. In this case, two layers will be referred to as a core layer and an enhanced layer, respectively. This is one embodiment, and each layer may be referred to another title in accordance with a designer.

The LDM processor 1300 combines two or more PLPs prior to time interleaving. Each layer includes one or more PLPs. In the present disclosure, for convenience of description, a PLP of the core layer is also referred to as a core PLP, and a PLP of the enhanced layer is also referred to as an enhanced PLP.

In one embodiment, the core layer uses a modulation and coding (ModCod) combination the same as or more robust than that of the enhanced layer. Particularly, each PLP may use its respective FEC encoding and constellation mapping, which includes a code length and a code rate. This is one embodiment, and the same code length may be applied to each PLP, or the same code rate or the same constellation mapping may be applied to each PLP.

The output of the LDM processor 1300 is input to a first frame building block 1500. The first frame building block 1500 includes a time interleaver 1501, a frame builder 1502, and a frequency interleaver 1503 as one embodiment. The inputs of the time interleaver 1501 and the frame builder 1502 may include one or more PLPs. On the other hand, the outputs of the frame builder 1502 are OFDM symbols of preamble or data, which are sequentially arranged in a final frame, and frequency interleaving is performed for the OFDM symbols as one embodiment.

In the time interleaver 1501, one of no time interleaving, a convolutional time interleaver (CTI) mode, and a hybrid time interleaver (HTI) mode may be applied to each PLP. A time interleaver mode is signaled to an L1D_plp_TI_mode field of L1-Detail signaling data. Also, the time interleaver mode for enhanced PLP is the same as time interleaver modes of the enhanced PLP and layered division multiplexed core PLP (or PLPs) as one embodiment.

If one service or one complete delivered product includes a single PLP of a constant cell rate or includes a single core PLP of a constant cell rate and one or more enhanced PLPs layered division multiplexed with the single core PLP, one of no time interleaving, CTI mode and HTI mode may be applied to PLP (or PLPs) constituting the corresponding service or complete delivered product. On the other hand, if complete delivered products are comprised of PLPs having features different from those of the aforementioned description, no time interleaving or HTI mode may be applied to PLPs which constitute the complete delivered products.

Also, in one embodiment, a time interleaver mode (or modes) for PLPs of a specific service or specific complete delivered product is applied independently from a time interleaver mode (or modes) for PLP (or PLPs) of other services or products transmitted through the same RF channel. If the specific service or specific complete delivered product includes a plurality of core PLPs and/or layer division non-multiplexed PLPs, the same or different time interleaving modes (that is, no time interleaving and/or HTI mode) may be applied to these PLPs, and/or the same or different time interleaver parameters may be applied thereto.

For another example, if one service includes a plurality of components each of which is transmitted through each PLP, each PLP may be operated in a no time interleaving or HIT mode, and at this time, respective parameters of the HTI mode may be different from each other.

Also, if a specific service or specific complete delivered product includes multiple core PLPs which are not subjected to LDM, and all of the core PLPs use the HTI mode, the core PLPs use intra-subframe interleaving or inter-subframe interleaving as one embodiment. If a specific service or specific complete delivered product includes core PLPs which are not subjected to LDM, and at least one of the core PLPs uses the no time interleaving mode, the PLP, which is comprised of the HTI mode, among the core PLPs uses intra-subframe interleaving as one embodiment.

If time interleaving is not applied to a specific PLP, cells of the corresponding PLP are output without delay in the same order as one embodiment.

For another example, a maximum size of a time interleaver (TI) memory for one service or one complete delivered product is $M_{TI}=2^{19}$ cells. However, an extended interleaving mode in which a maximum size of a TI memory for a single service or single complete delivered product becomes $M_{TI}=2^{20}$ cells is excluded. At this time, the TI memory size includes all necessary parts, that is, a convolutional time interleaver of the CTI mode, a cell of the HTI mode, block, and delay line interleavers. That is, a size of a TI memory allocated to each PLP is determined by the amount of data transmitted to the corresponding PLP.

For example, in the CTI mode, the entire TI memory size may be used by the PLP related to the corresponding CTI in accordance with a configured depth of the convolutional time interleaver. For another example, in the HTI mode, the entire memory size is shared among the PLPs for transmitting components of the same service or the same complete delivered product, and the memory allocated to each PLP is determined by the amount of data transmitted from the corresponding PLP.

The extended interleaving mode is not applied to LDM, and is selectively applied to QPSK modulation as one embodiment. At this time, the extended interleaving mode is transmitted by being signaled to an L1D_plp_TI_extended_Interleaving field. If extended interleaving is used in the CTI mode, a time interleaving depth may be extended, and is signaled to an L1D_plp_CTI_depth field of L1-detail signaling data. If extended interleaving for a specific PLP is used in the HTI mode, a maximum time interleaving memory size corresponds to $2^{20}$ cells, and the maximum number $N_{BLOCK\_IF\_MAX}$ of FEC blocks per interleaving frame (IF) cannot exceed 517. If extended interleaving for a specific PLP is not used in the HTI mode, the maximum time interleaving memory size corresponds to $2^{19}$ cells, and the maximum number $N_{BLOCK\_IF\_MAX}$ of FEC blocks per IF cannot exceed 258.

Figure 5:
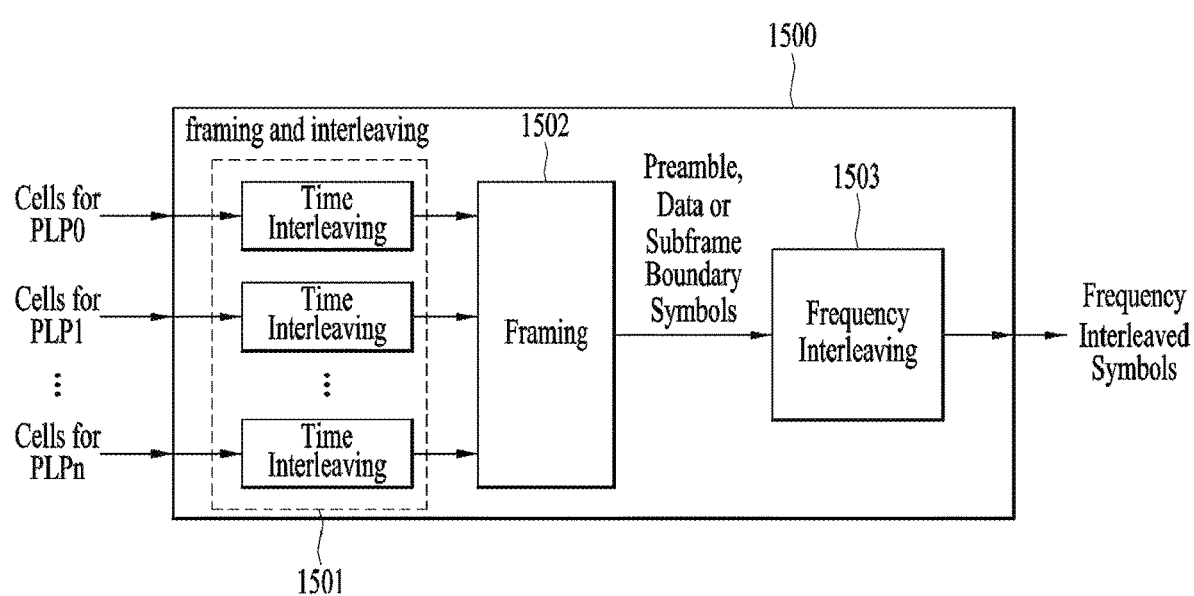
FIG. 5 is a detailed block view illustrating a frame building block of a transmission system according to one embodiment of the present disclosure.

FIG. 5 is a schematic block view illustrating one embodiment of a frame building block 1500 of a transmission system according to one embodiment of the present disclosure. The frame building block 1500 may include a time interleaving block 1501 that includes n time interleavers to perform time interleaving per PLP, a frame builder 1502 for generating a signal frame based on PLPs output from one or more time interleavers of the time interleaving block 1501, and a frequency interleaver 1503 for performing frequency interleaving for the output of the frame builder 1502.

Next, a time interleaving procedure of the nth PLP will be described in detail. Since a time interleaving procedure of the other PLPs may be understood with reference to the time interleaving procedure of the nth PLP which will be described below, its detailed description will be omitted in the present disclosure.

Figure 6A:
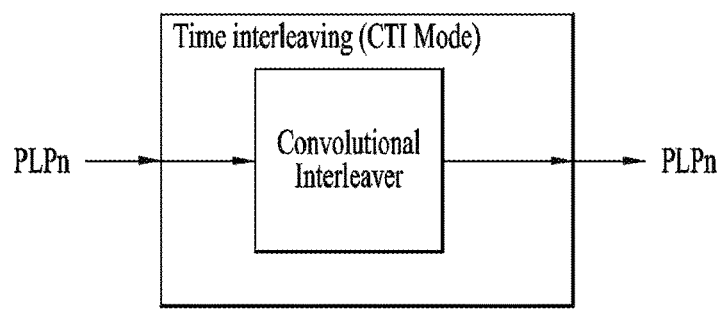
FIGS. 6(a) and 6(b) are schematic block views illustrating a time interleaver of a CTI mode and a time interleaver of an HTI mode according to one embodiment of the present disclosure.

FIG. 6(a) is a schematic block view illustrating a convolution time interleaver of a CTI mode applied to the nth PLP of the present disclosure. That is, the convolution time interleaver performs convolutional interleaving by receiving a sequence of cells from the first BICM block 1200 or the LDM processor 1300. Signaling information related to the convolutional time interleaver is signaled to L1D_plp_CTI_depth field, L1D_plp_CTI_start_row field, and L1D_plp_CTI_fec_block_start field, and a detailed description of each field will be given later.

Figure 6B:
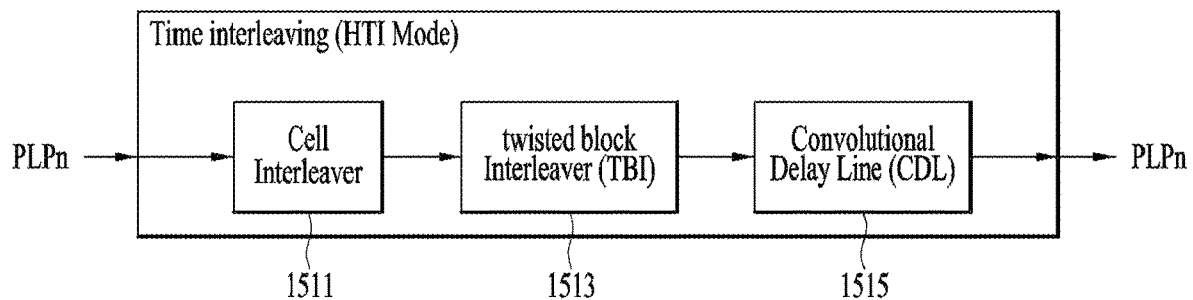
Figure 7:
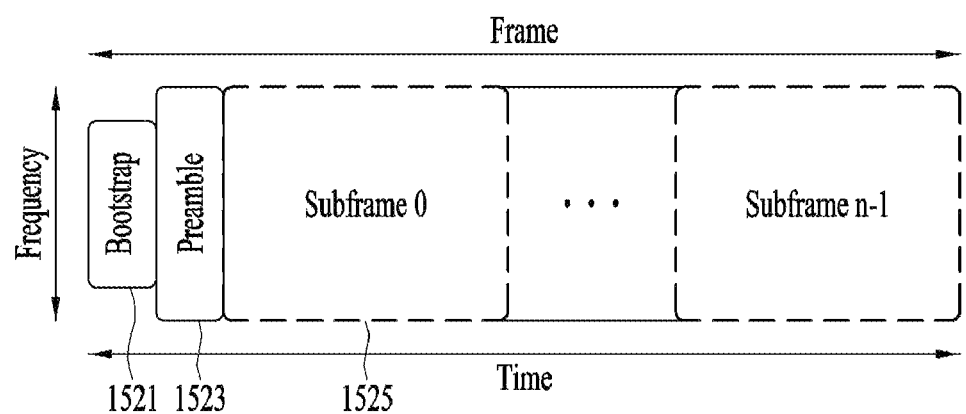
FIG. 7 is a view illustrating a structure of a signal frame according to one embodiment of the present disclosure.

FIG. 6(b) is a schematic block view illustrating a hybrid time interleaver for an HTI mode applied to the nth PLP of the present disclosure, wherein the hybrid time interleaver includes a cell interleaver 1511, a block interleaver 1513, and a delay line 1515 as one embodiment. At this time, the block interleaver 1513 is also referred to as a twisted block interleaver (TBI), and the delay line 1515 is also referred to as a convolutional delay line (CDL) or convolutional interleaver.

The cell interleaver 1511 performs interleaving for cells within each FEC block by receiving input cells on a basis of FEC blocks and arranges the interleaved cells in TI blocks. Cell interleaving in the cell interleaver 1511 is performed in such a manner that the FEC blocks are linearly written in the memory and pseudo-randomly read. At this time, in one embodiment, permutation sequence used to pseudo-randomly read the FEC blocks linearly written in the memory is changed per FEC block in the TI block, and different permutation sequences are generated by shifting one permutation sequence.

However, in the present disclosure, the cell interleaver 1511 is selectively used, and whether to use the cell interleaver 1511 is signaled to L1D_plp_HTI_cell_interleaver field which is a parameter included in the L1-detail signaling data.

In the present disclosure, one TI block includes one or more cell interleaved FEC blocks (in this case, L1D_plp_HTI_cell_interleaver field value is 1), or includes one or more FEC blocks directly output from the first BICM block 1200 (in this case, L1D_plp_HTI_cell_interleaver field value is 0) as one embodiment.

The block interleaver 1513 performs intra-subframe interleaving by twisted block interleaving the TI blocks.

The twisted block interleaving is performed in such a manner that input cells are serially written in the memory in a column wise direction and read in a diagonal-wise direction from the first row (right side along a row starting from the leftmost column) to the last row.

Particularly, the block interleaver 1513 according to one embodiment of the present disclosure writes the first FEC block in the first row of the time interleaving memory in a column direction, writes the second FEC block in a subsequent row, and writes the other FEC blocks within the TI block in the same manner.

At this time, if the number $N_{FEC\_TI\_MAX}$ of columns of the memory of the block interleaver 1513 is greater than the number $N_{FEC\_TI}(n,s)$ of FEC blocks input for block interleaving, a virtual FEC block is included in the memory. Therefore, the number of virtual FEC blocks included in one TI block is defined as $N_{FEC\_TI\_Diff}(n,s)=N_{FEC\_TI\_MAX}-N_{FEC\_TI}(n,s)$. That is, the virtual FEC block is considered to perform the same twisted block interleaving operation between TI blocks having different number of FEC blocks. Therefore, $N_{FEC\_TI\_Diff}(n,s)\neq 0$ means that the number of FEC blocks (or columns) between TI blocks is varied depending on a cell rate. In one embodiment of the present disclosure, virtual cells which belong to the virtual FEC block are skipped without being read during a reading procedure.

In one embodiment of the present disclosure, virtual FEC blocks included in one TI block is located ahead data FEC blocks included in the same TI block in the memory. This is to allow the receiver to achieve time deinterleaving by using a single memory.

At this time, a procedure of reading cells written in the memory in an interleaving array in a diagonal wise direction is performed by calculating positions of data and virtual cells.

The delay line 1515 performs inter-subframe interleaving for cells of the block interleaved TI blocks. As a result, one block interleaved TI block is spread to several subframes. At this time, the delay line 1515 is selectively used, and whether to use the delay line 1515 is signaled to L1D_plp_HTI_inter_subframe field which is a parameter included in the L1-detail signaling data as one embodiment.

In the present disclosure, the FEC blocks input to the time interleaver 1501 may be grouped into interleaving frames (IFs). The interleaving frames are independent from physical layer frames. At this time, the number $N_{BLOCK\_IF}(n)$ of FEC blocks within IF may be changed within the range from minimum 1 to maximum $N_{BLOCK\_IF\_MAX}$, and the number of FEC blocks may be changed between IFs. Information related to the number of FEC blocks within IF is signaled to L1D_plp_HTI_num_ti_block field of the L1-detail signaling data.

At this time, each IF may directly be mapped into one subframe or spread into a plurality of subframes. Each IF may be divided into one or more TI blocks $N_{TI}$, and at this time, the TI block is a basic unit for the operation of the cell interleaver 1511, the block interleaver 1513 and the delay line 1515. The number of TI blocks within one IF block may include different number of FEC blocks.

In the intra-subframe interleaving mode (that is, L1D_plp_HTI_inter_subframe field=0), one IF may include one or more TI blocks, and TI blocks within IF may include their respective number of FEC blocks. That is, in the intra-subframe interleaving mode, one IF is mapped into one subframe, and if the interleaving frame includes one or more TI blocks, a transmission bit rate of the PLP may be enhanced. At this time, the number of TI blocks per interleaving frame is signaled to L1D_plp_HTI_num_ti_block field of the L1-detail signaling data.

On the other hand, in the inter-subframe interleaving mode (that is, L1D_plp_HTI_inter_subframe field=1), one IF may be spread and mapped into a plurality of subframes, and one IF includes one TI block as one embodiment. This inter-subframe interleaving mode may improve time diversity throughput with respect to a low transmission data service. At this time, the number of subframes for which one IF is spread is signaled to L1D_plp_HTI_num_ti_block field of the L1-detail signaling data.

Also, if the L1D_plp_HTI_num_ti_block field value is 1, one TI block is mapped into one subframe regardless of the L1D_plp_HTI_inter_subframe field value.

As described above, the HTI mode provides intra-subframe interleaving and inter-subframe interleaving (optional).

Data time interleaved by the time interleaver 1501 are input to the frame builder 1502.

In one embodiment of the present disclosure, time interleaving is not performed for L1 signaling data.

The data input to the frame builder 1502 are data of one or more PLPs in the form of a cell, and in the frame builder 1502, input cells are mapped into cells of data symbols of each subframe within a signal frame. Also, the frame builder 1502 receives L1 signaling data in the form of a cell from an L1 signaling processor 1700, and the input cells are mapped into cells of preamble symbol(s) of a preamble within the corresponding signal frame. The outputs of the frame builder 1502 are frame symbols. The frame symbols indicate a set of a frequency domain prior to pilot insertion of the OFDM generation block 1600 and optional frequency interleaving, and are transformed (that is, modulated) to time domain OFDM symbols through IFFT and guard interval insertion of the OFDM generation block 1600.

FIG. 10 is a view illustrating a signal frame according to one embodiment of the present disclosure. A preamble area 1523 and a data area 1525 are made by the frame builder 1502. A bootstrap area 1521 is made by the OFDM generation block 1600.

In the present disclosure, one subframe includes a set of time-frequency resources within the signal frame. Particularly, one subframe spans a full range of carriers configured in a frequency dimension, and includes an integer number of OFDM symbols in a time dimension.

In one embodiment of the present disclosure, waveform attributes of a subframe include a subframe type. In one embodiment, at least one of an FFT size, a guard interval length, a scattered pilot pattern, the number (that is, NoC) of useful carriers, whether to use a frequency interleaver, and whether the corresponding subframe is SISO mode, MISO mode or MIMO mode is included in the waveform attributes. If one subframe is configured for MISO, waveform attributes for defining a subframe type of the corresponding subframe additionally include the number of transmitters and a time domain span of filters. In one embodiment of the present disclosure, the waveform attributes of the subframe are not changed for the duration of the subframe. Also, the signal frame may include a plurality of subframes of the same subframe type, and/or may include a plurality of subframes of different subframe types. Subframes within the same signal frame may include a different number of OFDM symbols. In one embodiment, the FFT size and a signaled GI length of the preamble are the same as FFT size and a signaled GI length of the first subframe of the signal frame.

In one embodiment, a specific PLP is mapped into only subframes of the same subframe type. At this time, if a specific PLP is time interleaved through a plurality of subframes within RF channel, these subframes may be the same subframe type, and may be located in the same signal frame and/or different signal frames. This means that subframes more than the PLPs may exist in one frame. At this time, although the number of subframes in one frame may exceed the maximum number of PLPs, the maximum number of PLPs is determined regardless of the number of subframes in one frame as one embodiment.

In one embodiment of the present disclosure, a length of the signal frame is designated in one type of a time-aligned frame and a symbol-aligned frame. The entire frame length in the time-aligned frame is equal to a sum of a bootstrap 1521, a preamble 1523 and subframes 1525. In one embodiment, no additional sample excluding a length signaled for a guard interval length of OFDM symbols is inserted to the symbol-aligned frame. The time-aligned frame may be identified by setting L1B_frame_length_mode field included in the L1-basic signaling data of the L1 signaling data to 0, and the symbol-aligned frame may be identified by setting the L1B_frame_length_mode field to 1.

In one embodiment of the present disclosure, all subframes include at least 4×Dy data and subframe boundary symbols. In this case, Dy is a parameter for designating a scattered pilot length of a time direction. That is, Dx indicates a spaced distance between scattered pilots in a time direction.

In the present disclosure, the number NoC of carriers is defined by the following equation, NoC=NoC$_{max}$−C$_{red\_coff}$×C$_{unit}$. In this case, C$_{red\_coff}$ is a coefficient multiplied by a control unit C$_{unit}$ to determine the number of carriers to be reduced to a positive integer value. C$_{red\_coff}$ has a value from 0 to 4, which is signaled to parameters included in the L1 signaling data, for example, L1B_preamble_reduced_carriers field, L1D_reduced_carriers field and L1B_first_sub_reduced carriers field. The NOC$_{max}$ indicates the maximum number of NoC, C$_{unit}$ indicates a control unit, and a value of C$_{unit}$=max(Dx) is 96 in case of 8K FFT, 192 in case of 16K FFT and 384 in case of 32K FFT. In this case, Dx is a parameter for designating a scattered pilot length of a frequency direction. That is, Dx indicates a spaced distance between scattered pilots in a frequency direction.

In the present disclosure, each subframe is configured in the order of subframe boundary symbol (none or one), data symbols, subframe boundary symbol (none or one). That is, the subframe boundary symbols may not exist in the corresponding subframe. In this case, the corresponding subframe includes data symbols only. In one embodiment of the present disclosure, the subframe boundary symbols have scattered pilots of density higher than data symbols so that the receiver may facilitate exact channel estimation.

In one embodiment of the present disclosure, one data symbol has a scattered pilot density in accordance with a scattered pilot pattern of a corresponding subframe. The scattered pilot pattern is signaled to the L1 signaling data.

In one embodiment, a sum of data included in the subframe of which FFT size is 32K and the number of subframe boundary symbols is always an even number except the first subframe. Also, in the first subframe, a sum of a preamble, a subframe boundary and the number of data symbols is an even number as one embodiment.

Also, in one embodiment, if the subframe boundary symbol exists at the start of the subframe, all data symbols within the same subframe are located behind the subframe boundary symbol. And, if the subframe boundary symbol exists at the end of the subframe, the corresponding boundary symbol is located behind the last data symbol of the same subframe.

In the present disclosure, the preamble includes one or more preamble symbols, and transmits L1 signaling data for the corresponding frame.

In one embodiment, FFT size of the preamble symbols, a guard interval length, a scattered pilot pattern, and FEC mode of L1-Basic signaling data are signaled to a preamble-_structure parameter of a bootstrap, and the number Np of the preamble symbols is signaled from the L1 signaling data. In this case, FFT size and guard interval length are equally maintained in all preamble symbols within the frame. Particularly, if the FEC mode of the L1-Basic signaling data is identified, information required for processing the L1-Basic signaling data in the transmission/reception system may be identified.

The maximum number NoC of the first preamble symbols may be used for a given FFT size, whereas NoC of the other preamble symbols may be signaled to L1-basic of the L1 signaling data. Also, in one embodiment, frequency interleaving is always applied to all preamble symbols.

In one embodiment, when the L1 signaling data are mapped into preamble symbol (or symbols), L1-Basic cells are mapped into only available cells of the first preamble symbol, and L1-Detail cells are interleaved and mapped into available cells remaining after mapping L1-Basic cells at the first preamble symbol and available cells of the other preamble symbols. In one embodiment, available cells which are not used for L1-Detail cells at the last preamble symbol are used for preamble data cells.

In one embodiment of the present disclosure, the MISO or MIMO scheme is not applied to any preamble symbol. Meanwhile, in one embodiment, although the LDM scheme is not applied to any cells of the preamble for transmitting L1-Basic and L1-Detail data, the LDM scheme is applied to payload data cells transmitted to the last preamble symbol.

Also, in the present disclosure, in accordance with exact subframe configuration and PLP multiplexing parameters, PLP data are fully or partially mapped into available data cells within the subframe. However, if PLP data are not mapped into all of the available data cells, empty data cells (that is, unoccupied data cells) are generated. At this time, in one embodiment of the present disclosure, to make sure of a constant transmission power, pseudo-random (PN) dummy modulation values are allocated to the empty data cells.

In one embodiment of the present disclosure, two types of PLPs exist, wherein one of the types is a non-dispersed PLP type, and the other one type is a dispersed PLP type. In one embodiment of the present disclosure, each PLP has one of the non-dispersed PLP and the dispersed PLP. At this time, in one embodiment of the present disclosure, PLP of the enhanced layer of the LDM scheme is excluded.

In one embodiment of the present disclosure, data cells of the non-dispersed PLP are allocated to contiguous data cell indexes of a corresponding subframe. That is, all data cell indexes between the lowest data cell index allocated to the non-dispersed PLP and the highest data cell index allocated to the same non-dispersed PLP are allocated to the same non-dispersed PLP.

In one embodiment of the present disclosure, the dispersed PLP is divided into two or more sub-slices. Data cells within any one sub-slice of the dispersed PLP are allocated to contiguous data cell indexes of the corresponding subframe. However, in one embodiment, two contiguous sub-slices within the same dispersed PLP do not have contiguous data cell indexes. That is, a difference between the lowest data cell index allocated to the sub-slice of the dispersed PLP and the highest data cell index allocated to a previous sub-slice of the same dispersed PLP should be greater than 1.

In one embodiment, all sub-slices (except the last sub-slice) of a specific dispersed PLP within one subframe have the same non-zero size. A size of the last sub-slice of a specific dispersed PLP within one subframe is greater than 0 and smaller than or equal to sizes of the other sub-slices of the specific dispersed PLP within one subframe. In one embodiment, a sub-slice interval between the lowest data cell index of a sub-slice of the dispersed PLP and the lowest data cell index of next sub-slice of the same dispersed PLP is identical for all sub-slices of the corresponding PLP within the subframe. At this time, the sub-slice interval is signaled to L1D_plp_subslice_interval field of the L1 signaling data.

The number of sub-slices for one dispersed PLP within one subframe, a sub-slice size therefor, and a sub-slice interval therefor are independent from the number of sub-slices of all other dispersed PLP within the same subframe, a sub-slice size therefor, and a sub-slice interval therefor, and are signaled independently. In addition, the number of sub-slices for one dispersed PLP within one subframe, a sub-slice size therefor, and a sub-slice interval therefor are independent from the number of sub-slices of the same PLP included in all other subframes, a sub-slice size therefor, and a sub-slice interval therefor, and are signaled independently. If the LDM scheme is used, the number of sub-slices and a sub-slice interval are signaled to only dispersed core layer PLPs. The non-dispersed PLP is not sub-sliced, and does not have any related sub-slicing parameters.

In the present disclosure, a type of a PLP is signaled to L1D_plp_type field of the L1 signaling data. At this time, in one embodiment, the L1D_plp_type field is independently included in each subframe having the corresponding PLP. One PLP may use different PLP types for two different subframes. That is, one PLP does not have the same type for two different subframes having the corresponding PLP. In one embodiment, if the LDM scheme is used, the L1D_plp_type field exists in only a core layer PLP. That is, since a PLP of the enhanced layer does not have a specific PLP type, the L1D_plp_type field does not exist.

In the present disclosure, a starting position of the PLP is signaled to L1D_plp_start field of the L1 signaling data, and the L1D_plp_start field indicates the starting position of the PLP within a subframe regardless of the PLP type. The starting portion of the PLP is an index of a data cell allocated to hold a first data cell value of the corresponding PLP.

In the present disclosure, a length of the PLP is signaled to L1D_plp_size field of the L1 signaling data, wherein the L1D_plp_size field indicates a total number of data cells included in the corresponding PLP at the current subframe.

A starting position and length of a specific PLP at a specific subframe are independent from a starting position and length of the same PLP at the other subframes, and are signaled independently. In one embodiment, a starting position and length of all PLPs existing at a subframe are signaled regardless of a use of the LDM scheme.

In the present disclosure, all data cells allocated to a PLP exist within a range of valid data cell indexes of the current frame in accordance with cell allocation parameters (e.g., starting position, length, and sub-slicing parameters) of the PLP. In this case, the sub-slicing parameters are included in the dispersed PLP only. Also, each data cell within the subframe is allocated to a maximum one PLP per LDM layer.

At least one of single PLP multiplexing, layered division multiplexing (LDM), time division multiplexing (TDM), frequency division multiplexing (FDM), and time-frequency division multiplexing (TFDM) may be applied to the present disclosure as a multiplexing scheme.

As an example of the single PLP multiplexing, if only one core layer PLP exists, the outputs of the time interleaver may be mapped into data symbols within a frame in due order.

In one embodiment, the TDM scheme employs a non-dispersed PLP for concatenation of a plurality of PLPs within a subframe in time.

If the LDM scheme is used, each PLP within the subframe is categorized into the core layer PLP or the enhanced layer PLP, and a value for identifying each layer is signaled to the L1D_plp_layer field of the L1 signaling data. Each core layer PLP within the subframe indicates one time interleaver group. Therefore, each core layer PLP exactly belongs to each time interleaver group within the subframe, and is directly related to the L1 signaling data that include time interleaving parameters for the corresponding PLP. Meanwhile, each enhanced layer PLP is associated with one or more time interleaver groups within the subframe but is not directly associated with the L1 signaling data related to time interleaving. Therefore, in one embodiment, the enhanced layer PLP follows time interleaving of time interleaver group (or groups) related therewith. In one embodiment of the present disclosure, the time interleaver groups are indexed within the subframe in accordance with the order of related core layer PLPs which are indicated in control signaling for the subframe.

The FDM scheme is obtained by configuring a plurality of PLPs within each subframe as dispersed PLPs. In one embodiment, a sub-slice interval of each dispersed PLP is configured by the number of data cells per data symbol for current subframe configuration. Also, FDM effect may be obtained only if frequency interleaving is not used at the subframe.

The TFDM scheme is configured by properly setting a PLP size and sub-slice related parameters in a method used to configure FDM. Also, one or more non-dispersed PLPs may selectively be included in a TFDM subframe.

Next, the frequency interleaver 1503 of the frame building block 1500 will be described.

In the present disclosure, frequency interleaving is optional for data symbols included in the subframe but is essential for preamble symbols included in the preamble. That is, frequency interleaving may be used or not for data cells within the data symbols and subframe boundary symbols. Whether to use frequency interleaving is signaled to L1D_frequency_interleaver field of the L1 signaling data. The frequency interleaver 1503 is operated for data cells within one OFDM symbol.

The frequency interleaver 1503 according to the present disclosure may provide frequency diversity by randomly interleaving input cells. Also, the frequency interleaver 1503 may be operated for data corresponding to an OFDM symbol pair comprised of two sequential OFDM symbols or data corresponding to one OFDM symbol by using different interleaving seed orders to obtain maximum interleaving gain in a single frame.

At this time, cells input to the frequency interleaver 1503 may be defined as follows.

$X_{m,l} = (x_{m,l,0}, x_{m,l,1}, x_{m,l,2}, \ldots, x_{m,l,N_{data}-1})$, where $x_{m,l,q}$ indicates a 0 cell index of l ($l=0, \ldots, L_{Fm}-1$)th symbol of the mth subframe. Also, $L_{Fm}$ indicates preamble, data and the number of subframe boundary symbols included in the first subframe (m=1) or the number of data and subframe boundary symbols of the second subframe and a subsequent subframe m. $N_{data}$ indicates the number of data cells within a symbol. $A_{m,l} = (a_{m,l,0}, a_{m,l,1}, a_{m,l,2}, \ldots a_{m,l,N_{data}-1})$ indicates output cells of the frequency interleaver 1503. In this case, $A_{m,l}$ indicates the first symbol of the mth subframe. In one embodiment, at the subframe boundary symbols, frequency interleaving is operated for all of null and active cells.

The frequency interleaver 1503 needs interleaving sequence to perform frequency interleaving for input cells. The interleaving sequence means interleaving address or frequency interleaving sequence. For convenience, interleaving sequence, interleaving address and frequency interleaving sequence will be used together.

That is, in the present disclosure, the frequency interleaver 1503 may perform frequency interleaving by applying a difference interleaving sequence to each cell of at least one OFDM symbol, that is, each OFDM symbol or two paired OFDM symbols (pair-wise OFDM symbol or each OFDM symbol pair), thereby acquiring frequency diversity.

To this end, the frequency interleaver 1503 includes a frequency interleaving address generator for generating interleaving sequence in one embodiment.

The frequency interleaving address generator may include a basic interleaving sequence generator, a symbol offset generator, a computation operator, and an address check block. The basic interleaving sequence generator may include a basic random address generator and a wire permutation block. The basic interleaving sequence generator may further include 1-bit toggle block, and is toggled as the most significant bit of the basic interleaving sequence in accordance with a control of a control unit.

In this case, the basic interleaving sequence generator in accordance with FFT size, $N_r$ bit binary word $R'_i$ is generated through the following process.

i=0,1: $R'_i[N_r-2, N_r-3, \ldots, 1, 0] = [0, 0, \ldots, 0, 0]$,
i=2: $R'_i[N_r-2, N_r-3, \ldots, 1, 0] = [0, 0, \ldots, 0, 1]$,
$2 < i < M_{max}$: $\{R'_i[N_r-3, N_r-4, \ldots, 1, 0] = R'_{i-1}[N_r-2, N_r-3, \ldots, 2, 1]\}$;

8K FFT size: $R'_i[11] = R'_{i-1}[0] \oplus R'_{i-1}[1] \oplus R'_{i-1}[4] \oplus R'_{i-1}[6]$,
16K FFT size: $R'_i[12] = R'_{i-1}[0] \oplus R'_{i-1}[1] \oplus R'_{i-1}[4] \oplus R'_{i-1}[5] \oplus R'_{i-1}[9] \oplus R'_{i-1}[11]$,
32K FFT size: $R'_i[13] = R'_{i-1}[0] \oplus R'_{i-1}[1] \oplus R'_{i-1}[2] \oplus R'_{i-1}[12]\}$.

In this case, $\oplus$ indicates XOR operation, $N_r = \log_2 M_{max}$, parameter $M_{max}$ is defined in Table 1 below. That is, Table 1 shows a value of $M_{max}$ according to FFT mode, that is, FFT size.

TABLE 1

| FFT Size | $M_{max}$ |
|---|---|
| 8K | 8192 |
| 16K | 16384 |
| 32K | 32768 |

In one embodiment, the wire permutation block changes the order of bits within a sequence generated from the basic random address generator. In this case, the wire permutation block may change the order of bits by using a preset wire permutation table (that is, one of Table 2 to Table 4).

That is, when FFT size is 8K, the wire permutation block changes the bit order of the basic random sequence of 13 bits by using a wire permutation table previously set in the following Table 2 and then outputs the result to the computation operator. That is, in case of the 8K FFT size, wire permutations different per data cells corresponding to each symbol constituting an OFDM symbol pair are used in one embodiment. In other words, two different wire permutations for shuffling an output vector of the basic random address generator corresponding to odd and even numbered symbols constituting the OFDM symbol pair are applied to the 8K FFT size. This means that different wire permutations generate different interleaving sequences for one symbol pair even though the same basic random address generator is used for one symbol pair.

The following Table 2 shows a relation between a bit word $R'_i$ output from the basic random address generator and a bit word $R_i$ of which position is changed by a wire permutation in the wire permutation block when FFT size is 8K. That is, in Table 2, the first column indicates a bit position of an input bit sequence, and the second and third columns indicate bit positions changed by the wire permutation. The bit position of the second column is applied to the even numbered symbol of the input OFDM symbol pair, and the bit position of the third column corresponds to the odd numbered symbol of the input OFDM symbol pair.

TABLE 2

| $R_i$ bit positions | 11 | 10 | 9 | 8 | 7 | 6 | 5 | 4 | 3 | 2 | 1 | 0 |
|---|---|---|---|---|---|---|---|---|---|---|---|---|
| $R_i$ bit positions (even) | 5 | 11 | 3 | 0 | 10 | 8 | 6 | 9 | 2 | 4 | 1 | 7 |
| $R_i$ bit positions (odd) | 8 | 10 | 7 | 6 | 0 | 5 | 2 | 1 | 3 | 9 | 4 | 11 |

When FFT size is 16K, the wire permutation block changes the bit order of the basic random sequence of 14 bits by using a wire permutation table previously set in the following Table 3 and then outputs the result to the computation operator. In case of the 16K FFT size, the same wire permutation table may be used for data cells corresponding to each symbol constituting an OFDM symbol pair, or wire permutations different per data cells corresponding to each symbol constituting an OFDM symbol pair may be used. In one embodiment, two different wire permutations for shuffling an output vector of the basic random address generator corresponding to odd and even numbered symbols constituting the OFDM symbol pair are applied to the 16K mode. This means that different wire permutations generate different interleaving sequences for one symbol pair even though the same basic random address generator is used for one symbol pair.

The following Table 3 shows a relation between a bit word $R'_i$ output from the basic random address generator and a bit word $R_i$ of which position is changed by a wire permutation in the wire permutation block when FFT size is 16K. That is, in Table 3, the first column indicates a bit position of an input bit sequence, and the second and third columns indicate bit positions changed by the wire permutation. In the same manner as the 8K FFT size, the bit position of the second column is applied to the even numbered symbol of the input OFDM symbol pair, and the bit position of the third column corresponds to the odd numbered symbol of the input OFDM symbol pair.

TABLE 3

| $R_i$ bit positions | 12 | 11 | 10 | 9 | 8 | 7 | 6 | 5 | 4 | 3 | 2 | 1 | 0 |
|---|---|---|---|---|---|---|---|---|---|---|---|---|---|
| $R_j$ bit positions (even) | 8 | 4 | 3 | 2 | 0 | 11 | 1 | 5 | 12 | 10 | 6 | 7 | 9 |
| $R_j$ bit positions (odd) | 7 | 9 | 5 | 3 | 11 | 1 | 4 | 0 | 2 | 12 | 10 | 8 | 6 |

When FFT size is 32K, in one embodiment, the wire permutation block changes the bit order of the basic random sequence of 15 bits by using a wire permutation table previously set in the following Table 4 and then outputs the result to the computation operator.

In case of the 32 FFT size, in one embodiment, the same wire permutation table is used for data cells corresponding to each symbol constituting an OFDM symbol pair. This means that a single wire permutation is used for the 32K FFT size and the same interleaving sequence is used for every symbol pair.

The following Table 4 shows a relation between a bit word $R'_1$ output from the basic random address generator and a bit word $R_j$ of which position is changed by a wire permutation in the wire permutation block when FFT size is 32K. In Table 4, the first column indicates a bit position of an input bit sequence, and the second column indicates a bit position changed by the wire permutation. That is, the bit position of the second column is equally applied to the even numbered symbol and the odd numbered symbol of the input OFDM symbol pair.

TABLE 4

| $R_i$ bit positions | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| $R_j$ bit positions | 6 | 5 | 0 | 10 | 8 | 1 | 11 | 12 | 2 | 9 | 4 | 3 | 13 | 7 |

The changed bit position of Table 2 to Table 4 above is one embodiment for assisting understanding of the present disclosure, and the bit position of each FFT size may be changed by a designer.

In the present disclosure, two different wire permutations are used for 8K and 16K FFT sizes, as listed in Table 2 and Table 3 above. That is, a specific wire permutation used for a given data symbol l is determined by values of (l mod 2) in Table 2 and Table 3. This indicates that different interleaving sequences are used for every symbol.

On the other hand, a single permutation is used for 32K FFT size as listed in Table 4. This indicates that different interleaving sequences are used for every symbol pair.

In one embodiment, the symbol offset generator generates a new offset sequence per two OFDM symbols. That is, the symbol offset generator operates on an OFDM symbol pair basis. That is, a symbol offset value is constant at two contiguous symbols (2n and 2n−1).

In one embodiment, the computation operator performs exclusive OR (XOR) computation by receiving the output of the basic interleaving sequence generator and the output of the symbol offset generator. The output sequence of the computation operator becomes interleaving sequence (that is, interleaving address).

The address check block validates whether interleaving sequence (that is, interleaving address) output from the computation operator is within the range of allowable carrier indexes for a specific OFDM symbol which is subjected to frequency interleaving.

The address check block validates whether the output of the computation operator exceeds the number of entire data cells within a symbol, and disregards the output if the generated address value is greater than the number of data cells.

As described above, interleaving sequence of a length corresponding to a corresponding FFT size is generated per FFT size, and a procedure of generating interleaving sequence is a little different per FFT size.

Preamble symbol(s) and data symbols within the signal frame output from the first frame building block 1500 are input to the first OFDM generator 1600.

In one embodiment, the first OFDM generator 1600 includes a pilot insertion unit 1601, a MISO processor 1602, an IFFT unit 1603, a guard interval insertion unit 1605, and a bootstrap insertion unit 1606. A peak-to-average-power reduction (PAPR) unit 1604 may be inserted between the IFFT unit 1603 and the guard interval insertion unit 1605. This is optional.

Symbols input to the first OFDM generator 1600 are transformed to time domain OFDM symbols after pilot insertion, MISO processing, PAPR processing and IFFT, and then are transmitted to the receiver through guard interval insertion and bootstrap symbol(s) insertion.

Various cells in the signal frame are modulated to reference information known to the transmitter/receiver. Cells including reference information may be transmitted to a boosted power level. In the present disclosure, these cells will be referred to as pilots.

Types of pilots inserted by the pilot insertion unit 1601 include a scattered pilot (SP), a continual pilot (CP), an edge pilot, a preamble pilot, and a subframe boundary pilot. These pilots may diversely be used for channel synchronization, channel estimation, phase noise estimation, etc.

The following Table 5 shows examples of pilot types that may be applied in accordance with a symbol type of the present disclosure.

TABLE 5

| Symbol Type | Preamble Pilot | Scattered Pilot | Subframe Boundary Pilot | Common Continual Pilot | Additional Continual Pilot | Edge Pilot |
|---|---|---|---|---|---|---|
| Preamble | ✓ | | | ✓ | | |
| Data | | ✓ | | ✓ | ✓ | ✓ |
| Subframe Boundary | | | ✓ | ✓ | ✓ | ✓ |

For example, as illustrated in Table 5 above, the scattered pilot cells are transmitted by being inserted to all data symbols, and are not inserted to preamble symbol(s) and subframe boundary symbol(s). A scattered pilot pattern is signaled to the L1 signaling data.

In the present disclosure, an amplitude of the scattered pilot may be calculated from a parameter L1D_scattered_pilot_boost field value and the scattered pilot pattern.

In the present disclosure, continual pilot cells are transmitted by being inserted to preamble symbols, and all symbols of a frame that includes random subframe boundary symbols. The CP positions are determined from additional position of additional CP set and a common CP set. At this time, the common CP set is a pilot designed so as not to overlap the scattered pilot, and the additional CP set is a pilot designed such that the number of useful data carriers within every data symbol is constant. Therefore, the additional CP set may be overlapped with the scattered pilots as the case may be. That is, the additional CP set may be overlapped with the scattered pilots within the symbol in accordance with FFT size and pilot pattern. In one embodiment of the present disclosure, positions of the common CP used for 16K FFT size and 8K FFT size are calculated from the positions of the common CP set of the 32K FFT size.

In the present disclosure, the edge pilot is applied to all symbols within the signal frame except the preamble symbol(s).

In one embodiment of the present disclosure, the preamble pilots relatively more than the scattered pilots inserted to the subframe for equalization of an exact preamble signal are inserted. Alternatively, in one embodiment, preamble pilots inserted to the preamble of the frame are selected to be dense equally to the scattered pilots of the first subframe of the same frame.

In one embodiment of the present disclosure, the preamble pilots relatively more than the scattered pilots inserted to the subframe for equalization of an exact preamble signal are inserted. Alternatively, in one embodiment, preamble pilots inserted to the preamble of the frame are selected to be dense at least equally to the scattered pilots of the first subframe of the same frame. In one embodiment, the pilot cells of the preamble symbol(s) are transmitted at a boosted power level.

In the present disclosure, the pilots for the subframe boundary symbols are denser than pilots for surrounding normal data symbols of the same subframe.

The symbols into which the pilots are inserted by the pilot insertion unit 1601 are input to the MISO processor 1602. A transmit diversity code filter set (TDCFS) in the MISO processor 1602 is MISO pre-distortion technology that artificially decorrelates signals from a plurality of transmitters in a single frequency network to minimize potential destructive interference, and this technology is applied to the output of the pilot insertion unit 1601 in one embodiment.

In one embodiment of the present disclosure, MISO is applied to only OFDM symbols of the subframe, and is not applied to bootstrap or preamble. Whether to apply MISO is signaled to L1B_first_sub_miso field and L1D_miso field of the L1 signaling data.

In the present disclosure, the IFFT unit 1603 transforms data symbols and preamble symbol(s) of the signal frame to symbols of the time domain. All symbols include data and reference information (that is, pilot), and each symbol includes a set of NoC carriers.

The PAPR unit 1604 is optional, and may reduce a PAPR of symbols transformed to time domain symbols in the IFFT unit 1603 by using tone reservation (TR) and/or ACE (active constellation extension) scheme.

The guard interval insertion unit 1605 inserts a guard interval to each symbol. In one embodiment of the present disclosure, a guard interval is inserted before a useful data interval of each symbol.

The bootstrap insertion unit 1606 forms a bootstrap by inserting bootstrap symbol(s) to the start of each signal frame.

Next, a bootstrap applied to the present disclosure will be described. In the present disclosure, the bootstrap provides a universal entry point through a digital transmission signal, and uses a fixed configuration (e.g., sampling rate, signal bandwidth, subcarrier spacing, and time domain structure) known to all receivers.

In the present disclosure, the bootstrap includes one or more symbols, and the first symbol (that is, bootstrap symbol 0) starts as a synchronization signal at a start part of each frame period to enable signal discovery, coarse synchronization, frequency offset estimation, and initial channel estimation. The other symbol(s) includes control signaling (hereinafter, referred to as bootstrap signaling information) for reception and decoding of the corresponding frame.

In the present disclosure, a bootstrap version is categorized into a major version number and a minor version number. The major version is marked in bootstrap_major_version as a code, and the minor version is marked in bootstrap_minor_version as a code. At this time, in one embodiment, a Zadoff-Chu (ZC) root and a PN sequence seed are used to generate a base encoding sequence for bootstrap symbol contents. The major version number is signaled by selecting ZC root corresponding to a specific signal type. The minor version number is signaled by selecting a PN sequence seed appropriate to exist within a specific major version.

In the present disclosure, values used for each bootstrap symbol are ZC sequences modulated by a PN sequence in a frequency domain. The ZC root and the PN seed signal the major and minor versions of the corresponding bootstrap as described above.

The ZC sequence modulated to the PN sequence has a complex number sequence, and is applied to each subcarrier in IFFT input. At this time, the PN sequence applies phase rotation to individual complex number subcarriers, whereby preferable constant amplitude zero auto-correlation (CA-ZAC) characteristic of the original ZC sequence is maintained. The PN sequence provides additional signal separation between cyclic shifts of the same root sequence by suppressing spurious peaks in an autocorrelation response.

In the present disclosure, the bootstrap symbols have two types of structures in accordance with their positions. That is, in one embodiment, the bootstrap symbol 0, that is, initial symbol is used for synchronization detection and uses a CAB structure, and the other bootstrap symbol(s) use(s) a BCA structure.

Control signaling transmitted by being signaled to the bootstrap symbols will be referred to as bootstrap signaling information.

In one embodiment of the present disclosure, information signaled to bootstrap symbol 1 includes an ea_wake_up_1 field, a min_time_to_next field, and a system_bandwidth field.

The ea_wake_up_1 field is an emergency alarm wakeup field, and indicates whether an emergency status exists.

The min_time_to_next field displays a minimum time from the start of the current frame A to the start of next frame B of the same major/minor version as the current frame A.

The system_bandwidth field indicates a system bandwidth used for a part subsequent to bootstrap of a current physical layer frame.

In one embodiment of the present disclosure, information signaled to bootstrap symbol 2 includes an ea_wake_up_2 field and a bsr_coefficient field.

The ea_wake_up_2 field indicates whether an emergency status exists, together with the ea_wake_up_1 field of the bootstrap symbol 1.

The bsr_coefficient field indicates a sampling rate for a signal after bootstrap of the current physical layer frame.

In the present disclosure, information signaled to bootstrap symbol 3 is a preamble_structure field. This field signals a transmission parameter of one or more preamble symbols located next to the last bootstrap symbol.

Meanwhile, the MIMO scheme may be applied to the present disclosure as mentioned above. Particularly, it is assumed that a 2×2 MIMO antennas system is applied. In this case, in one embodiment of the present disclosure, the transmission system includes a first input formatting block 1100, a first BICM block 1200, a MIMO processor 1400, first and second frame building blocks 1500 and 1550, and first and second OFDM generators 1600 and 1650. The MIMO processor 1400 is also referred to as a MIMO precoding unit.

Since the first input formatting block 1100, the first BICM block 1200 except a MIMO demultiplexer 1203 and a second mapper 1205, the first frame building block 1500, and the first OFDM generator 1600 have been described as above, their detailed description will be omitted. Also, since the second frame building block 1550 is configured in the same manner as the first frame building block 1500, the second frame building block 1550 will be understood with reference to the detailed description of the first frame building block 1500 and its detailed description will be omitted. Since the second OFDM generator 1650 is configured in the same manner as the first OFDM generator 1600, the second OFDM generator 1650 will be understood with reference to the detailed description of the first OFDM generator 1600 and its detailed description will be omitted.

Generally, the MIMO technology may increase robustness through additional spatial diversity and/or increase channel capacity by applying a spatial multiplexing scheme for transmitting two different data streams in a single RF channel. Particularly, spatial multiplexing gain is acquired through the MIMO technology only unlike Single-Input Multiple-Output (SIMO)/Multiple-Input Single-Output (MISO), and may overcome limitation of a transmission channel capacity through a single antenna without increase of additional transmission power.

In one embodiment of the present disclosure, the transmitter/receiver uses a cross-polarized antenna having two horizontal/vertical polarities.

The MIMO demultiplexer 1203 is used to split a single cell word stream to double cell word streams for MIMO processing. That is, output bits of the bit interleaver 1202 are split into a first input signal (for example, even numbered vector) and a second input signal (for example, odd numbered vector), wherein the first input signal is output to the first mapper 1204 and the second input signal is output to the second mapper 1205.

Each of the first mapper 1204 and the second mapper 1205 maps an input signal into QAM constellation points having a complex number value on an IQ plane. The first mapper 1204 and the second mapper 1205 will be understood with reference to the description of the aforementioned mapper 2300 and thus their detailed description will be omitted. However, for MIMO processing, the same constellations are used for MIMO in the present disclosure, and the same modulation order is transmitted from two transmitting antennas.

The outputs of the first mapper 1204 and the second mapper 1205 are input to the MIMO processor 1400.

The MIMO processor 1400 precodes a pair of cell symbols which are input thereto, and then outputs the pair of cell symbols. In the present disclosure, the MIMO processor 1400 may use a full-rate spatial multiplexing (FR-SM) scheme for providing capacity increase in accordance with relatively small complexity increase of the MIMO precoding scheme in the receiver. Also, in the present disclosure, MIMO processing is applied at a PLP level.

In one embodiment of the present disclosure, combination of FEC codes having a length of 16200 bits and 256QAM is not allowed in MIMO. Also, in one embodiment of the present disclosure, MIMO processing is not applied to bootstrap and preamble. Also, in one embodiment, MIMO processing is not applied to signaling elements. Also, MIMO is not used together with any one of ACE, LDM and channel bonding.

L1 Signaling

Meanwhile, in the present disclosure, L1 signaling provides information required to configure physical layer parameters. This L1 signaling is split into L1-Basic signaling data and L1-Detail signaling data, and the split data are transmitted to the preamble symbols. In one embodiment of the present disclosure, bootstrap signaling information transmitted to bootstrap symbols may also be included in L1 signaling.

The L1-Basic signaling data is the most basic system signaling information of the system, and defines parameters required for decoding of the L1-Detail signaling data. In one embodiment, a length of L1-Basic signaling data is fixed to 200 bits.

The L1-Detail signaling data defines data context and information required for decoding of the data context in detail. A length of the L1-Detail signaling data is variable from frame to frame.

In FIG. 1, the L1 signaling processor 1700 is a block for performing processing for protection of L1 signaling, and includes L1-Basic processor for performing processing for protection of the L1-Basic signaling data and L1-Detail processor for performing processing for protection of the L1-Detail signaling data.

The L1-Basic processor sequentially performs scrambling, BCH encoding, zero padding, LDPC encoding, parity permutation, repetition/puncturing, zero removing, bit demultiplexing and constellation mapping for the L1-Basic signaling data and then outputs the performed result to the frame building block 1500. Some of these functions may be performed only if a corresponding condition is satisfied, or may be omitted unconditionally. If the MIMO scheme is applied, the L1-Basic signaling data processed by the L1-Basic processor are output to the first and second frame building blocks 1500 and 1550.

The L1-Detail processor sequentially performs segmentation, scrambling, BCH encoding, zero padding, LDPC encoding, parity permutation, repetition/puncturing, zero removing, bit demultiplexing and constellation mapping for the L1-Detail signaling data and then outputs the performed result to the frame building block 1500. The L1-Detail processor may further perform additional parity generation, bit demultiplexing for the generated additional parity data, and constellation mapping for the L1-Detail signaling data. Some of these functions may be performed only if a corresponding condition is satisfied, or may be omitted unconditionally. If the MIMO scheme is applied, the L1-Detail signaling data processed by the L1-Detail processor are output to the first and second frame building blocks 1500 and 1550.

That is, the L1-Basic signaling data and the L1-Detail signaling data are encoded by a concatenation scheme of BCH outer code and LDPC inner code. At this time, to provide various robustness levels suitable for supporting a wide SNR range, protection levels of the L1-Basic signaling data and the L1-Detail signaling data are categorized into seven modes based on LDPC code, modulation order, and shortening/puncturing parameters. In one embodiment, the respective modes haves their respective combinations for LDPC code, modulation order, constellation and shortening/puncturing pattern.

In the present disclosure, the number of information bits in which one encoded block is included is referred to as Ksig. At this time, L1 signaling bits of a Ksig length correspond to one LDPC encoded block. In the present disclosure, since a value of Ksig for the L1-Basic signaling data is fixed to 200 but the number of bits of the L1-Detail signaling data is variable, a value of Ksig value for the L1-Detail signaling data is a variable. Therefore, if the number of bits of the L1-Detail signaling data is greater than a maximum value of Ksig, segmentation computation is additionally applied to the L1-Detail signaling data.

If a length of BCH encoded bit for the L1-Basic signaling data and the L1-Detail signaling data is smaller than a length of a bit which will be LDPC encoded, zero padding for filling zero padding bits in the bit which will be LDPC encoded as much as a difference between the lengths is performed and then LDPC encoding is performed. Therefore, zero padding is performed only if this condition is satisfied. If zero padding is performed, zero padding bits are removed after repetition/puncturing procedure without being transmitted.

Also, in one embodiment of the present disclosure, when bit demultiplexing is performed for the L1-Basic signaling data and the L1-Detail signaling data, demultiplexing is performed after block interleaving is performed.

Figure 8A:
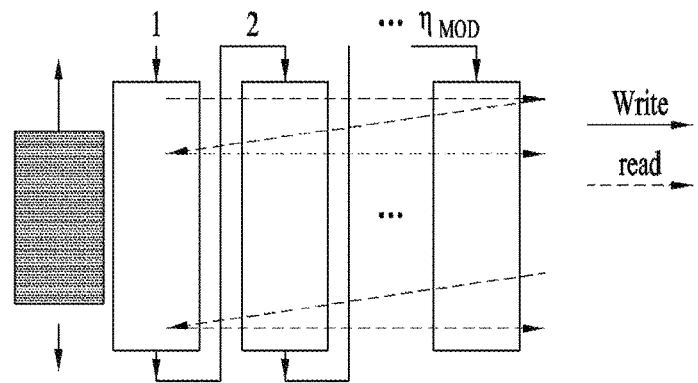
FIG. 8(a) is a view illustrating a block interleaving procedure of L1 signaling data according to one embodiment of the present disclosure.
Figure 8B:
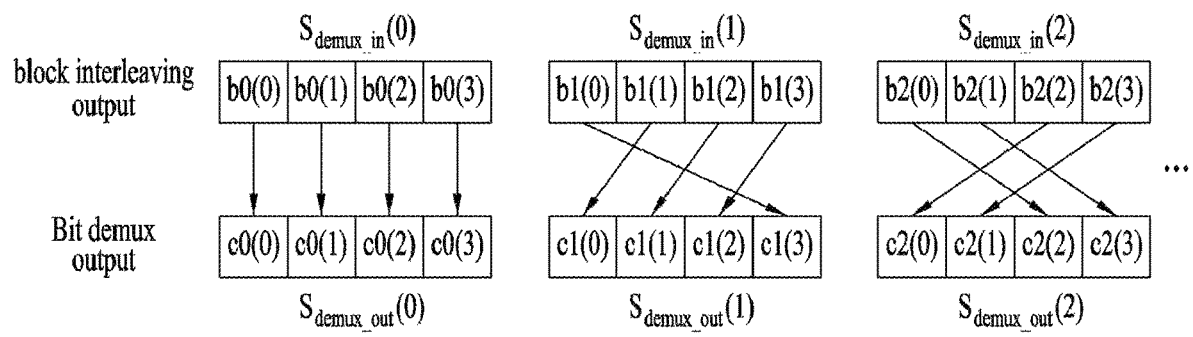
FIG. 8(b) is a view illustrating a bit demultiplexing procedure of L1 signaling data according to one embodiment of the present disclosure.

FIG. 8(*a*) is a view illustrating one embodiment of a block interleaving procedure of a block interleaver within a bit demultiplexing block provided in each of the L1-basic processor and the L1-Detail processor, and FIG. 8(*b*) is a view illustrating one embodiment of a demultiplexing procedure after block interleaving.

First of all, referring to FIG. 8(*a*), lengths of bits (e.g., $N_{FEC}$ or $N_{FEC}+N_{FECrepeat}$) input for bit demultiplexing are serially written in a column direction of a block interlaver memory. At this time, the number of columns is equal to the modulation order.

In reading computation, bits for one constellation symbol are sequentially read in a row direction and then fed for bit demultiplexing. This computation continues to reach the last column.

Each block interleaved group is demultiplexed prior to constellation mapping in a bit-by-bit unit within one group.

In the present disclosure, there are two mapping rules in accordance with the modulation order. That is, in case of QPSK, reliability of bits within a symbol is constant in one embodiment. Therefore, one bit group read from the block interleaver is directly mapped into QAM symbol without interleaving procedure. Meanwhile, in case of higher order modulation, one bit group is mapped into QAM symbol in accordance with a rule described below.

$S_{demux\_in}(i)=\{b_i(0),b_i(1),b_i(2), \ldots , b_i(\eta_{MOD}-1)\}$,
$S_{demux\_out}(i)=\{c_i(0),c_i(1),c_i(2), \ldots ,c_i(\eta_{MOD}-1)\}$,
$c_i(0)=b_i(i \% \eta_{MOD})$, $c_i(1)=b_i((i+1)\% \eta_{MOD})$, . . . ,$c_i(\eta_{MOD}-1)=b_i((i+\eta_{MOD}-1)\% \eta_{MOD})$ In this case, $i \% \eta_{MOD}$ means the remainder obtained by dividing i by $\eta_{MOD}$, and i indicates a bit group index corresponding to a row index in block interleaving. That is, an output bit group $S_{demux\_out}(i)$ for mapping each QAM symbol is cyclically shifted from $S_{demux\_in}(i)$ in accordance with a bit group index i. FIG. 8(*b*) illustrates an example of a bit demultiplexing procedure for 16-NUC.

FIG. 9 is a view illustrating a syntax of L1-Basic signaling data according to one embodiment of the present disclosure.

The following fields are parameters related to system and frame.

L1B_version field indicates a version of L1-Basic signaling structure.

L1B_mimo_scattered_pilot_encoding field indicates which MIMO pilot encoding method is used by MIMO subframes of a current frame.

L1B_lls_flag field indicates whether Low Level Signaling (LLS) exists in one or more PLPs of the current frame.

L1B_time_info_flag field indicates whether time information exists in the current frame. In one embodiment of the present disclosure, the L1B_time_info_flag field indicates whether time information exists in the current frame, by using 2 bits as listed in Table 6 below, and also indicates a precision level (that is, unit) of the time information which is signaled if the time information exists. For example, if the L1B_time_info_flag field has a value of 00, it indicates that time information does not exist in the current frame. If the L1B_time_info_flag field has a value of 01, it indicates that time information exists in the current frame and is signaled with precision of ms (that is, time information of millisecond unit). If the L1B_time_info_flag field has a value of 10, it indicates that time information exists in the current frame and is signaled with precision of µs (that is, time information of microsecond unit). If the L1B_time_info_flag field has a value of 11, it indicates that time information exists in the current frame and is signaled with precision of ns (that is, time information of nanosecond unit).

In one embodiment, actual time information having precision indicated by the values of the L1B_time_info_flag field is signaled to the L1-Detail signaling data.

TABLE 6

| Value | Meaning |
| --- | --- |
| 00 | Time information is not included in the current frame |
| 01 | Time information is included in the current frame and signaled to ms precision |
| 10 | Time information is included in the current frame and signaled to µs precision |
| 11 | Time information is included in the current frame and signaled to ns precision |

L1B_return_channel_flag field indicates whether a dedicated return channel (DRC) of the current frame, the current frequency band and a current broadcast network exists.

L1B_papr_reduction field indicates whether a PAPR reduction has been used as listed in Table 7 below, and indicates which scheme has been used to reduce an average power ratio in the current frame if the PAPR reduction has been used. The PAPR reduction technology may be applied to all other OFDM symbols except the first preamble symbol of the current frame. L1B_frame_length_mode field is set to 0 when the current frame is a time-aligned frame (that is, OFDM symbol not preamble) having arrangement of an excess sample added to a guard interval period of data payload OFDM symbols (that is, non-preamble OFDM symbols). On the contrary, the L1B_frame_length_mode field is set to 1 when the current frame is a symbol-aligned frame having no excess sample arrangement.

L1B_frame_length field indicates a time period from the start of a first sample of a bootstrap correlated with the current frame to the end of the last sample of the current frame.

L1B_excess_samples_per_symbol field exists only in case of the time-aligned frame, and indicates the number of excess samples included in a guard interval of each OFDM symbol (that is, non-Preamble OFDM symbol) not a preamble of a part after a bootstrap of the current frame.

L1B_time_offset field exists only in case of the symbol-aligned frame, and indicates the number of sample periods.

L1B_additional_samples field exists only in case of the symbol-aligned frame, and indicates the number of additional samples.

L1B_num_subframes field indicates the number of subframes within the current frame, and is set to a value smaller than the number of subframes within the current frame as much as 1.

The following fields are parameters that provide information required to decode the remaining part of the preamble, that is, L1-Detail signaling data.

L1B_preamble_num_symbols field indicates the number of OFDM symbols included in the other preambles except the first preamble symbol.

L1B_preamble_reduced_carriers field indicates the number of control units of carriers for reducing the maximum number of carriers defined per FFT size used in the preamble. The carrier reduction may be applied to all the preamble symbols of the current frame except the first preamble symbol.

L1B_L1_Detail_content_tag field is increased by 1 when a content of L1-Detail signaling data of the current frame is changed as compared with L1-Detail signaling data of a previous frame having a bootstrap of the same major version and the same minor version as those of the current frame. However, the L1B_L1_Detail_content_tag field value is not increased exceptionally even though there is any change in the following signaling fields, that is, L1D_time_sec, L1D_time_msec, L1D_time_usec, L1D_time_nsec (including the presence or absence of any of these listed time fields), L1D_plp_lls_flag, L1D_plp_fec_block_start, L1D_plp_CTI_fec_block_start, and L1D_plp_CTI_start_row fields.

L1B_L1_Detail_size_bytes field indicates a size of L1-Detail signaling data. At this time, additional parity is not included in the current frame for L1-Detail signaling data of next frame.

L1B_L1_Detail_fec_type field indicates FEC type for protection of the L1-Detail signaling data.

L1B_L1_Detail_additional_parity_mode field indicates an Additional Parity Mode.

L1B_L1_Detail_total_cells field indicates a total size of additional modulated parity bits of coded and modulated L1-Detail signaling data combined for the current frame and L1-Detail signaling data of next frame on an OFDM cell basis.

The following fields are parameters for the first subframe, and in one embodiment, the first subframe of the current frame is signaled to the L1-Basic signaling data such that the receiver may immediately perform initial OFDM processing at the corresponding first subframe without waiting until the L1-Detail signaling data is decoded.

L1B_first_sub_mimo field indicates whether MIMO has been used at the first subframe of the current frame.

L1B_first_sub_miso field indicates whether MISO has been used at the first subframe of the current frame.

L1B_first_sub_fft_size fields indicates FFT size related to the first subframe of the current frame. In one embodiment, FFT size of the preamble within one frame is equal to that of the first subframe within the same frame.

L1B_first_sub_reduced_carriers field indicates a control unit value for reducing the maximum number of carriers defined per FFT size which is used at the first subframe of the current frame.

L1B_first_sub_guard_interval field indicates a guard interval length of OFDM symbols at the first subframe of the current frame. In one embodiment, the guard interval length signaled for the first subframe within one frame is equal to a guard interval length indicated for the preamble within the same frame.

L1B_first_sub_num_ofdm_symbols field indicates the number of OFDM symbols included in the first subframe of the current frame.

L1B_first_sub_scattered_pilot_pattern field indicates a scattered pilot pattern of the first subframe of the current frame.

L1B_first_sub_scattered_pilot_boost field indicates a power of a scattered pilot of the first subframe of the current frame by being combined with the scattered pilot pattern.

L1B_first_sub_sbs_first field indicates whether the first symbol of the first subframe of the current frame is a subframe boundary symbol.

L1B_first_sub_sbs_last field indicates whether the last symbol of the first subframe of the current frame is a subframe boundary symbol.

FIGS. 10 to 12 are views illustrating one embodiment of a syntax of L1-Detail signaling data according to the present disclosure.

The following fields are miscellaneous parameters.

L1D_version field indicates a version of L1-Detail signaling structure used in the current frame.

L1D_time_sec field indicates a seconds component of time information using 32 bits.

L1D_time_msec field indicates a milliseconds component of time information using 10 bits. For example, if a portion of time information less than 1 second is 0.123456789, the L1D_time_msec field is 123. L1D_time_usec field indicates a microseconds component of time information using 10 bits. For example, if a portion of time information less than 1 second is 0.123456789, the L1D_time_usec field is 456.

L1D_time_nsec field indicates a nanoseconds component of time information using 10 bits. For example, if a portion of time information less than 1 second is 0.123456789, the L1D_time_nsec field is 789.

That is, the L1 Detail signaling data transmits time information acquired from a specific position within the current frame by using at least one of the L1D_time_sec field, the L1D_time_msec field, the L1D_time_usec field, and the L1D_time_nsec field in accordance with the L1B_time_info_flag field value signaled from the L1 Basic signaling data.

As an example, if the L1B_time_info_flag field value is not 00, the L1 Detail signaling data includes the L1D_time_sec field, the L1D_time_msec field, and the L1D_time_usec field. If the L1B_time_info_flag field value is not 01, the L1 Detail signaling data further includes the L1D_time_usec field. If the L1B_time_info_flag field value is not 10, the L1 Detail signaling data further includes the L1D_time_nsec field. As a result, the L1 Detail signaling data signals the time information acquired from the specific position of the current frame.

For example, if the L1B_time_info_flag field value is 10, the L1 Detail signaling data includes the L1D_time_sec field, the L1D_time_msec field, and the L1D_time_usec field, and transmits time information of a microsecond basis through the above fields. That is, the L1 Detail signaling data transmits the time information of a microsecond basis by adding the L1D_time_usec field of 10 bits to the fields (that is, L1D_time_sec field of 32 bits and L1D_time_msec field of 10 bits) of 42 bits for transmitting time information of a millisecond basis.

For another example, if the L1B_time_info_flag field value is 11, the L1 Detail signaling data includes the L1D_time_sec field, the L1D_time_msec field, the L1D_time_usec field, and the L1D_time_nsec field, and transmits time information of a nanosecond basis through the above fields. That is, the L1 Detail signaling data transmits the time information of a nanosecond basis by adding the L1D_time_nsec field of 10 bits to the fields (that is, L1D_time_sec field of 32 bits, L1D_time_msec field of 10 bits, and L1D_time_usec field of 10 bits) of 52 bits for transmitting time information of a microsecond basis.

Figure 13:
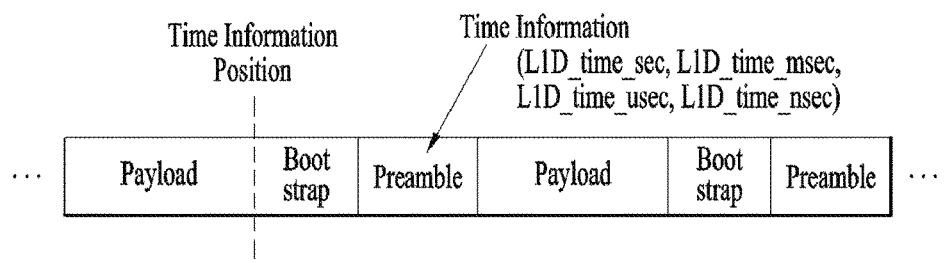
FIG. 13 is a view illustrating a time information position where time information is acquired and time information transmitted to a preamble according to one embodiment of the present disclosure.

FIG. 13 is a view illustrating a time information position where time information is acquired and time information transmitted to a preamble according to one embodiment of the present disclosure.

That is, time information including the time acquired from the time information position of FIG. 13 is signaled and transmitted to at least one of the L1D_time_sec field, the L1D_time_msec field, the L1D_time_usec field, and the L1D_time_nsec field of the L1 Detail signaling data inserted to the preamble.

In one embodiment of the present disclosure, the time information position is a first sample position of a first symbol of a bootstrap within a frame in which time information is included, as shown in FIG. 13. Therefore, in one embodiment, the time information indicates a precise time when the first sample of the first symbol of the bootstrap is transmitted.

For example, when the precise time acquired from the time information position was 17:31:24 on Feb. 12, 2016, 1455298284 seconds precisely elapsed after Jan. 1, 1970, a Precision Time Protocol (PTP) epoch. Therefore, a value transmitted through the fields for the time information becomes 0x56BE16EC. In one embodiment, the time information is transmitted at least once at an interval of 5 seconds.

The following fields are parameters for L1-Detail channel bonding. A channel bonding method for increasing a transmission data rate by combining multiple RF channels may be applied to the present disclosure. In this case, the following fields are signaled.

L1D_num_rf field indicates the number of frequencies related to channel bonding of the current system except the current channel frequency.

L1D_rf_id field identifies IDs of the other RF channels related to channel bonding.

L1D_rf_frequency field indicates a center frequency of the other RF channels. At this time, the L1D_rf_frequency field is repeated as much as the number of frequencies indicated by a value of the L1D_num_rf field and indicates a center frequency of the corresponding RF channel.

The following fields, that is, L1D_mimo_field, L1D_miso field, L1D_fft_size field, L1D_reduced_carriers field, L1D_guard_interval field, L1D_num_ofdm_symbols field, L1D_scattered_pilot_pattern field, L1D_scattered_pilot_boost field, L1D_sbs_first field, and L1D_sbs_last field are parameters related to subframes, and are repeated as much as the number of subframes included in the current frame. Each field will be understood with reference to the description of the fields signaled to the L1-Basic signaling data, and its description will be omitted herein.

L1D_subframe_multiplex field indicates whether the current subframe has been time-division multiplexed with a subframe concatenated in time.

L1D_frequency_interleaver field indicates whether a frequency interleaver has been used for the current subframe.

L1D_sbs_null_cells field indicates the number of null cells included in a subframe boundary symbol at the current subframe.

The following fields are parameters related to PLP.

L1D_num_plp field indicates the number of PLPs used at the current subframe.

L1D_plp_id field indicates an identifier of a current PLP.

L1D_plp_lls_flag field indicates whether LLS information is included in the current PLP.

L1D_plp_size field indicates the number of data cells allocated to the current PLP within the current subframe.

L1D_plp_scrambler_type field indicates a scrambling scheme of a corresponding PLP.

L1D_plp_fec_type field indicates FEC scheme used for encoding of the current PLP as listed in Table 7.

TABLE 7

| Value | Forward Error Correction Method |
| --- | --- |
| 0000 | BCH + 16K LDPC |
| 0001 | BCH + 64K LDPC |
| 0010 | CRC + 16K LDPC |
| 0011 | CRC + 64K LDPC |
| 0100 | 16K LDPC only |
| 0101 | 64K LDPC only |
| 0110-1111 | Reserved for future use |

L1D_plp_mod field indicates a modulation scheme used for the current PLP.

L1D_plp_cod field indicates a code rate used for the current PLP.

L1D_plp_TI_mode field indicates an interleave mode of the current PLP.

L1D_plp_fecframe_start field indicates a starting position of the first FEC frame starting from the current PLP for the current subframe.

The following fields are parameters related to LDM.

L1D_plp_layer field is set in the same manner as a layer index of the current PLP.

L1D_plp_Idm_injection_level field indicates a relative injection level of the enhanced layer as compared with the core layer.

The following fields are PLP based channel bonding parameters, and if L1D_num_rf=0, the following fields are not included in the L1-Detail signaling data.

L1D_plp_num_channel_bonded field indicates the number of frequencies related to a channel bonding PLP of the current system except the current channel frequency.

L1D_plp_bonded_rf_id field indicates an identifier of a channel RF for performing channel bonding with the current PLP.

L1D_plp_channel_bonding_format field indicates a channel bonding format for the current PLP.

The following fields are parameters related to PLP based MIMO.

L1D_plp_mimo_stream_combining field indicates whether a stream combination option of MIMO precoding has been used for a given PLP.

L1D_plp_mimo_IQ_interleaving field indicates whether IQ polarity interleaving option of MIMO precoding has been used for the given PLP.

L1D_plp_mimo_PH field indicates whether a phase hopping option of MIMO precoding has been used for the given PLP.

The following fields are parameters related to cell multiplexing.

L1D_plp_start field is set in the same manner as an index of the first data cell of the current PLP at the current subframe.

L1D_plp_type field indicates whether a type of the PLP is a dispersed PLP or a non-dispersed PLP.

L1D_plp_num_subslices field indicates the number of sub-slices used for the current PLP of the current subframe. This field is included in the L1 Detail signaling data only when the L1D_plp_type field has a value of 1, that is, when a type of the current PLP is a dispersed type.

L1D_plp_subslice_interval field is set in the same manner as the number of sequential index data cells from the start of a current sub-slice to the start of next sub-slice.

The following fields are parameters related to time interleaving.

L1D_plp_TI_extended_interleaving field indicates whether extended interleaving is used for the corresponding PLP.

The following fields are Convolutional Time Interleaver Mode Parameters among the parameters related to time interleaving.

L1D_plp_CTI_depth field indicates the number of rows of a convolutional interleaver (memory).

L1D_plp_CTI_start_row field indicates a position of a starting switch of a convolutional interleaver at the start of the subframe.

L1D_plp_CTI_fec_block_start field indicates a position after CTI of a first cell of a first perfect FEC block prior to CTI of the current PLP at the current subframe or next subframe. That is, this field indicates a starting position of a first perfect FEC frame of the current PLP leaving CTI within the current or next subframe.

The following fields are Hybrid Time Interleaver (Mode) Parameters among the parameters related to time interleaving.

L1D_plp_HTI_inter_subframe field indicates a hybrid time interleaving mode.

L1D_plp_HTI_num_ti_blocks field indicates the number of TI blocks per interleaving frame in an intra-subframe mode, and indicates the number of subframes at which cells of one TI block are transmitted in an inter-subframe mode.

L1D_plp_HTI_num_fec_blocks_max field indicates the maximum number of FEC blocks per interleaving frame for the current PLP.

L1D_plp_HTI_num_fec_blocks field indicates the number of FEC blocks included in a current interleaving frame for the current PLP.

L1D_plp_HTI_cell_interleaver field indicates whether a cell interleaver is used.

Reception System

Figure 14:
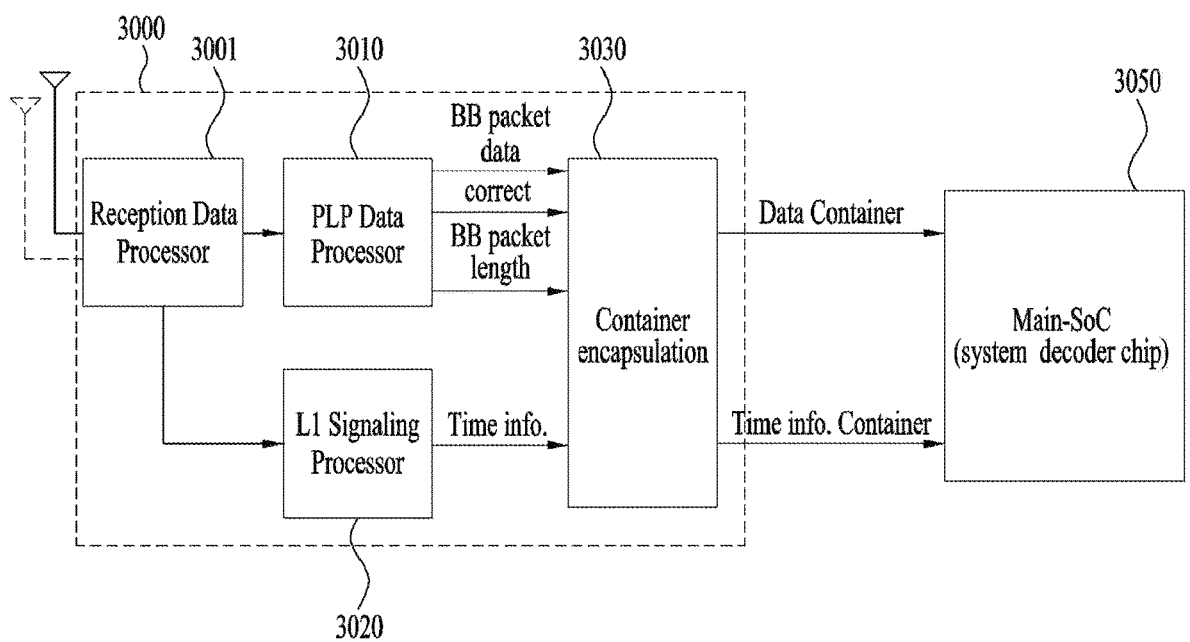
FIG. 14 is a schematic block view illustrating a reception system according to one embodiment of the present disclosure.

FIG. 14 is a schematic block view illustrating a reception system according to one embodiment of the present disclosure, and includes a baseband processor 3000 and a system on chip (SoC) module 3050. The baseband processor 3000 may include a received data processor 3001, a PLP data processor 3010, an L1 signaling processor 3020, and a container encapsulator 3030. In the present disclosure, the baseband processor 3000 is referred to as a physical layer processor, and the system on chip module 3050 is referred to as an upper layer. The baseband processor 3030 may be implemented as one chip. At this time, the baseband processor 3030 and the system on chip module 3050 may be implemented as their respective chips, or may be implemented as a single chip having the same function.

The received data processor 3001 receives a broadcast signal from one or more antennas, demodulates and parses the received broadcast signal, outputs preamble data included in a preamble area within a frame of the broadcast signal to the L1 signaling processor 3020, and outputs PLP data of one or more PLPs included in a data area within the frame to the PLP data processor 3010. In the present disclosure, if MIMO is supported, two or more antennas may receive the broadcast signal.

In one embodiment, the PLP data processor 3010 restores baseband packets by processing PLP data output from the received data processor 3001 and then outputs the baseband packets to the container encapsulator 3030. The L1 signaling processor 3020 processes L1 Basic signaling data and L1 Detail signaling data included in preamble data output from the received data processor 3001 and provides information signaled to the L1 Basic signaling data and information signaled to the L1 Detail signaling data to necessary blocks. For example, in one embodiment, at least one field value of the L1D_time_sec field, the L1D_time_msec field, the L1D_time_usec field, and the L1D_time_nsec field is provided to the container encapsulator 3030 as time information in accordance with the L1B_time_info_flag field value and the L1B_time_info_flag field value.

In one embodiment of the present disclosure, the received data processor 3001, the PLP data processor 3010 and the L1 signaling processor 3020 perform inverse procedures of the transmission system of FIG. 1. However, some of the inverse procedures of the transmission system may be performed in the reception system only if a corresponding condition is satisfied, or may unconditionally be omitted in the reception system.

Figure 15:
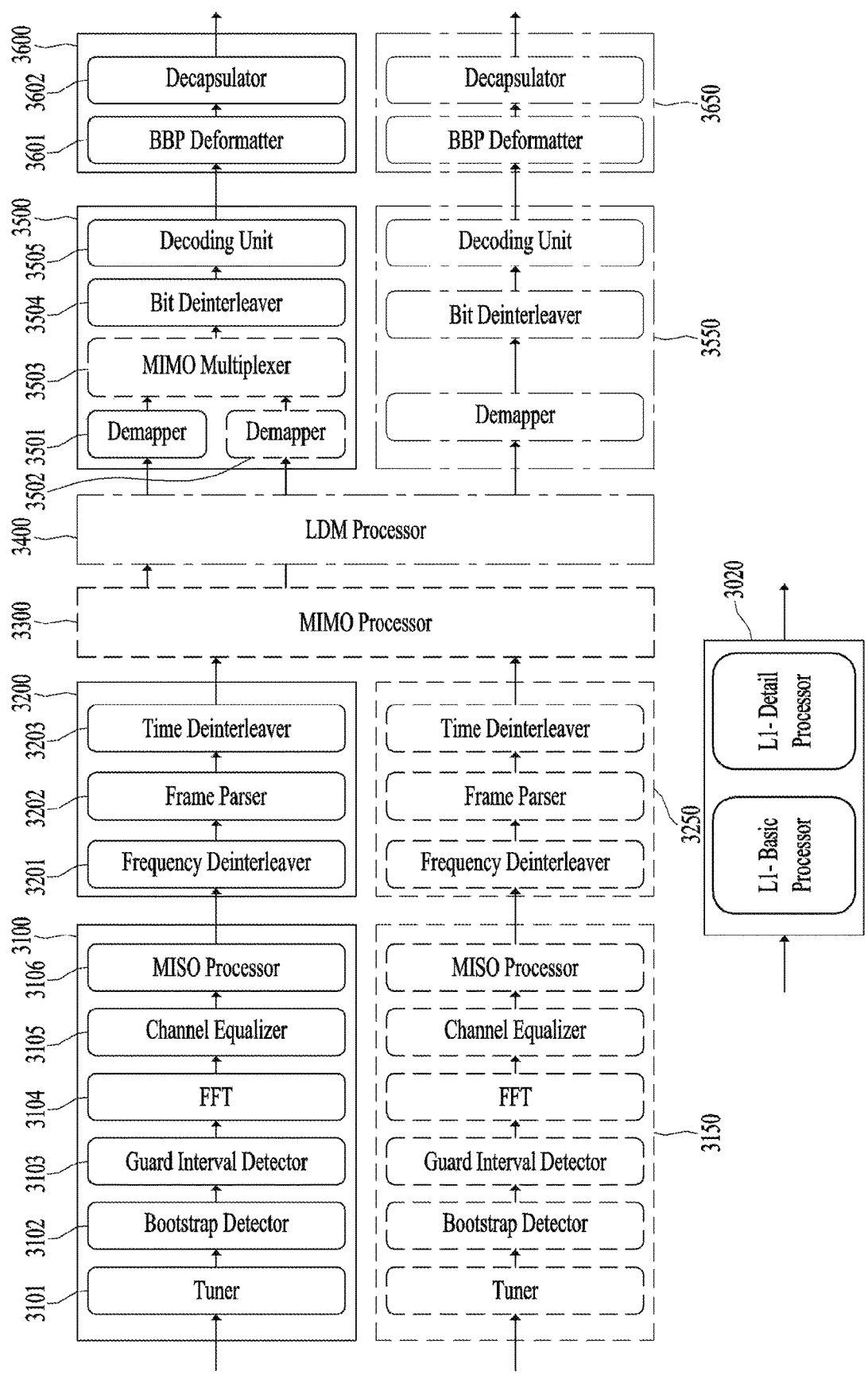
FIG. 15 is a detailed block view illustrating one embodiment of a PLP data processor and L1 signaling processor, which are included in the reception system of FIG. 14.

FIG. 15 is a detailed block view illustrating one embodiment of the received data processor 3001, the PLP data processor 3010 and the L1 signaling processor 3020 in FIG. 14. In FIG. 15, some blocks may be omitted in accordance with intention of a designer, and some blocks may be replaced by other blocks having similar or the same function.

The received data processor 3001 may only include a first OFDM demodulator 3100 and a second OFDM demodulator 3150, or may include the first OFDM demodulator 3100, a second OFDM demodulator 3150, a first frame parser 3200, and a second frame parser 3250. In one embodiment of the present disclosure, the received data processor 3100 includes the first OFDM demodulator 3100, the second OFDM demodulator 3150, the first frame parser 3200, and the second frame parser 3250.

In FIG. 15, the first OFDM demodulator 3100, the first frame parser 3200, the first inverse BICM block 3500 except the second demapper 3502 and the MIMO MUX 3503, the first output processor 3600 and the L1 signaling processor 3020 are basic blocks commonly applied to the LDM scheme and the MIMO scheme. If the LDM scheme is applied to the present disclosure, an LDM processor 3400, a second inverse BICM block 3550, and a second output formatting block 3650 are further required. Also, if the MIMO scheme is applied to the present disclosure, a second OFDM demodulator 3150, a second frame parser 3250, a MIMO processor 330, and the second demapper 3502 and the MIMO MUX 3503 of the first inverse BICM block 3500 are further required. The aforementioned blocks may be omitted in accordance with intention of a designer, or may be replaced with other blocks having similar or the same function.

The first OFDM demodulator 3100 may include a tuner 3101, a bootstrap detector 3102, a guard interval detector 3103, an FFT unit 3104, a channel equalizer 3105, and a MISO processor 3106. The MISO processor 3106 is also referred to as a MISO decoder. The order of the respective blocks is one embodiment for assisting understanding of the present disclosure, and the order of some blocks may be changed in accordance with a designer, or new blocks may further be provided.

The tuner 3101 receives a broadcast signal of a specific channel through a first antenna and outputs the broadcast signal to the bootstrap detector 3102.

The bootstrap detector 3102 detects a bootstrap within the corresponding frame from the input signal, and extracts bootstrap information from bootstrap symbols transmitted to the detected bootstrap. For example, the bootstrap detector 3102 may detect the bootstrap by performing bootstrap energy detection using a bootstrap sequence. The bootstrap information extracted from the bootstrap symbols may be provided to blocks that need this bootstrap information, and/or may be stored in a memory (not shown) for future use.

For example, the bootstrap information extracted from the bootstrap symbols may include wake-up information for emergency alarm, version information, a structure of preamble symbols, for example, FFT size of the preamble symbols, a guard interval, a scattered pilot pattern, and FEC mode of L1-Basic signaling data. The FFT size of the preamble symbols may be used for frequency deinterleaving of the preamble symbols by the frequency deinterleaver 3201.

In one embodiment of the present disclosure, FFT size and guard interval (GI) length are identical in all the preamble symbols within a frame. Also, in one embodiment, the FFT size and GI length in the preamble are equal to those of the first subframe within the frame. In the present disclosure, frame configuration of the signal currently received from the bootstrap information may be identified. Also, in one embodiment, if the bootstrap information is extracted from the bootstrap detector 3201, the bootstrap symbols are deleted from the input signal and then output to the guard interval detector 3103.

The guard interval detector 3103 detects a guard interval from the input signal, deletes the guard interval and then outputs the input signal to the FFT unit 3104.

At this time, a synchronization block for performing time synchronization and frequency synchronization using the bootstrap information may further be included between the bootstrap detector 3102 and the guard interval detector 3103. Alternatively, the synchronization block may be included at an output terminal of the guard interval detector 3103.

The FFT unit 3104 transforms the input signal to the frequency domain and outputs the input signal to the channel equalizer 3105. The channel equalizer 3105 estimates a transmission channel using pilots inserted in the transmission system, compensates for distortion of the received signal using the estimated transmission channel and then outputs the compensated signal to the MISO processor 3106.

In one embodiment of the present disclosure, the MISO scheme is applied to OFDM symbols of a subframe but not applied to a bootstrap or preamble. Whether the MISO scheme is applied to each subframe is signaled to the L1B_first_sub_miso field and the L1D_miso field of the L1 signaling data.

Therefore, the MISO processor 3106 determines whether to perform MISO decoding for the corresponding subframe by using at least the L1B_first_sub_miso field and the L1D_miso field of the information included in the L1 signaling data, and performs MISO decoding for the corresponding subframe in an inverse procedure of the transmission system or skips MISO decoding.

The frame parser 3200 may include a frequency deinterleaver 3201, a frame parser 3202, and a time deinterleaver 3203.

In the transmission system of the present disclosure, frequency interleaving is essential for the preamble symbols, and is optional for data symbols included in the subframe. Whether frequency interleaving is performed per subframe is signaled to the L1D_frequency_interleaver field of the L1-Detail signaling data.

Therefore, the frequency interleaver 3201 performs frequency deinterleaving for the preamble symbols output from the first OFDM demodulator 3100 in an inverse procedure of the transmission system and then outputs the result to the L1 signaling processor 3700.

The L1 signaling processor 3020 may include L1-Basic processor for performing an inverse procedure of the transmission system for the L1-Basic signaling data and L1-Detail processor for performing an inverse procedure of the transmission system for the L1-Detail signaling data.

The L1-Basic processor sequentially performs constellation demapping, bit MUX, zero padding, depuncturing, parity depermutation, LDPC decoding, zero removing, BCH decoding, and descrambling for the L1-Basic signaling data of the L1 signaling data transmitted to the preamble symbols and then extracts information included in the L1-Basic signaling data. Some of these functions may be omitted in accordance with intention of a designer, or may be performed by other blocks having a similar or the same function. The information extracted from the L1-Basic signaling data may be provided to blocks that need this information, and/or may be stored in a memory (not shown) for future use. At this time, in one embodiment, the L1B_first_sub_miso field value extracted from the L1-Basic signaling data is output to the MISO processor 3106. Also, in one embodiment, the L1B_time_info_flag field value extracted from the L1-Basic signaling data is output to the L1-Detail processor. The L1B_time_info_flag field indicates whether time information exists in the current frame, and also indicates a precision level of the time information if the time information exists. Meanwhile, actual time information having precision indicated by the values of the L1B_time_info_flag field, including the time acquired at a time information position previously set within the corresponding frame is received by being signaled to the L1-Detail signaling data.

The L1-Detail processor sequentially performs constellation demapping, bit MUX, zero padding, depuncturing, parity depermutation, LDPC decoding, zero removing, BCH decoding, descrambling, and desegmentation for the L1-Detail signaling data of the L1 signaling data transmitted to the preamble symbols as inverse procedures of the transmission system and then extracts information included in the L1-Detail signaling data. If parity data have been added to the L1-Detail signaling data in the transmission system, the L1-Detail processor may further perform constellation demapping and bit MUX for additional parity data and then extract the parity data. Some of these functions may be omitted in accordance with intention of a designer, or may be performed by other blocks having a similar or the same function. The information extracted from the L1-Detail signaling data may be provided to blocks that need this information, and/or may be stored in a memory (not shown)

for future use. At this time, in one embodiment, the L1D_miso field value extracted from the L1-Detail signaling data is output to the MISO processor 3106 and the L1D_frequency_interleaver field value is output to the frequency deinterleaver 3201.

Also, in one embodiment, the time information extracted from the L1 Basic signaling data and the L1-Detail signaling data is output to the container encapsulator 3030. That is, the L1-Detail processor extracts the time information signaled to the L1-Detail signaling data based on the L1D_time_info field value output from the L1-Basic processor.

For example, if the L1B_time_info_flag field has a value of 00, since there is no time information in the current frame, there is no time information signaled to the L1-Detail signaling data. In this case, the time information output to the container encapsulator 3030 becomes the L1B_time_info_flag field value indicating that there is no time information in the current frame.

Meanwhile, if the L1B_time_info_flag field value is not 00, that is, if the L1B_time_info_flag field value is one of 01, 10 and 11, it means that the time information exists in the current frame, and the L1-Detail signaling data includes at least one of the L1D_time_sec field, the L1D_time_msec field, the L1D_time_usec field, and the L1D_time_nsec field depending on whether the L1B_time_info_flag field value is 01, 10, or 11. Therefore, the L1-Detail processor extracts the time information from at least one of the L1D_time_sec field, the L1D_time_msec field, the L1D_time_usec field, and the L1D_time_nsec field depending on whether the L1B_time_info_flag field value is 01, 10, or 11, and outputs the extracted time information to the container encapsulator 3030.

For example, if the L1B_time_info_flag field value is 01, the L1 Detail processor extracts time information of a millisecond basis from the L1D_time_sec field and the L1D_time_msec field and outputs the extracted time information to the container encapsulator 3030.

For another example, if the L1B_time_info_flag field value is 10, the L1 Detail processor extracts time information of a microsecond basis from the L1D_time_sec field, the L1D_time_msec field, and the L1D_time_usec field and outputs the extracted time information to the container encapsulator 3030.

For other example, if the L1B_time_info_flag field value is 11, the L1 Detail processor extracts time information of a nanosecond basis from the L1D_time_sec field, the L1D_time_msec field, the L1D_time_usec field, and the L1D_time_nsec field and outputs the extracted time information to the container encapsulator 3030.

In one embodiment, the time information signaled to the L1 Data signaling data corresponds to the time when a first sample (that is, time information position) of the first symbol of the bootstrap within the corresponding frame is transmitted as shown in FIG. 13.

Meanwhile, the frequency deinterleaver 3201 performs frequency deinterleaving for the corresponding subframe based on L1D_frequency_interleaver field value provided from the L1 signaling processor 3200, or skips frequency deinterleaving.

In one embodiment of the present disclosure, if frequency deinterleaving is performed for the corresponding subframe based on the L1D_frequency_interleaver field value, frequency deinterleaving is performed using one memory. The frequency deinterleaving is operated for data cells within one OFDM symbol.

A frame that includes preamble symbol(s) for which the frequency deinterleaving is performed by the frequency deinterleaver 3202 and symbols of subframe(s) for which the frequency deinterleaving is performed or frequency deinterleaving is skipped is output to the frame parser 3202 and then parsed therein. PLPs included in the subframe(s) parsed by the frame parser 3202 are output to the time deinterleaver 3203 operating per PLP.

In the transmission system of the present disclosure, one of three modes, a no time interleaving mode, a Convolutional Time Interleaver (CTI) mode, and a Hybrid Time Interleaver (HTI) mode of time interleaving is applied to each PLP as described above as one embodiment. Since each mode has been described in detail in the description of time interleaving of the transmission system, its detailed description will be omitted.

Figure 16A:
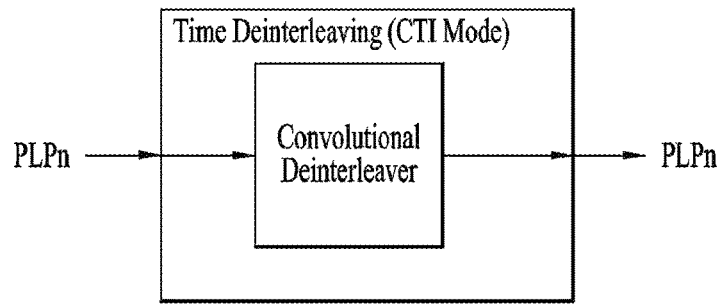
FIGS. 16(a) and 16(b) are schematic block views illustrating one embodiment of a time deinterleaver of a CTI mode and a time deinterleaver of an HTI mode according to the present disclosure.
Figure 16B:
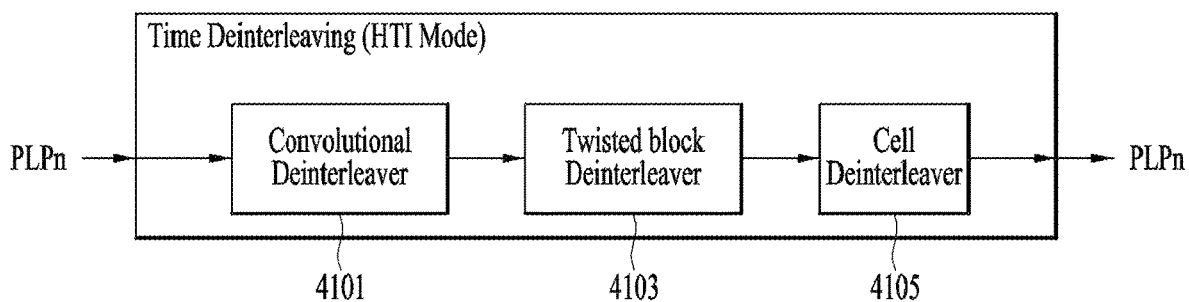

FIG. 16(*a*) is a schematic block view illustrating a convolutional time deinterleaver when a CTI mode is applied to an nth PLP according to one embodiment of the present disclosure, and FIG. 16(*b*) is a schematic block view illustrating a hybrid time deinterleaver when an HTI mode is applied to the nth PLP according to one embodiment of the present disclosure.

The convolutional time deinterleaver of FIG. 16(*a*) performs convolutional time deinterleaving for corresponding PLP data in an inverse procedure of the transmission system by using at least L1D_plp_CTI_depth field, L1D_plp_CTI_start_row field and L1D_plp_CTI_fec_block_start field values of the information included in the L1 signaling data.

In one embodiment, the hybrid time deinterleaver of FIG. 16(*b*) includes a convolutional deinterleaver 4101, a block deinterleaver 4103, and a cell deinterleaver 4105. In this case, the convolutional deinterleaver 4101 and the cell deinterleaver 4105 are optionally used in the same manner as the transmission system.

In one embodiment of the present disclosure, whether to use the convolutional deinterleaver 4101 is determined based on L1D_plp_HTI_inter_subframe field included in the L1-Detail signaling data, and whether to use the cell deinterleaver 4105 is determined based on L1D_plp_HTI_cell_interleaver field value included in the L1-Detail signaling data.

Therefore, the hybrid time deinterleaver of FIG. 16(*b*) performs hybrid time deinterleaving for the corresponding PLP data in an inverse procedure of the transmission system by using at least L1D_plp_HTI_inter_subframe field, L1D_plp_HTI_num_ti_blocks field, L1D_plp_HTI_num_fec_blocks_max field, L1D_plp_HTI_num_fec_blocks field and L1D_plp_HTI_cell_interleaver field values.

If the MIMO scheme is applied to the present disclosure, the corresponding time deinterleaved PLP data are output to the MIMO processor 3300, and if the LDM scheme is applied to the present disclosure, the corresponding time interleaved PLP data are output to the LDM processor 3400 by skipping or bypassing the MIMO processor 3300. Also, if neither the MIMO scheme nor the LDM scheme is applied to the present disclosure, the corresponding time interleaved PLP data are output to the first inverse BICM block 3500 by skipping or bypassing the MIMO processor 3300 and the LDM processor 3400. In the present disclosure, whether to use the MIMO scheme and whether to use the LDM scheme may be identified by information signaled to the L1 signaling data.

If the LDM scheme is applied to the present disclosure, the LDM processor 3400 splits core layer PLP data and enhanced layer PLP data from the input PLP data by performing an inverse procedure of the LDM processor of the transmission system using at least L1D_plp_layer field and L1D_plp_ldm_injection_level field of the information included in the L1 signaling data, outputs the split core layer PLP data to the first inverse BICM block 3500, and outputs the split enhanced layer PLP data to the second inverse BICM block 3550.

The first demapper 3501, the bit deinterleaver 3504, and the decoding unit 3505 in the first inverse BICM block 3500 are basic blocks when any one of the MIMO scheme and the LDM scheme is applied or both of them are not applied. The first inverse BICM block 3500 operates per PLP in the same manner as the transmission system.

The first demapper 3501 performs symbol demapping for PLP data of the corresponding PLP in an inverse procedure of the mapper 2300 of the transmission system by using at least L1D_plp_mod field of the information included in the L1 signaling data, and the bit deinterleaver 3504 performs bit deinterleaving for the corresponding PLP data symbol demapped in an inverse procedure of the bit interleaver 2200 of the transmission system. The detailed description of the first demapper 3501 and the bit deinterleaver 3504 will be understood with reference to the description of the transmission system and thus will be omitted. At this time, the output of the bit deinterleaver 3504 is FEC frame of the corresponding PLP, wherein the FEC frame includes at least one baseband packet.

Figure 17:
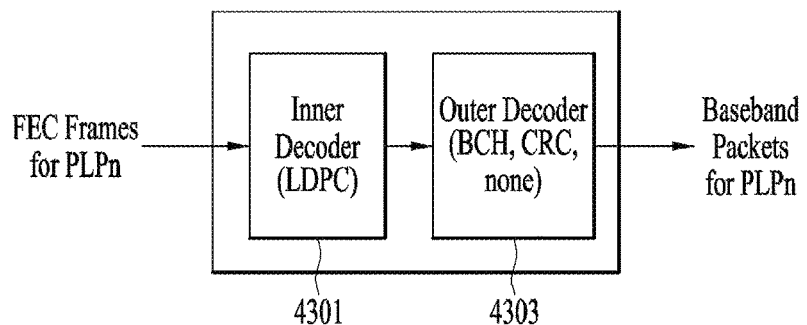
FIG. 17 is a view illustrating a decoding unit in an inverse BICM block of the reception system according to one embodiment of the present disclosure.

The decoding unit 3505 includes an inner decoder 4301 and an outer decoder 4303 as shown in FIG. 17. The inner decoder 4301 performs LDPC decoding for the FEC frame of the corresponding PLP in an inverse procedure of the inner encoder 2102 of the transmission system by using at least L1D_plp_fec_type field and L1D_plp_cod field of information included in the L1 signaling data. If the LDPC decoding is performed, inner code parity bits are removed from the FEC frame.

Even in the reception system of the present disclosure, the outer decoder 4303 has three options. That is, BCH decoding may be performed for the FEC frame from which inner code parity bits are removed after LDPC decoding, CRC decoding may be performed, or outer decoding may not be performed. The outer decoder 4303 performs one of BCH decoding and CRC decoding in an inverse procedure of the outer encoder 2101 of the transmission system by using at least L1D_plp_fec_type field of the information included in the L1 signaling data, or skips the decoding procedure. If BCH decoding or CRC decoding is performed for the FEC frame by the outer decoder 4303, outer code parity bits are also removed from the FEC frame.

If the outer code parity bits are removed from the FEC frame by the outer decoder 4303, the FEC frame payload, that is, a baseband packet of the corresponding PLP only remains. Meanwhile, if outer encoding is not performed by the transmission system, outer decoding may not be performed even by the reception system. In this case, if the inner code parity bits are removed from the FEC frame by the inner decoder 4301, the baseband packet of the corresponding PLP only remains.

This is because that the FEC frame is obtained by adding the outer code parity bits (optional) and the inner code parity bits to the baseband packet of the corresponding PLP due to outer encoding (optional) and inner encoding performed for the baseband packets of the corresponding PLP per PLP. In other words, the input of the decoding unit 3505 is the FEC frame of the corresponding PLP, and the output of the decoding unit 3505 is the baseband packet of the corresponding PLP.

The baseband packet output from the decoding unit 3505 is input to the first output processor 3600. That is, the baseband packet restored by the first inverse BICM block 3500 through the inverse procedure of the transmission system is output to the first output processor 3600. The detailed description of the baseband packet will be understood with reference to the description of the transmission system and thus will be omitted herein.

The first output processor 3600 may include a BBP deformatter 3601 and a decapsulator 3602.

The BBP deformatter 3601 descrambles a baseband packet of an input corresponding PLP, and then extracts at least one ALP packet included in a payload of the corresponding baseband packet based on header information of the descrambled baseband packet and outputs the extracted ALP packet to the decapsulator 3602. The decapsulator 3602 restores transport stream (TS) packets or internal protocol (IP) packets, which include broadcast service data, from at least one ALP packet which is input. If the broadcast service data are included in the TS packets, the decapsulator 3602 restores null packets deleted by the transmission system using a Deleted Null Packets (DNP) field within a header with respect to the TS packets. Also, the broadcast service data may be included in the IP packets, and the header of the IP packets may be compressed. If the header of the IP packets is compressed, the inverse procedure of the transmitting side is performed to release compression.

In the present disclosure, since the second inverse BICM block 3550 for processing PLP data of the enhanced layer includes the same blocks as those of the first inverse BICM block 3500 except the second demapper 3502 and the MIMO MUX 3503, the detailed description of the second inverse BICM block 3550 will be omitted.

Also, in the present disclosure, since the second output processor 3650 for processing PLP data of the enhanced layer includes the same blocks as those of the first output processor 3600, the detailed description of the second output processor 3650 will be omitted.

Meanwhile, in one embodiment of the present disclosure, if the MIMO scheme is applied to the present disclosure, the first OFDM demodulator 3100 performs OFDM demodulation for a broadcast signal received through a first antenna, and the second OFDM demodulator 3150 performs OFDM demodulation for a broadcast signal received through a second antenna.

At this time, since each of the second OFDM demodulator 3150 and the second frame parser 3250 includes the same blocks as those of the first OFDM demodulator 3100 and the first frame parser 3200, their detailed description will be omitted.

In one embodiment of the present disclosure, the MIMO scheme is not applied to the preamble symbol, and is not used together with the LDM scheme.

In one embodiment, the MIMO processor 3300 performs MIMO decoding in an inverse procedure of the transmitting side by receiving the data time interleaved by the first frame parser 3200 and the data time interleaved by the second frame parser 3250 based on at least L1B_first_sub_mimo field and L1D_mimo_field of the L1 signaling data and then outputs the decoded result to each of the first demapper 3501 and the second demapper 3502 of the first inverse BICM block 3500. In one embodiment of the present disclosure, MIMO decoding is performed using a full-rate spatial multiplexing (FR-SM) scheme to provide capacity increase through relatively small complexity increase. Also, in one embodiment of the present disclosure, MIMO processing is applied at a PLP level.

In the transmission system of the present disclosure, the same constellations for MIMO processing are used for MIMO, and the same modulation order is transmitted from two transmitting antennas.

Therefore, each of the first demapper 3501 and the second demapper 3502 performs constellation demapping based on the aforementioned description.

A signal of a specific cell output by being constellation demaped by the first demapper 3501 is referred to as a first output signal, and a signal of the same cell output by being constellation demaped by the second demapper 3502 is referred to as a second output signal. The MIMO MUX 3503 multiplexes the first output signal and the second output signal into one signal, and outputs the multiplexed signal to the bit deinterleaver 3504. Since the operation of the bit deinterleaver 3504 and a subsequent operation have been described above, their description will be omitted herein.

Meanwhile, the output of the PLP data processor 3010 is input to the container encapsulator 3030.

In one embodiment, the container encapsulator 3030 encapsulates the output of the PLP data processor 3010 in a data container format.

In one embodiment of the present disclosure, the data container includes a container header and a container payload. In one embodiment, the output of the PLP data processor 3010 is included in the container payload. That is, in one embodiment, the container encapsulator 3030 includes the container payload as the output data of the PLP data processor 3010, and generates the data container by adding the container header to the container payload.

In one embodiment, the first output processor 3600 is included in the PLP data processor 3010 as described above. In this case, the data output from the PLP data processor 3010 are the TS packets or IP packets, and these TS packets or IP packets are encapsulated in one or more data container by the container encapsulator 3030.

In another embodiment of the present disclosure, the first output processor 3600 may not be included in the PLP data processor 3010. In this case, a unit of the data output from the PLP data processor 3010 is a baseband packet.

At this time, the first output processor 3600 may be included in the container encapsulator 3030. In this case, the first output processor 3600 included in the container encapsulator 3030 extracts at least one ALP packet from the baseband packet output from the PLP data processor 3010 and restores the TS packets or the IP packets from the extracted at least one ALP packet, as described above. The restored TS packets or IP packets are encapsulated in at least one data container.

As another embodiment, the BBP deformatter of the first output processor 3600 may be included in the container encapsulator 3030, and the decapculator of the first output processor 3600 may be included in a link layer. In this case, the first output processor 3600 included in the container encapsulator 3030 extracts at least one ALP packet from the baseband packet output from the PLP data processor 3010 as described above. Then, the first output processor 3600 encapsulates the extracted ALP packet in at least one data container.

As still another embodiment, the BBP deformatter of the first output processor 3600 may be included in the PLP data processor 3010, and the decapculator of the first output processor 3600 may be included in the link layer. In this case, the first output processor 3600 included in the PLP data processor 3010 extracts at least one ALP packet from the baseband packet output from the first BICM block 3500 of the PLP data processor 3010 as described above and then output the extracted ALP packet to the container encapsulator 3030. That is, a unit of the data output from the PLP data processor 3010 is ALP packet. The container encapsulator 3030 encapsulates the ALP packet output from the PLP data processor 3010 in at least one data container.

As further still another embodiment, the first output processor 3600 may not be included in the PLP data processor 3010 and the container encapsulator 3030. That is, the first output processor 3600 may be included in the system on chip module 3050 or the link layer. In this case, the unit of the data output from the PLP data processor 3010 is the baseband packet, and the container encapsulator 3030 encapsulates the baseband packet in at least one data container.

If the LDM scheme is used, a position of the second output processor 3650 is determined in the same manner as the first output processor 3600.

As described above, since one of the baseband packet, the ALP packet, the TS packet and the IP packet may be output from the PLP data processor 3010, this packet will be referred to as a data packet for convenience of description in the present disclosure. In other words, the data packet may be one of the baseband packet, the ALP packet, the TS packet, and the IP packet.

Also, in one embodiment of the present disclosure, the data packet is input to the container encapsulator 3030 and then encapsulated in at least one data container.

At this time, the PLP data processor 3010 additionally outputs length information of the data packet, a correct signal indicating whether there is any error in the data packet, and PLP ID for identifying a target PLP of the data packet to the container encapsulator 3030. For example, if the data packet output from the PLP data processor 3010 is the baseband packet, the length information includes information for identifying a length of the baseband packet. If the data packet output from the PLP data processor 3010 is the ALP packet, the length information includes information for identifying a length of the ALP packet. Also, if the data packet output from the PLP data processor 3010 is the TS packet or the IP packet, the length information includes information for identifying a length of the corresponding TS packet or a length of the corresponding IP packet.

If time information is extracted from the L1 Basic signaling data and L1 Detail signaling data, the L1 signaling processor 3020 outputs the extracted time information to the container encapsulator 3030. This is one embodiment, and other L1 signaling information in addition to the time information may be output to the container encapsulator 3030.

For example, if the data packet output to the container encapsulator 3030 is the baseband packet, the length of the baseband packet may be identified by an outer code type selected for a target PLP, an inner code rate and a code length. Therefore, the information for identifying the length of the baseband packet may be an actual length value of the baseband packet, or may be the outer code type, the inner code rate and the code length of the corresponding PLP, which are extracted from the L1 signaling data. Alternatively, the information for identifying the length of the baseband packet may be the L1D_plp_fec_type field value and the L1D_plp_cod field value, which are extracted from the L1 signaling processor 3020.

In the present disclosure, for convenience of description, the L1 signaling data provided from the L1 signaling processor 3020 to the container encapsulator 3030 will be referred to as information for encapsulation or encapsulation information.

Figure 18:
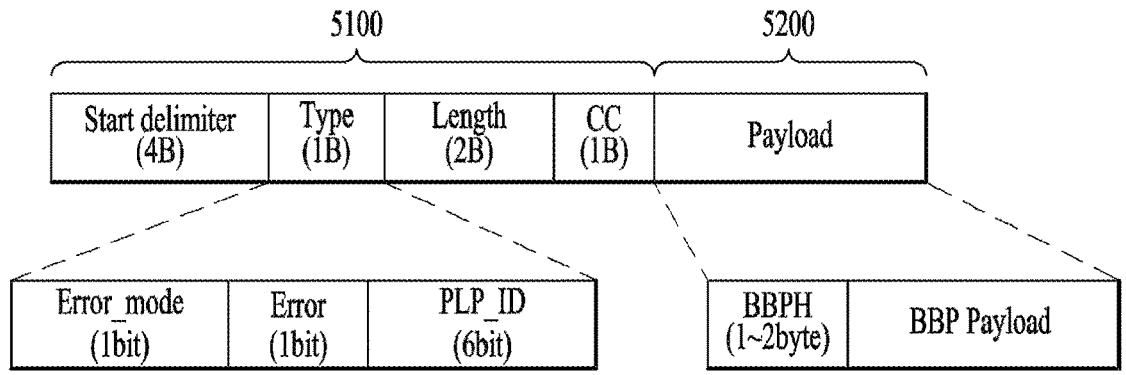
FIG. 18 is a view illustrating a structure of a data container according to one embodiment of the present disclosure.

FIG. 18 is a view illustrating a structure of a data container according to one embodiment of the present disclosure, wherein the data container includes a container header 5100 and a container payload 5200.

The data packet included in the container payload 5200 may be the baseband packet, the ALP packet, or the TS packet or IP packet. At this time, only one data packet may be included in the container payload 5200, or a plurality of data packets may be included therein. A length of the container payload 5200 may be varied depending on a length of the data packet included in the corresponding container payload 5200, a type of the data packet, and the number of data packets.

In one embodiment, if the data packet included in the container payload 5200 is the baseband packet, only one baseband packet is included in the container payload 5200. In this case, in one embodiment, if the length of the container payload is longer than that of the baseband packet, the payload area remaining after mapping of the baseband packet is filled with dummy data such as 0. As described above, the baseband packet includes the BBP header and the BBP payload, wherein the BBP header may essentially include a base field of 1 byte or 2 bytes, and may additionally include an optional field and an extension field. Since the BBP header has been described in detail as above, its detailed description will be omitted herein.

FIG. 18 illustrates that one baseband packet is included in the container payload 5200 according to the present disclosure, and a header of the baseband packet includes only a base field of 1 byte or 2 bytes.

Meanwhile, in one embodiment, the container includes a start delimiter field of 4 bytes, a type field of 1 byte, a length field of 2 bytes, and a continuity counter field of 1 byte.

In one embodiment, the start delimiter field indicates a starting position of a corresponding container. Particularly, the start delimiter field may be used when a starting position of the corresponding container header 5100 is discovered. In one embodiment of the present disclosure, 0x5A5A5A5A is allocated as a value of the start delimiter field. This is one embodiment for understanding of the present disclosure, and the start delimiter field value may be changed by a system designer and thus is not limited to the above value.

The type field indicates a feature of the data packet included in the corresponding container payload 5200. For example, if one baseband packet is included in the corresponding container payload, the type field indicates the feature of the baseband packet. To this end, the type field is categorized into an error mode field of 1 bit, an error field of 1 bit, and a PLP_ID field of 6 bits. The following Table 8 shows a relation between the error mode field and the error field.

TABLE 8

| Error mode | Error | Description |
|---|---|---|
| 0 | X | Error field is not used |
| 1 | 0 | BB packet is correct (non-error case) |
| 1 | 1 | BB packet has error (error case) |

In Table 8, the error mode field indicates whether the error field subsequent to the error mode field is used. For example, if the error mode field has a value of 0, it indicates that the error field is not used in the corresponding container header 5100. For another example, if the error mode field has a value of 1, it indicates that the error field is used in the corresponding container header 5100, and indicates whether there is any error in the corresponding baseband packet through the error field.

That is, as described above, the outer encoder of the transmission system of the present disclosure has three options. In other words, the transmission system may perform BCH encoding or CRC encoding for the baseband packet, or may not perform outer encoding. In this case, BCH encoding provides both an error correction function and an error detection function, and CRC encoding provides only an error detection function. Since the reception system performs outer decoding in an inverse procedure of the transmission system, if BCH encoding or CRC encoding is performed in the transmission system, the reception system has an error detection function. However, if the transmission system does not perform outer encoding due to transmission efficiency, the reception system has no error detection function.

If outer decoding is not performed in the reception system, it is difficult to identify whether there is any error in the corresponding baseband packet. In this case, the error mode field value is set to 0, and the error field arranged next to the error mode field is not used. Meanwhile, if the error mode field value is 1, the error field arranged next to the error mode field indicates the presence of an error in the baseband packet included in the corresponding container payload 5200.

For example, if the error field value is 0, it indicates that there is no error in the baseband packet included in the corresponding container payload 5200. If the error field value is 1, it indicates that there is an error in the baseband packet included in the corresponding container payload 5200. In this case, if the error field value is 1, it means that an error remains in the corresponding baseband packet even after error correction is performed by BCH decoding (optional) and LDPC decoding.

In the present disclosure, for convenience of description, the error field is referred to as an error indicator, and a combination of the error mode field and the error field may be referred to as an error indicator. In another embodiment, if a plurality of data packets are mapped into the container payload 5200 and an error exists in at least one of the plurality of data packets, the presence of the error may be indicated through the error indicator.

The PLP_ID field indicates an identifier of a target PLP of the data packet included in the corresponding container payload 5200. In one embodiment, the container encapsulator 3030 receives the PLP_ID field value extracted from the L1 signaling processor 3020 from the L1 signaling processor 3020 to set a PLP_ID field value of the container header 5100. At this time, in one embodiment, the PLP_ID field value of the container header 5100 is set to be equal to the PLP_ID field provided from the L1 signaling processor 3020.

In one embodiment, the length field indicates a length of the data packet included in the corresponding container payload 5200 on a byte basis. If one baseband packet is mapped into the container payload 5200, the length field indicates the length of the baseband packet. At this time, the length of the baseband packet is determined by the outer code type, the inner code rate and the code length, which are selected for the target PLP, and has a value between 249 bytes (that is, 1992 bits) and 7020 bytes (that is, 56160 bits). In another embodiment of the present disclosure, if a plurality of data packets are mapped into the container payload 5200, the length field may indicate the length of the container payload 5200. Also, the length of the data container according to the present disclosure may be fixed or variable. If the length of the data container is variable, information for identifying the length of the corresponding data container may be signaled to the length field.

The continuity counter field is increased from 0 to 255. In one embodiment, the continuity counter field is increased as much as 1 whenever the data packets having the same PLP_ID are input to the container encapsulator 3030. In the present disclosure, continuity of the data packets within a specific PLP (or one subframe or one frame) may be identified using the continuity counter field. In another embodiment of the present disclosure, if the plurality of data packets are mapped into the container payload 5200, the continuity counter field may count the number of the data packets included in the container payload 5200. In this case, in one embodiment, the plurality of data packets having the same PLP_ID are mapped into the container payload 5200.

In FIG. 18, the order, position and meaning of the fields allocated to the container header 5100 of the data container correspond to one embodiment for assisting understanding of the present disclosure. Since the order, position, and meaning of the fields allocated to the container header 5100 and the number of additionally allocated fields may easily be modified by the person with ordinary skill in the art, the present disclosure is not limited to the above embodiment.

As described above, the data container generated by the container encapsulator 3030 is provided to the system on chip module 3050 that includes a system decoder.

In one embodiment, the system on chip module 3050 extracts the data packets included in the corresponding container payload 5200 based on header information signaled to the container header 5100 of the data container, and splits and restores audio and/or video data for service or product from the extracted data packets.

To this end, in one embodiment, the system on chip module 3050 includes a system decoder for extracting the data packets included in the container payload 5200 of the data container and splitting audio data and video data from the extracted data packets, an audio decoder for decoding the split audio data, and a video decoder for decoding the split video data. Also, the system on chip module 3050 may further include a controller for controlling extraction of the data packets from the data container output from the container encapsulator 3030, split of audio data and video data from the extracted data packets, and decoding, reproduction and lip-sync of the split audio data and the split video data. The controller may be provided outside the system on chip module 3050. In addition, the system on chip module 3050 may perform Conditional Access System (CAS) control, external memory control, 3-Dimensional (3D) control, picture quality enhancement control, etc.

The operation of the system on chip module 3050 may be performed by any one of hardware, firmware, middleware, and software, or may be performed by a combination of at least two of them.

The system on chip module 3050 needs a reference time to perform Program Clock Reference (PCR) clock recovery, lip-sync for synchronizing the outputs of the audio data and the video data, etc.

In one embodiment, the system on chip module 3050 uses the time information transmitted from the transmission system as the reference time.

In order that the system on chip module 3050 uses the time information as the reference time, the container encapsulator 3030 should deliver the time information received from the L1 signaling processor 3020 to the system on chip module 3050.

The time information transmitted from the L1 signaling processor 3020 to the container encapsulator 3030 corresponds to the information acquired from at least one field value of the L1D_time_sec field, the L1D_time_msec field, the L1D_time_usec field, and the L1D_time_nsec field, which are included in the L1 Detail signaling data, in accordance with the L1B_time_info_flag field value and the LIB time info flag field value, which are included in the L1 Basic signaling data.

At this time, if the L1B_time_info_flag field value of the L1 Basic signaling data indicates 00, the L1 Detail signaling data does not include any one of the L1D_time_sec field, the L1D_time_msec field, the L1D_time_usec field, and the L1D_time_nsec field. In this case, the LIB time info flag field value indicating that there is no time information in the current frame is only transmitted to the container encapsulator 3030.

In one embodiment, the time information extracted from at least one of the L1D_time_sec field, the L1D_time_msec field, the L1D_time_usec field, and the L1D_time_nsec field is the time when the first sample of the first symbol of the bootstrap within the corresponding frame included in the time information is transmitted from the transmission system.

In the present disclosure, various embodiments for delivering the time information provided from the container encapsulator 3050 to the L1 signaling processor 3020 to the system on chip module 3050 will be described.

In one embodiment, the system on chip module 3050 sets the time information provided from the container encapsulator 3020 to the reference time, and makes various kinds of time information based on the reference time or corrects the reference time. For example, PCR recovery, system time clock, the time when video data or audio data should be decoded, the time when video data or audio data should be reproduced, etc. may be made or corrected based on the reference time. Particularly, in one embodiment of the present disclosure, when the audio data and the video data are reproduced at the same time, the audio data are synchronized with the video data based on the reference time. That is, the time included in the time information is used as the reference time for synchronizing lip-sync of the audio data and the video data. For example, the system time clock may be made by the reference time, and lip-sync of the audio data and the video data may be synchronized using the system time clock.

Figure 19:
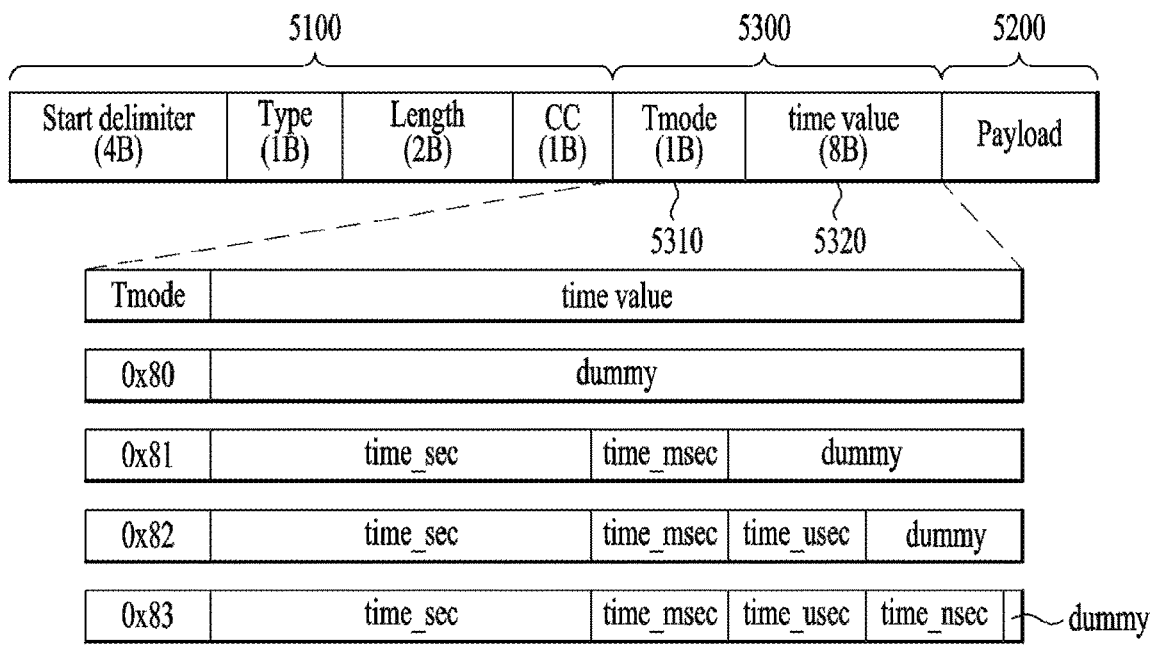
FIG. 19 is a view illustrating a structure of a data container that includes time information according to one embodiment of the present disclosure.

FIG. 19 is a view illustrating one embodiment of a structure of a data container for delivering time information from the container encapsulator 3030 of the present disclosure to the system on chip module 3050.

That is, FIG. 19 is one embodiment of the data container for providing time information to the system on chip module 3050 by including the time information in a portion of the data container shown in FIG. 18.

The data container of FIG. 19 further includes a field 5300 for time information transmission between the container header 5100 and the container payload 5200.

In FIG. 19, the others except the field 5300 for time information transmission will be understood with reference to the detailed description of FIG. 18 and thus will be omitted herein.

In the present disclosure, for convenience of description, the field 5300 for time information transmission will be referred to as a container time field. Since the terminology, the container time field is randomly selected by the applicant and may be modified in accordance with a system designer, the present disclosure should be understood based on intended meaning of the terminology not simple title or meaning of the terminology.

In one embodiment of the present disclosure, 9 bytes are allocated to the container time field 5300. Also, in the present disclosure, the container time field 5300 may be included in any one of the container header and the container payload of the corresponding data container. In one embodiment of the present disclosure, the container time field 5300 is included in the container header 5100. In this case, the container header is extended from 8 bytes to 17 bytes.

In one embodiment, the container time field 5300 includes a time mode field 5310 of a byte and a time information field 5320 of 8 bytes.

In one embodiment, the time mode field 5310 indicates whether time information exists in the time information field 5320, and also indicates precision of the time information existing in the time information field 5320 if the time information exists therein. That is, information signaled to the time mode field 5310 is based on the L1B_time_info_flag field value extracted and provided from the L1 Basic signaling data.

In one embodiment of the present disclosure, the time mode field 5310 is categorized into a time flag field of the most significant bit of 1 bit and a time type field of lower 7 bits.

In one embodiment, the time flag field indicates whether the time information transmitted to the corresponding data container is valid. For example, if the time flag field has a value of 1, it indicates that the time information transmitted to the corresponding data container is valid, and if the time flag field has a value of 0, it indicates that the time information transmitted to the corresponding data container is not valid.

The time type field indicates precision of the time information included in the time information field 5320. Particularly, in one embodiment, the time type field indicates precision of the time information included in the time information field 5320 when the time flag field has a value of 1. In one embodiment, precision of the time information included in the time information field 5320 is equal to precision of the time information extracted from the preamble of the corresponding frame. Also, in one embodiment, the time type field indicates the time information even when the time information does not exist in the time information field 5320. That is, the time type field is similar to meaning of the L1B_time_info_flag field included in the L1 Basic signaling data.

For example, if the time type field value is 0x80, it indicates that there is no time information included in the time information field 5320. In this case, in one embodiment, the time information field 5320 is filled with dummy bits such as 0.

For another example, if the time type field value is 0x81, it indicates that precision of the time information included in the time information field 5320 is millisecond (ms). In this case, in one embodiment, higher 48 bits of 64 bits (that is, 8 bytes) of the time information field 5320 include time information of ms, and the other bits include dummy data.

For another example, if the time type field value is 0x82, it indicates that precision of the time information included in the time information field 5320 is microsecond (us). In this case, in one embodiment, higher 52 bits of 64 bits (that is, 8 bytes) of the time information field 5320 include time information of us, and the other bits include dummy data.

For still another example, if the time type field value is 0x83, it indicates that precision of the time information included in the time information field 5320 is nanosecond (ns). In this case, in one embodiment, higher 64 bits of 64 bits (that is, 8 bytes) of the time information field 5320 include time information of ns, and the other bits include dummy data.

Figure 20A:
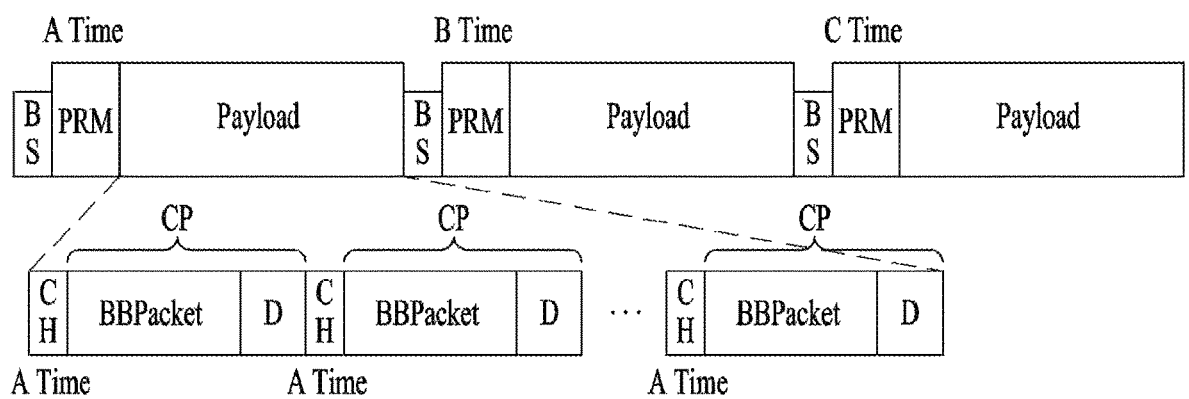
FIGS. 20(a) and 20(b) are views illustrating embodiments of transmitting a data container that includes baseband packets and time information according to the present disclosure.
Figure 20B:
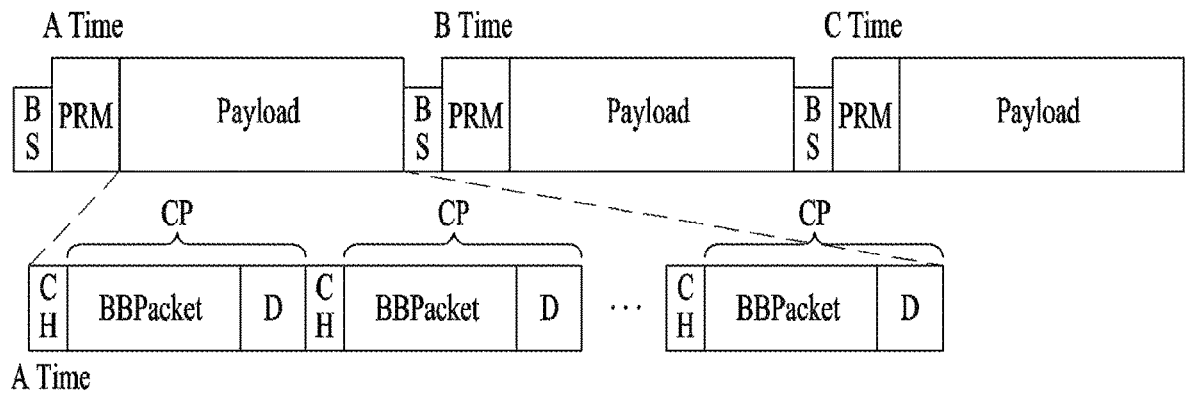

FIGS. 20(*a*) and 20(*b*) illustrate embodiments in which a data container that includes baseband packets and time information is generated by the container encapsulator 3030 and then output to the system on chip module 3050. In FIGS. 20(*a*) and 20(*b*), CH means a container header, and CP means a container payload. In one embodiment, all the data containers in FIGS. 20(*a*) and 20(*b*) have the same structure as that of FIG. 19. That is, each data container includes a container header and a container payload, wherein the container header includes a start delimiter field of 4 bytes, a type field of 1 byte, a length field of 2 bytes, a continuity counter field of 1 byte, and a container time field of 9 bytes. The container payload includes at least one data packet output from the PLP data processor 3010. In one embodiment of FIGS. 20(*a*) and 20(*b*), the data packet is a baseband packet.

In one embodiment of FIGS. 20(*a*) and 20(*b*), if a size (or length) of the baseband packet included in the container payload is smaller (shorter) than a size (or length) of the corresponding container payload, the other of the container payload is filled with dummy data such as 0. The dummy data is marked with D.

In the present disclosure, it is assumed that time information is included in the L1 signaling data of the preamble area within one frame and a plurality of FEC blocks are included in the data area as shown in FIG. 20(*a*). In this case, the container encapsulator 3030 may generate data containers as much as the number of the FEC blocks and equally signal the time information extracted from the L1 signaling data to the container time field 5300 of each data container. That is, each of all the data containers generated based on a frame for transmitting time information corresponding to A may include a container header that includes time information corresponding to A and a container payload that includes a baseband packet within a corresponding FEC block.

Also, in the present disclosure, under the above assumption, the time information extracted from the L1 signaling data may be signaled to only the container time field 5300 of the first data container and no time information may be signaled to the container time field 5300 of the other data containers, as shown in FIG. 20(*b*). That is, the time information corresponding to A may be signaled to only the container header of the first data container of all the data containers generated based on the frame for transmitting the time information corresponding to A, and no time information may be signaled to the container header of the other data containers.

As another embodiment of the present disclosure, the first data container of all the data containers generated based on the frame for transmitting the time information corresponding to A may generate and output a data container of a structure, which includes a container time field 5300 as shown in FIG. 19, and the other data containers may generate and output a data container of a structure having no container time field 5300 as shown in FIG. 18. At this time, the time information corresponding to A extracted from the L1 signaling data is output by being signaled to the container time field 5300 of the first data container.

At this time, if the time information is transmitted using the data container of the structure shown in FIG. 19, different types of performance may be provided depending on a time interleaving (TI) mode.

Figure 21:
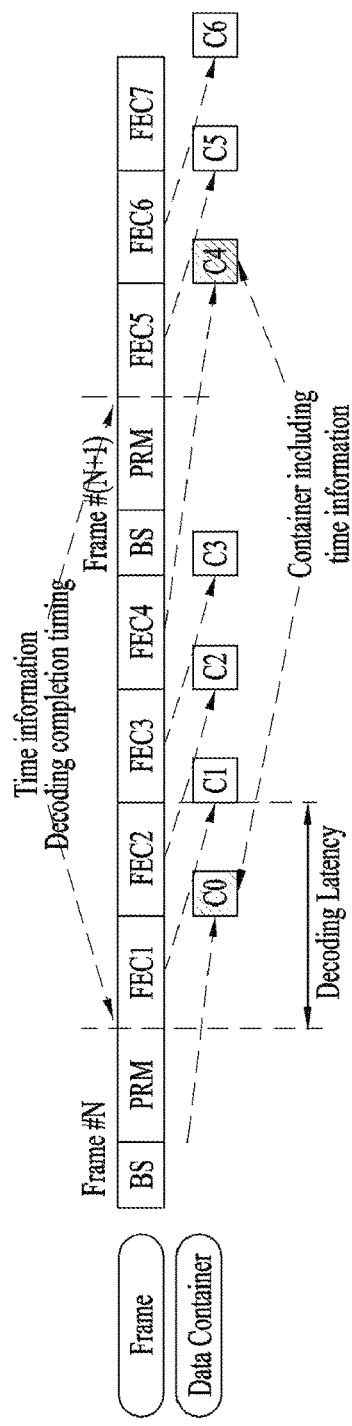
FIG. 21 is a view illustrating another embodiment of transmitting a data container that includes baseband packets and time information according to the present disclosure.

FIG. 21 illustrates an embodiment in which a data container that includes time information as shown in FIG. 19 is generated by the container encapsulator 3030 and then transmitted to the system on chip module 3050 when TI mode is HTI mode. In the HTI mode, one frame (or subframe) includes an integer number of FEC blocks.

In FIG. 21, if the time information is received by being included in L1 signaling data of a preamble of an Nth frame, a data container CO that includes time information extracted from the L1 signaling data is transmitted to the system on chip module 3050 at the time when decoding of a first FEC block of the Nth frame is completed. At this time, a baseband packet extracted from the last FEC block of an N−1th frame is included in a payload of the data container CO that includes the time information.

If the time information is received by being also included in L1 signaling data of a preamble of an N+1th frame, a data container C4 that includes time information extracted from the L1 signaling data is transmitted to the system on chip module 3050 at the time when decoding of a first FEC block within the N+1th frame is completed. Even at this time, a baseband packet extracted from the last FEC block of the Nth frame is included in a payload of the data container C4 that includes the time information.

That is, in the HTI mode, the same time (that is, decoding latency) is always required from the time when decoding of the preamble which includes the time information is completed to the time when the data container which includes the time information extracted from the preamble is transmitted to the system on chip module 3050. Therefore, the system on chip module 3050 may normally perform PCR recovery, lip-sync control, etc. by using the time information included in the data container which is received, as the reference time. The operation of the system on chip module 3050 has been described as above and thus its description will be omitted herein.

Figure 22:
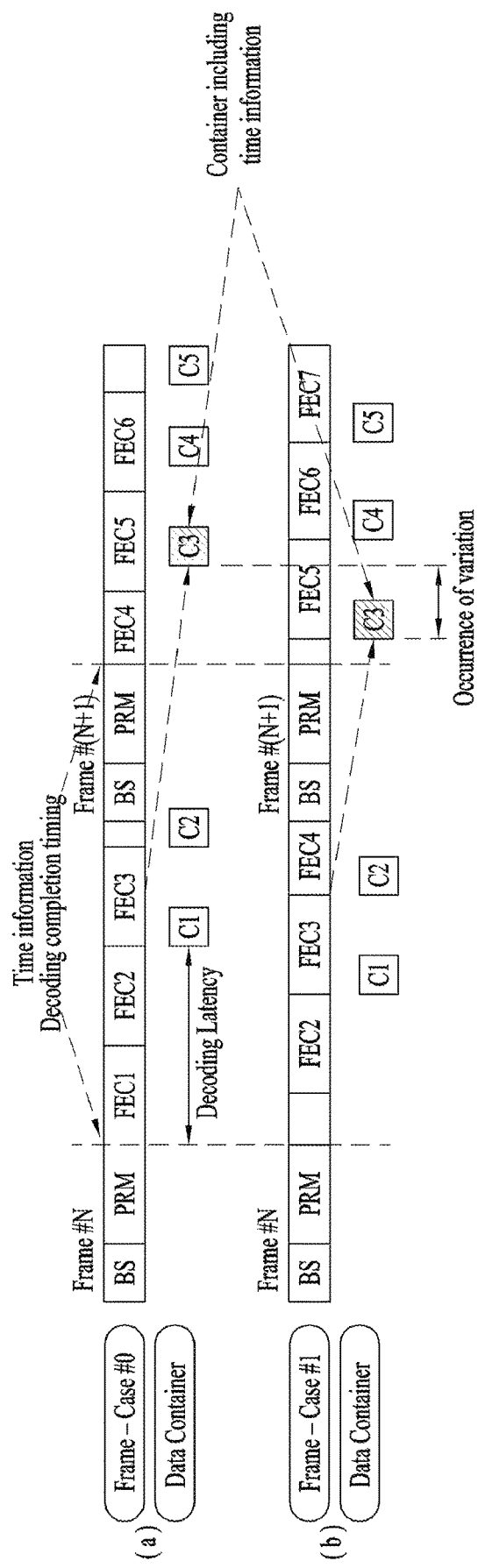
FIGS. 22(a) and 22(b) are views illustrating other embodiments of transmitting a data container that includes baseband packets and time information according to the present disclosure.

FIGS. 22(a) and 22(b) illustrate embodiments in which a data container that includes time information as shown in FIG. 19 is generated by the container encapsulator 3030 and then transmitted to the system on chip module 3050 when TI mode is CTI mode.

In this case, in the CTI mode, one frame (or subframe) may not include an integer number of FEC blocks. That is, in the CTI mode unlike the HTI mode, insertion of dummy modulation values is not required to configure one frame (or subframe) that includes an integer number of FEC block.

Therefore, one FEC block may be spread on two frames as shown in FIGS. 22(a) and 22(b). That is, in FIGS. 22(a) and 22(b), each of the last FEC block of the Nth frame and the first FEC block of the N+1th frame is not a complete FEC block, and two FEC blocks become a complete FEC block in combination. In the N+1th frame, the first complete FEC block is FEC block called FEC5, and a starting position of the first complete FEC block is signaled to L1D_plp_CTI_fec_block_start field of the L1 Detail signaling data. As shown in FIGS. 22(a) and 22(b), even when one FEC block is spread on two frames, the data container that includes time information included in the preamble is transmitted to the system on chip module 3050 at the time when decoding of the first FEC block (that is, FEC4) arranged next to the preamble is completed. Therefore, the time required from the time when decoding of the preamble which includes the time information is completed to the time when the data container which includes the time information extracted from the preamble is transmitted to the system on chip module 3050 is varied (variation occurs) depending on the amount of one FEC block spread to two frames. That is, different types of decoding latency occur. In this case, a problem may occur when the system on chip module 3050 performs PCR recovery, lip-sync control, etc. by using the time information included in the data container which is received, as the reference time. That is, an error occurs in the time information extracted from the data container by variation generated when one FEC block is spread to two frames. For this reason, a problem occurs in that lip-sync is not synchronized precisely.

To solve the above problem, the present disclosure suggests a container for transmitting time information only. In the present disclosure, a container for transmitting time information only will be referred to as a time information container. That is, a data packet is not included in the time information container, and is transmitted through the data container shown in FIG. 18. In the present disclosure, for convenience of description, the time information container will be referred to as a first container, and the data container will be referred to as a second container. This is only exemplary, and the data container may be referred to as a first container and the time information container may be referred to as a second container.

Figure 23:
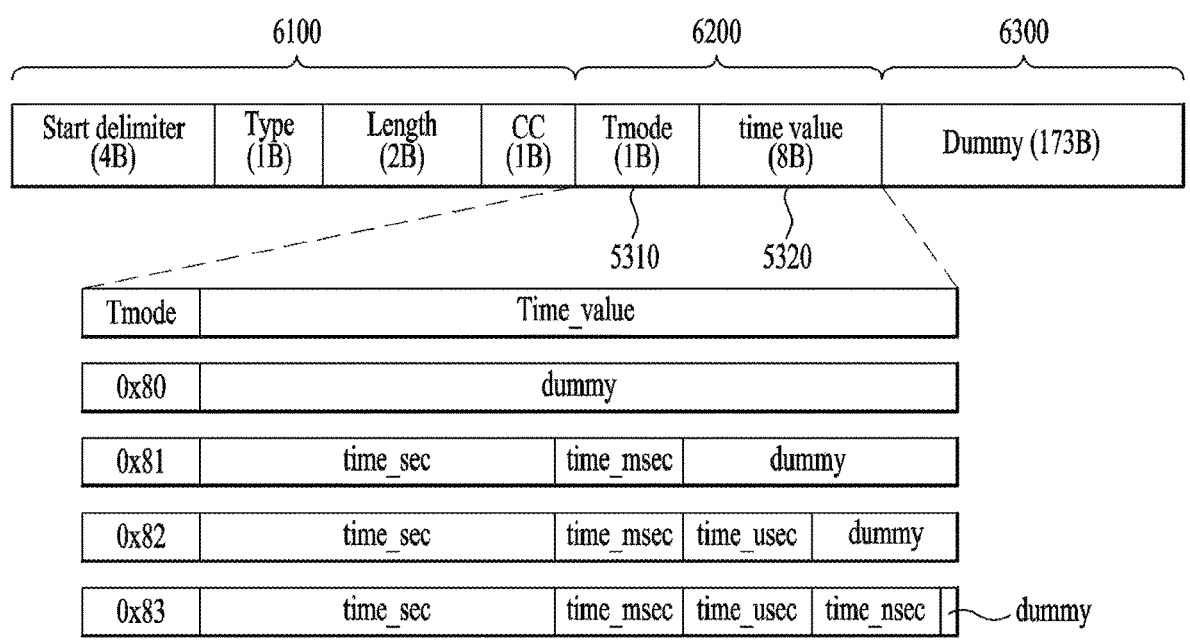
FIG. 23 is a view illustrating a structure of a time information container according to one embodiment of the present disclosure.

FIG. 23 is a view illustrating a structure of a time information container according to one embodiment of the present disclosure, wherein the time information container includes a container header and a container payload.

Since the time information container according to the present disclosure does not include a data packet, a container payload 6300 of the time information container according to the present disclosure is filled with dummy data in one embodiment.

In one embodiment, the container header of the time information container is categorized into a first header 6100 of 6 bytes that includes information on the corresponding container and a second header 6200 of 9 bytes that includes time information.

In one embodiment, the first header 6100 includes a start delimiter field of 4 bytes, a type field of 1 byte, and a continuity counter field of 1 byte.

In one embodiment, the start delimiter field indicates a starting position of the corresponding time information container. Particularly, the start delimiter field may be used when a starting position of the corresponding container header 6100 is discovered. Also, in one embodiment of the present disclosure, the start delimiter field is used as an identifier for identifying the data container from the time information container.

In one embodiment of the present disclosure, 0x3C3C3C3C is allocated as a value of the start delimiter field. This is one embodiment, and the start delimiter field value may be changed by a system designer and thus is not limited to the above value.

The type field indicates a feature of data included in the corresponding container payload 6200. At this time, since the container payload 6200 is filled with dummy data such as 0, the type field may be deleted from the first header 6100. If the type field 6100 is included in the first header 6100 as shown in FIG. 23, the type field is filled with dummy data such as 0 in one embodiment.

In one embodiment, the continuity counter field is increased from 0 to 255, and is increased as much as 1 whenever the time information container is generated. Alternatively, the continuity counter field of the time information container and the continuity counter field of the data container may be combined with each other to identify the number of containers generated in one frame.

In the present disclosure, a length of the time information container may be fixed or variable. If the length of the time information container is variable, a length field of 2 bytes may be added to the first header 6100, and information for identifying the length of the time information container may be signaled to the length field. If the length of the time information container is fixed and the length field is included in the first header 6100, the length field may have a fixed length value of the corresponding time container. If not so, the length field may be filled with dummy data such as 0. In one embodiment, it is assumed that the time information container of FIG. 23 has a fixed length of 188 bytes, and the container header of FIG. 23 has a fixed length of 15 bytes. Therefore, the container payload 6300 includes dummy data of 173 bytes. The length field may be used to indicate that the length of the corresponding container is 188 bytes.

The second header 6200 is referred to as a container time field, and has the same meaning and function as that of the container time field 5200 of FIG. 19.

That is, the second header 6200 includes a time mode field 5310 and a time information field 5320.

In one embodiment, the time mode field 5310 indicates whether the time information exists in the time information field 5320, and also indicates precision of the time information existing in the time information field 5320 if the time information exists in the time information field 5320.

In one embodiment of the present disclosure, the time mode field 5310 is categorized into a time flag field of the most significant bit and a time type field of lower 7 bits.

In one embodiment, the time flag field indicates whether the time information transmitted to the corresponding data container is valid. For example, if the time flag field has a value of 1, it indicates that the time information transmitted to the corresponding data container is valid, and if the time flag field has a value of 0, it indicates that the time information is not valid.

The time type field indicates precision of the time information included in the time information field 5320. Particularly, in one embodiment, the time type field indicates precision of the time information included in the time information field 5320 when the time flag field value is 1. In one embodiment, precision of the time information included in the time information field 5320 is equal to precision of the time information extracted from the preamble of the corresponding frame. Also, in one embodiment, the time type field indicates the time information even when there is no time information in the time information field 5320. That is, the time type field is similar to the L1B_time_info_flag field included in the L1 Basic signaling data.

For example, if the time type field value is 0x80, it indicates that there is no time information included in the time information field 5320. In this case, in one embodiment, the time information field 5320 is fully filled with dummy bits such as 0.

For another example, if the time type field value is 0x81, it indicates that precision of the time information included in the time information field 5320 is millisecond (ms). In this case, in one embodiment, higher 48 bits of 64 bits (that is, 8 bytes) of the time information field 5320 include time information of ms, and the other bits include dummy data.

For another example, if the time type field value is 0x82, it indicates that precision of the time information included in the time information field 5320 is microsecond (us). In this case, in one embodiment, higher 52 bits of 64 bits (that is, 8 bytes) of the time information field 5320 include time information of us, and the other bits include dummy data.

For still another example, if the time type field value is 0x83, it indicates that precision of the time information included in the time information field 5320 is nanosecond (ns). In this case, in one embodiment, higher 64 bits of 64 bits (that is, 8 bytes) of the time information field 5320 include time information of ns, and the other bits include dummy data.

In FIG. 23, the order, position and meaning of the fields allocated to the container header 6100 of the time information container correspond to one embodiment for assisting understanding of the present disclosure. Since the order, position, and meaning of the fields allocated to the container header 6100 and the number of additionally allocated fields may easily be modified by the person with ordinary skill in the art, the present disclosure is not limited to the above embodiment, In one embodiment of the present disclosure, the container encapsulator 3050 encapsulates the data packet output from the PLP data processor 3010 into the data container and encapsulates the time information output from the L1 signaling processor 3020 to the time information container and then outputs the encapsulated time information to the system on chip module 3050.

In one embodiment, the system on chip module 3050 extracts the time information from the time information container and uses the extracted time information as the reference time such as PCR recovery and lip-sync control. The system on chip module 3050 extract the data packets from the corresponding container, splits audio data and/or video data for service or product from the extracted data packets, and then performs decoding for the split audio data and/or video data. If the data packet is a baseband packet, the system on chip module 3050 may extract at least one ALP packet from the baseband packet and extract TS packet or IP packet from the extracted ALP packet.

Figure 24:
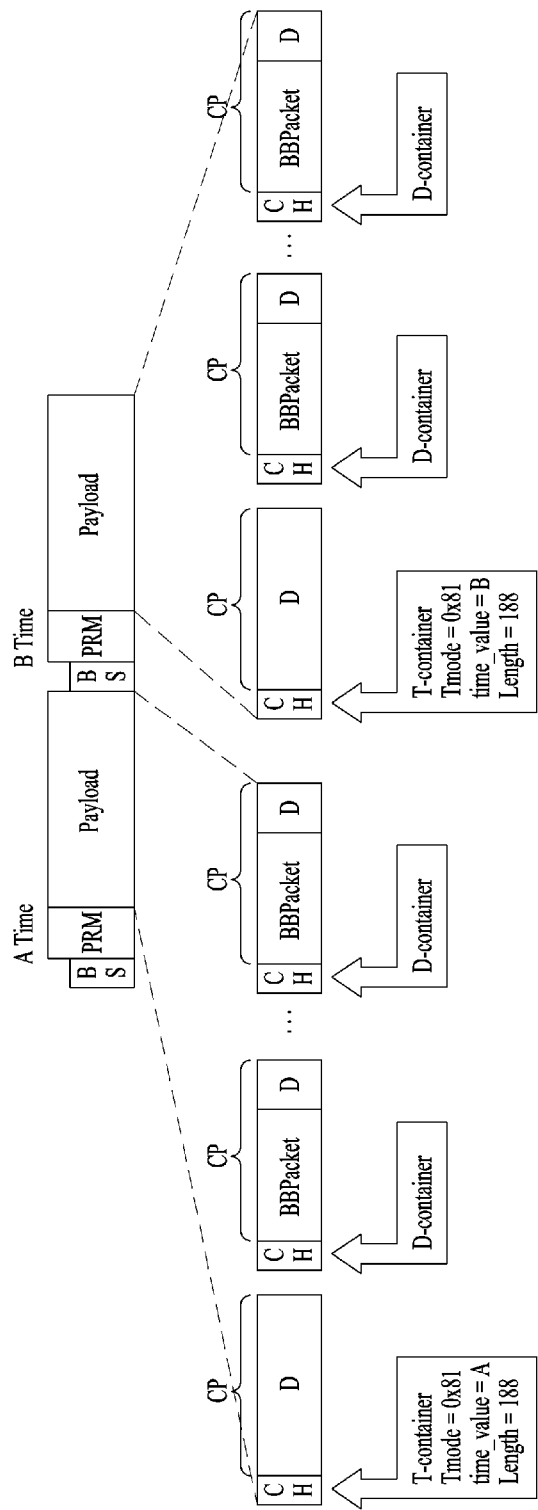
FIG. 24 is a view illustrating one embodiment of transmitting a time information container that includes time information and a data container that includes data packets according to the present disclosure.

FIG. 24 illustrates one embodiment in which at least one time information container and one or more data containers are generated per frame by the container encapsulator 3030 according to the present disclosure and then transmitted to the system on chip module 3050.

In FIG. 24, CH means a container header, and CP means a container payload. The dummy data is marked with D.

For example, it is assumed that a frame having time information called A and a frame having time information called B exist. In this case, the container encapsulator 3030 transmits a time information container, which includes time information extracted from a preamble of a corresponding frame, to the system on chip module 3050 at the time when decoding of the preamble of each frame is completed.

That is, the time information container transmitted at the time when decoding of the preamble of the frame having the time information of A is completed indicates that the corresponding container is a time information container by using the start delimiter field of the first header 6100, and indicates that a length of the time information container is 188 bytes, using the length field. The time information container sets the time mode field 5310 of the second header 6200 to 0x81, and indicates that precision of the time information is millisecond if the time information exists in the time information field 5320. The time information container includes the time information of A in the time information field 5320 on a millisecond basis. If the time information container is transmitted from the frame that includes the time information of A, a plurality of data containers that include data packets extracted from the data area of the frame are transmitted to the system on chip module 3050. At this time, the plurality of data containers do not include time information.

If the time information is not included in the preamble of the frame, the container encapsulator 3030 sets the time mode field 5310 of the second header 6100 of the corresponding time information container to 0x80 and indicates that the time information is not included in the corresponding time information container.

The container encapsulator 3030 performs a procedures similar to the above procedure for the frame having the time information of B, and then transmits one time information container and one or more data containers to the system on chip module 3050.

Meanwhile, as described above, 0x5A5A5A5A is allocated as a value of the start delimiter field of the aforementioned data container, and 0x3C3C3C3C is allocated as a value of the start delimiter field of the time information container. That is, the start delimiter field value of the data container and the start delimiter field value of the time information container are allocated differently to indicate a starting position of each container and identify the data container from the time information container.

In this case, different paths should be provided during container parsing of the system on chip module 3050, whereby a problem may occur in that load is caused during implementation.

To solve this problem, the present disclosure suggests that the same value should be allocated as the start delimiter field value of the data container and the start delimiter field value of the time information container. In one embodiment of the present disclosure, 0x5A5A5A5A is allocated as the start delimiter field value of the data container and the start delimiter field value of the time information container. The field value is one embodiment for understanding of the present disclosure, and may be changed by a system designer and thus is not limited to the above value.

Figure 25:
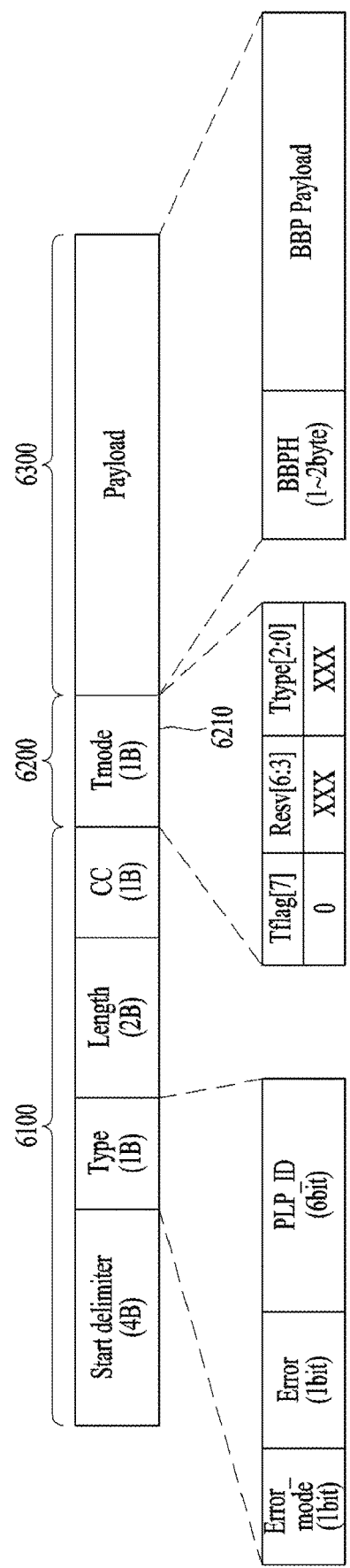
FIG. 25 is a view illustrating a structure of a data container according to another embodiment of the present disclosure.
Figure 26:
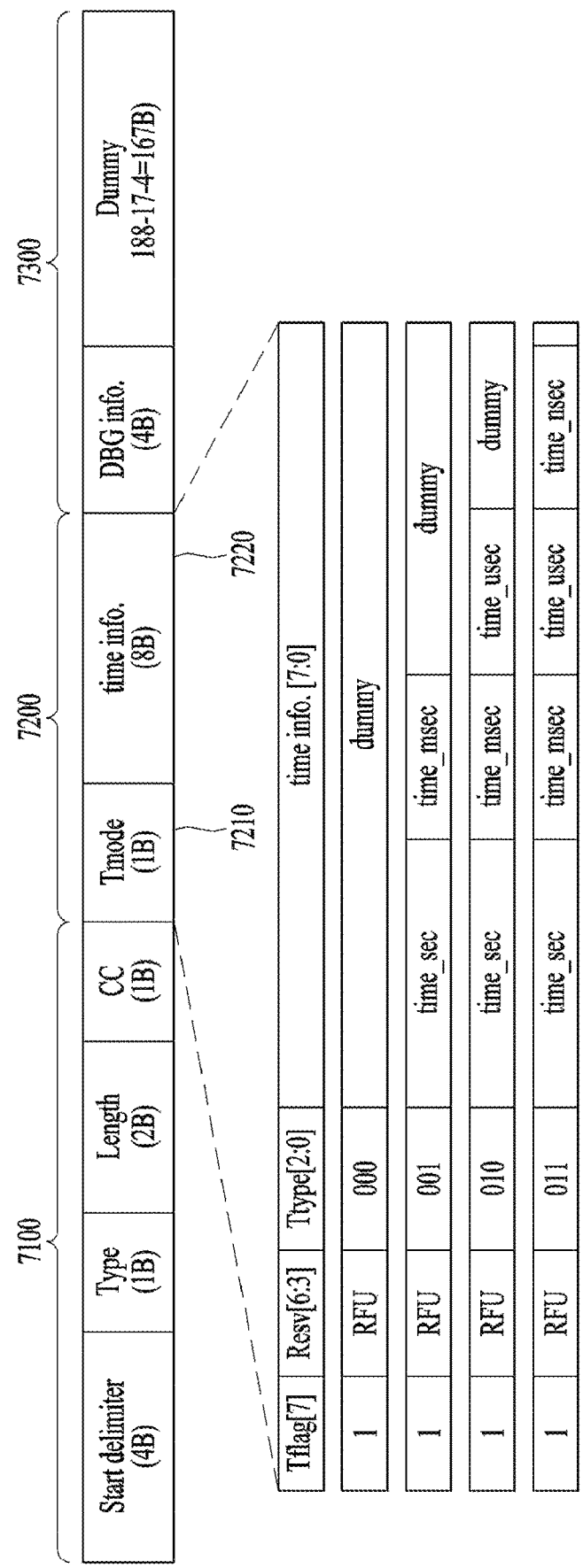
FIG. 26 is a view illustrating a structure of a time information container according to another embodiment of the present disclosure.

FIG. 25 is a view illustrating a structure of a data container according to another embodiment of the present disclosure, and FIG. 26 is a view illustrating a structure of a time information container according to another embodiment of the present disclosure.

In the present disclosure, for convenience of description, the time information container of FIG. 26 will be referred to as a first container, and the data container of FIG. 25 will referred to as a second container. This is only exemplary, and the data container may be referred to as a first container and the time information container may be referred to as a second container.

In one embodiment, each of the data container of FIG. 25 and the time information container of FIG. 26 includes a first container header, a second container header, and a container payload. For convenience of description, the first container header may be referred to as a first header, and the second container header may be referred to as a second header.

In one embodiment, the first container header includes a start delimiter field of 4 bytes, a type field of 1 byte, a length field of 2 bytes and a continuity counter field of 1 byte.

In one embodiment of the present disclosure, the time mode field is used to identify the data container from the time information container.

To this end, in one embodiment, the second container header of the data container of FIG. 25 includes a time mode field of 1 byte, and the second container header of the time information container of FIG. 26 includes a time information field of 1 byte and a time information field of 8 bytes. A detailed description will be given later.

Next, each field of the data container of FIG. 25 will be described in detail.

That is, the data container of FIG. 25 includes a first container header 6100, a second container header 6200, and a container payload 6300.

In one embodiment, the first container header 6100 includes a start delimiter field of 4 bytes, a type field of 1 byte, a length field of 2 bytes, and a continuity counter field of 1 byte.

In one embodiment, the start delimiter field indicates a starting position of the corresponding container. Particularly, the start delimiter field may be used when a starting position of the first container header 6100 of the corresponding container is discovered. In one embodiment of the present disclosure, 0x5A5A5A5A is allocated as a value of the start delimiter field.

The type field indicates a feature of a data packet included in the container payload 6300 of the corresponding container. For example, if one baseband packet is included in the corresponding container payload, the type field indicates a feature of the baseband packet. To this end, the type field is categorized into an error mode field of 1 bit, an error field of 1 bit, and a PLP_ID field of 6 bits.

The error mode field indicates whether the error field subsequent to the error mode field is used. For example, if the error mode field has a value of 0, it indicates that the error field is not used in the first container header 6100 of the corresponding container. For another example, if the error mode field has a value of 1, it indicates that the error field is used in the first container header 6100 of the corresponding container, and indicates whether there is any error in the corresponding baseband packet through the error field.

For example, if the error field value is 0, it indicates that there is no error in the baseband packet included in the corresponding container payload 6300. If the error field value is 1, it indicates that there is an error in the baseband packet included in the corresponding container payload 6300. In this case, if the error field value is 1, it means that an error remains in the corresponding baseband packet even after error correction is performed by BCH decoding (optional) and LDPC decoding.

In the present disclosure, for convenience of description, the error field may be referred to as an error indicator or error indication information, and a combination of the error mode field and the error field may be referred to as an error indicator.

The PLP_ID field indicates an identifier of a target PLP of the data packet included in the corresponding container payload 6300. In one embodiment, the container encapsulator 3030 receives the PLP_ID field value extracted from the L1 signaling processor 3020 from the L1 signaling processor 3020 to set a PLP_ID field value of the first container header 6100. At this time, in one embodiment, the PLP_ID field value of the first container header 6100 is set to be equal to the PLP_ID field provided from the L1 signaling processor 3020.

In one embodiment, the length field indicates a length of the data packet included in the corresponding container payload 6300 on a byte basis. If one baseband packet is mapped into the container payload 6300, the length field indicates the length of the baseband packet. At this time, the length of the baseband packet is determined by the outer code type, the inner code rate and the code length, which are selected for the target PLP, and has a value between 249 bytes (that is, 1992 bits) and 7020 bytes (that is, 56160 bits). In another embodiment of the present disclosure, if a plurality of data packets are mapped into the container payload 6300, the length field may indicate the length of the container payload 6300. Also, the length of the data container according to the present disclosure may be fixed or variable. If the length of the data container is variable, information for identifying the length of the corresponding data container may be signaled to the length field.

The continuity counter field is increased from 0 to 255. In one embodiment, the continuity counter field is increased as much as 1 whenever the data packets having the same PLP_ID are input to the container encapsulator 3030. In the present disclosure, continuity of the data packets within a specific PLP (or one subframe or one frame) may be identified using the continuity counter field. To this end, if the plurality of PLPs are transmitted, the continuity counter field separately operates per PLP_ID. In another embodiment of the present disclosure, if the plurality of data packets are mapped into the container payload 6300, the continuity counter field may count the number of the data packets included in the container payload 6300. In this case, in one embodiment, the plurality of data packets having the same PLP_ID are mapped into the container payload 6300.

The order, position and meaning of the fields allocated to the first container header 6100 correspond to one embodiment for assisting understanding of the present disclosure. Since the order, position, and meaning of the fields allocated to the first container header 6100 and the number of additionally allocated fields may easily be modified by the person with ordinary skill in the art, the present disclosure is not limited to the above embodiment, In one embodiment, the second container header 6200 includes a time mode field 6210 of 1 byte.

In one embodiment of the present disclosure, the time mode field 6210 is set to an invalid value, for example, '0' to identify that the corresponding container is a data container. In one embodiment of the present disclosure, the time flag field of the most significant bit of 1 bit within the time mode field 6210 is set to '0' to indicate that the corresponding container is a data container. In this case, it does not matter what values of the other 7 bits within the time mode field 6210 are. In one embodiment of the present disclosure, the other 7 bits are all filled with 0.

That is, if a time flag field value of the time mode field 6210 within the second header of the received container is an invalid value, that is, 0, the system on chip module 3050 that includes a system decoder determines that the received container is a data container that does not include time information, and performs an operation according to the determined result.

Next, each field of the time information container of FIG. 26 will be described in detail.

That is, the time information container of FIG. 26 includes a first container header 7100, a second container header 7200, and a container payload 7300.

The container payload 7300 of the time information container according to the present disclosure does not include a data packet.

In one embodiment of the present disclosure, the container payload 7300 may transmit dummy data to the system on chip module 3050 after being filled with the dummy data.

In another embodiment of the present disclosure, control information, for example, debugging information may be included in some of all of the container payload 7300 and then transmitted to the system on chip module 3050. In one embodiment, if debugging information is included in some of the container payload 7300, the others are filled with dummy data. In one embodiment of the present disclosure, 4 bytes of the container payload of 171 bytes include debugging information, and the other 167 bytes include dummy data such as 0.

The debugging information is information for debugging a problem on an interface between the inside and the outside of the system on chip module 3050 or a problem in implementation of each chip when the problem occurs. For example, when there is a difference between the information received from the system on chip module 3050 and information checked by the system on chip module 3050, this difference corresponds to the debugging information. For another example, when a difference occurs between a reception time interval between two time information containers and a reception time interval between two same time information containers included in the debugging information, this difference corresponds to the debugging information.

In one embodiment, the first container header 7100 includes a start delimiter field of 4 bytes, a type field of 1 byte, a length field of 2 bytes, and a continuity counter field of 1 byte.

In one embodiment, the start delimiter field indicates a starting position of the corresponding container. Particularly, the start delimiter field may be used when a starting position of the first container header 7100 of the corresponding container is discovered. In one embodiment of the present disclosure, 0x5A5A5A5A is allocated as a value of the start delimiter field. That is, the same value, for example, 0x5A5A5A5A is allocated to the start delimiter field included in the first container header 6100 of the data container of FIG. 25 and the start delimiter field included in the first container header 7100 of the time information container FIG. 26.

The type field indicates a feature of data included in the container payload 7300. In one embodiment of the present disclosure, since the container payload 7300 of the time information container does not include a data packet, the type field is filled with dummy data such as 0.

In another embodiment of the present disclosure, the error mode of the type field and the error field may be used to indicate whether the L1 signaling information has an error.

For example, if the error mode field has a value of 0, it indicates that the error field is not used in the first container header 7100 of the corresponding container. For another example, if the error mode field has a value of 1, the error field is used in the first container header 7100 of the corresponding container, and indicates whether there is an error in the corresponding baseband packet. If the error field value is 0, it indicates that there is no error in the decoded L1 signaling information. If the error field value is 1, it indicates that there is an error in the decoded L1 signaling information. In this case, if the error field value is 1, it means that an error remains in the L1 signaling information even after error correction is performed by BCH decoding and LDPC decoding.

In the present disclosure, for convenience of description, the error field may be referred to as an error indicator or error indication information, and a combination of the error mode field and the error field may be referred to as an error indicator.

In one embodiment, the length field indicates a length of the container payload 7300 on a byte basis. In one embodiment of the present disclosure, the length field indicates a length of 171 bytes. In another embodiment of the present disclosure, if the length of the time information container is variable, information for identifying the length of the corresponding time information container may be signaled using the length field.

The continuity counter field is increased from 0 to 255. In one embodiment, the continuity counter field is increased as much as 1 whenever the time information container is generated. Alternatively, the continuity counter field of the time information container and the continuity counter field of the data container may be combined with each other to identify the number of containers generated in one frame.

The second header 7200 is referred to as a container time field, and includes a time mode field 7210 and a time information field 7220.

In one embodiment, the time mode field 7210 indicates whether the time information exists in the time information field 7220, and also indicates precision of the time information existing in the time information field 7220 if the time information exists in the time information field 7220.

In one embodiment of the present disclosure, the time mode field 7210 is categorized into a time flag field of the most significant bit of 1 bit, a reserved field RFU for future use of higher 4 bits, and a time type field of lower 3 bits.

In one embodiment, the time flag field indicates whether the time information transmitted to the corresponding time information container is valid.

However, in one embodiment of the present disclosure, since the data container and the time information container are identified from each other using the time flag field, the time flag field value included in the time information container is always set to a valid value, that is, '1'.

The time type field indicates precision of the time information included in the time information field 7220. Particularly, in one embodiment, the time type field indicates precision of the time information included in the time information field 7220 when the time flag field value is 1. In one embodiment, precision of the time information included in the time information field 7220 is equal to precision of the time information extracted from the preamble of the corresponding frame. Also, in one embodiment, the time type field indicates the time information even when there is no time information in the time information field 7220. That is, the time type field is similar to the L1B_time_info_flag field included in the L1 Basic signaling data.

For example, if the time type field value is '000', it indicates that there is no time information included in the time information field 7220. In this case, in one embodiment, the time information field 7220 is fully filled with dummy bits such as 0. This case may be applied when the L1B_time_info_flag field value is 00, that is, it indicates that there is no time information in the current frame.

For another example, if the time type field value is '001', it indicates that precision of the time information included in the time information field 7220 is millisecond (ms). In this case, in one embodiment, higher 48 bits of 64 bits (that is, 8 bytes) of the time information field 7220 include time information of ms, and the other bits include dummy data.

For another example, if the time type field value is '010', it indicates that precision of the time information included in the time information field 7220 is microsecond (us). In this case, in one embodiment, higher 52 bits of 64 bits (that is, 8 bytes) of the time information field 7220 include time information of us, and the other bits include dummy data.

For still another example, if the time type field value is '011', it indicates that precision of the time information included in the time information field 7220 is nanosecond (ns). In this case, in one embodiment, higher 64 bits of 64 bits (that is, 8 bytes) of the time information field 7220 include time information of ns, and the other bits include dummy data.

In FIG. 26, the order, position and meaning of the fields allocated to the first and second container headers 7100 and 7200 of the time information container correspond to one embodiment for assisting understanding of the present disclosure. Since the order, position, and meaning of the fields allocated to the first and second container headers 7100 and 7200 and the number of additionally allocated fields may easily be modified by the person with ordinary skill in the art, the present disclosure is not limited to the above embodiment, In one embodiment of the present disclosure, the container encapsulator 3050 encapsulates the data packet output from the PLP data processor 3010 into the data container of FIG. 25 and encapsulates the time information output from the L1 signaling processor 3020 to the time information container of FIG. 26 and then outputs the encapsulated time information to the system on chip module 3050.

In one embodiment, the system on chip module 3050 identifies whether the received container is a data container or a time information container by using the time flag field value of the time mode field of the second header within the container of the container is received. For example, if the time flag field value is an invalid value, for example, '0', the system on chip module 3050 determines that the received container is a data container, and if the time flag field value is a valid value, for example, '1', the system on chip module 3050 determines that the received container is a time information container.

In one embodiment, the system on chip module 3050 extracts the time information from the time information container in accordance with the determined result and uses the extracted time information as the reference time such as PCR recovery and lip-sync control. In addition, the system on chip module 3050 extract the debugging information included in the container payload of the time information container and outputs the debugging information to the outside for debugging.

In one embodiment, the system on chip module 3050 extracts data packets from the data container, splits audio data and/or video data for service or product from the extracted data packets, and then performs decoding for the split audio data and/or video data. If the data packets are baseband packets, the system on chip module 3050 may extract at least one ALP packet from the baseband packets and extract TS packet or IP packet from the extracted ALP packet.

To this end, in one embodiment, the system on chip module 3050 includes a system decoder for extracting the data packets included in the container payload 6300 of the received data container and splitting audio data and video data from the extracted data packets, an audio decoder for decoding the split audio data, and a video decoder for decoding the split video data. The system decoder may extract time information from the time information container and use the extracted time information as the reference time such as PCR recovery and lip-sync control. For another example, the system on chip module 3050 may further include a controller for extraction of the time information, PCR recovery and lip-sync control. The controller may be provided outside the system on chip module 3050. In addition, the system on chip module 3050 may perform Conditional Access System (CAS) control, external memory control, 3-Dimensional (3D) control, picture quality enhancement control, etc.

It is to be understood by those skilled in the art that various modifications and may be made in the present disclosure without departing from the spirits or range of the present disclosure. Therefore, the present disclosure is intended that the scope of the disclosure should be determined by the appended claims and their legal equivalents, not by the above description, and all changes coming within the meaning and equivalency range of the appended claims are intended to be embraced therein.

Both device and method disclosures are mentioned in this specification and descriptions of both the device and method disclosures may be complementarily applied to each other.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present disclosure can be executed as code. Such code can be written on a processor-readable storage medium and thus can be read by a processor provided by a device.

MODE FOR IMPLEMENTING THE DISCLOSURE

Various embodiments have been described in the best mode for implementing the present disclosure.

INDUSTRIAL APPLICABILITY

The present disclosure is used in the field for a series of broadcast signals. It will be apparent to those skilled in the art that various modifications and variations can be made in the present disclosure without departing from the spirit and essential characteristics of the present disclosure. Therefore, the scope of the disclosure should be determined by the appended claims and their legal equivalents, rather than by the above description, and all changes that fall within the meaning and equivalency range of the appended claims are intended to be embraced therein.

The invention claimed is:

1. A method of receiving a broadcast signal, the method comprising:
   receiving the broadcast signal including Layer 1 (L1) signaling data and Physical Layer Pipe (PLP) data of at least one PLP;
   processing the L1 signaling data and outputting time information;
   processing the PLP data and outputting at least one data packet; and
   generating a first container including the time information and generating a second container including the at least one data packet,
   wherein the first container includes a first header and a first payload,
   wherein the first header includes first start point information for indicating a start point of the first container and first container identification information for identifying the first container,
   wherein the second container includes a second header and a second payload, and
   wherein the second header includes second start point information for indicating a start point of the second container and second container identification information for identifying the second container.

2. The method of claim 1, wherein the first start point information and the second start point information have a same value.

3. The method of claim 1,
   wherein the first header includes a time mode field including the first container identification information and a time information field including the time information, and
   wherein the second header includes a time mode field including the second container identification information but does not include a time information field including the time information.

4. The method of claim 3, wherein the time mode field included in the first header includes a time flag field for indicating that the first container is a time information container and a time type field for indicating a precision of the time information included in the time information field, and
   wherein the time information field included in the first header includes time information of a precision indicated by the time type field.

5. The method of claim 3, wherein the time mode field included in the second header includes a time flag field for indicating that the second container is a data container and a time type field including dummy data.

6. The method of claim 1, wherein the first header further includes first error indication information for indicating an error presence in the L1 signaling data, and
   wherein the second header further includes second error indication information for indicating an error presence in the at least one data packet.

7. The method of claim 1, wherein the second header further includes PLP identification information for identifying a PLP to which the at least one data packet belongs and length identification information for identifying a length of the at least one data packet.

8. The method of claim 1,
   wherein the first payload includes debugging information for debugging and
   wherein the second payload includes the at least one data packet.

9. The method of claim 1, further comprising:
   receiving a container; and
   identifying whether the received container is the first container or the second container based on the container identification information included in the received container,
   wherein the time information is extracted from the identified container when the identified container is the first container and
   wherein the at least one data packet is extracted from the identified container when the identified container is the second container.

10. An apparatus for receiving a broadcast signal, the apparatus comprising:
    a receiver to receive the broadcast signal including Layer 1 (L1) signaling data and Physical Layer Pipe (PLP) data of at least one PLP;
    a L1 signaling processor to process the L1 signaling data and output time information;
    a PLP processor to process the PLP data and output at least one data packet; and
    a container encapsulator to generate a first container including the time information and generate a second container including the at least one data packet,
    wherein the first container includes a first header and a first payload,
    wherein the first header includes first start point information for indicating a start point of the first container and first container identification information for identifying the first container, wherein the second container includes a second header and a second payload, and wherein the second header includes second start point information for indicating a start point of the second container and second container identification information for identifying the second container.

11. The apparatus of claim 10, wherein the first start point information and the second start point information have a same value.

12. The apparatus of claim 10, wherein the first header includes a time mode field including the first container identification information and a time information field including the time information, and wherein the second header includes a time mode field including the second container identification information but does not include a time information field including the time information.

13. The apparatus of claim 12, wherein the time mode field included in the first header includes a time flag field for indicating that the first container is a time information container and a time type field for indicating a precision of the time information included in the time information field, and wherein the time information field included in the first header includes time information of a precision indicated by the time type field.

14. The apparatus of claim 12, wherein the time mode field included in the second header includes a time flag field for indicating that the second container is a data container and a time type field including dummy data.

15. The apparatus of claim 10, wherein the first header further includes first error indication information for indicating an error presence in the L1 signaling data, and wherein the second header further includes second error indication information for indicating an error presence in the at least one data packet.

16. The apparatus of claim 10, wherein the first payload includes debugging information for debugging and wherein the second payload includes the at least one data packet.

17. The apparatus of claim 10, further comprising:

a system decoder to receive a container and identify whether the received container is the first container or the second container based on the container identification information included in the received container, wherein the system decoder extracts the time information from the identified container when the identified container is the first container and wherein the system decoder extracts the at least one data packet from the identified container when the identified container is the second container.

* * * * *